(12) United States Patent
Smith et al.

(10) Patent No.: US 9,787,025 B2
(45) Date of Patent: Oct. 10, 2017

(54) ACTIVE COVER PLATES

(71) Applicant: SnapRays LLC, Provo, UT (US)

(72) Inventors: Jeremy Cornell Smith, Orem, UT (US); Sean Daniel Watkins, Orem, UT (US); Phil Dietz, St. George, UT (US); Richard Camden Robinson, Lindon, UT (US); Darren Knight, Pleasant Grove, UT (US)

(73) Assignee: SNAPRAYS, LLC, Vineyard, UT (US)

( * ) Notice: Subject to any disclaimer, the term of this patent is extended or adjusted under 35 U.S.C. 154(b) by 0 days.

(21) Appl. No.: 15/145,749

(22) Filed: May 3, 2016

(65) Prior Publication Data

US 2016/0248202 A1    Aug. 25, 2016

Related U.S. Application Data

(63) Continuation-in-part of application No. 14/549,143, filed on Nov. 20, 2014, now Pat. No. 9,362,728, which is a continuation-in-part of application No. 14/066,621, filed on Oct. 29, 2013, now Pat. No. 9,035,180, which is a continuation-in-part of application No. 13/461,915, filed on May 2, 2012, now Pat. No. 8,912,442.

(60) Provisional application No. 62/279,831, filed on Jan. 18, 2016, provisional application No. 61/720,131, filed on Oct. 30, 2012, provisional application No. 61/778,386, filed on Mar. 12, 2013, provisional application No. 61/836,972, filed on Jun. 19, 2013, provisional application No. 61/574,344, filed on Aug. 1, 2011, provisional application No. 61/906,651, filed on Nov. 20, 2013, provisional application No.
(Continued)

(51) Int. Cl.
*H02G 3/08* (2006.01)
*H01R 13/631* (2006.01)
*H02G 3/14* (2006.01)

(52) U.S. Cl.
CPC .......... *H01R 13/631* (2013.01); *H02G 3/081* (2013.01); *H02G 3/14* (2013.01)

(58) Field of Classification Search
CPC combination set(s) only.
See application file for complete search history.

(56) References Cited

U.S. PATENT DOCUMENTS

| 2,015,698 A | 10/1935 | Tiffany |
| 2,227,549 A | 1/1941 | McNeill |
| 2,385,620 A | 9/1945 | Fleckenstein |

(Continued)

FOREIGN PATENT DOCUMENTS

| DE | 202006006354 | 10/2007 |
| EP | 2211210 | 3/2007 |

(Continued)

OTHER PUBLICATIONS

Plate Pals Wallplate Thermometers, http://www.platepats.com/home.html. Last visited Apr. 12, 2017. ,2006.

*Primary Examiner* — Dhirubhai R Patel

(57) ABSTRACT

In one example, a cover plate for an electrical receptacle may include a face plate, an engaging feature disposed on the face plate, and a spring clip, wherein the engaging feature disposed on the face plate engages with the spring clip and secures the spring clip in at least two different positions with respect to the face plate.

17 Claims, 34 Drawing Sheets

Related U.S. Application Data

62/027,784, filed on Jul. 23, 2014, provisional application No. 62/081,539, filed on Nov. 18, 2014.

(56) References Cited

U.S. PATENT DOCUMENTS

| | | |
|---|---|---|
| 2,428,167 A | 9/1947 | Linton |
| 2,515,820 A | 7/1950 | Clark |
| 2,575,820 A | 11/1951 | Linton |
| 2,580,056 A | 12/1951 | Wheeler, Jr. |
| 2,749,381 A | 6/1956 | Farish |
| 2,880,285 A | 3/1959 | Robison et al. |
| 2,908,743 A | 10/1959 | Premoshis |
| 2,934,590 A | 4/1960 | Thompson et al. |
| 3,120,414 A | 2/1964 | Farish, Jr. |
| 3,307,030 A | 2/1967 | Francisco |
| D212,760 S | 11/1968 | Bordner |
| 3,522,595 A | 8/1970 | White |
| 3,588,489 A | 6/1971 | Gaines |
| 3,680,237 A | 8/1972 | Finnerty, Sr. |
| 3,739,226 A | 6/1973 | Seiter et al. |
| D230,274 S | 2/1974 | Polus |
| 3,859,454 A | 1/1975 | Mann |
| 3,879,101 A | 4/1975 | McKissic |
| 4,000,405 A | 12/1976 | Horwinski |
| 4,038,582 A | 7/1977 | Horwinski |
| 4,117,258 A | 9/1978 | Shanker |
| 4,255,780 A | 3/1981 | Sakellaris |
| 4,282,591 A | 8/1981 | Andreuccetti |
| 4,514,789 A | 4/1985 | Jester |
| 4,534,486 A | 8/1985 | Eidson |
| 4,611,264 A | 9/1986 | Bradley |
| 4,616,285 A | 10/1986 | Sackett |
| 4,617,613 A | 10/1986 | Rice |
| 4,755,913 A | 7/1988 | Sleveland |
| 4,774,641 A | 9/1988 | Rice |
| D330,267 S | 10/1992 | Hendrix |
| 5,165,042 A * | 11/1992 | Klinger ............ H01R 13/447 174/67 |
| 5,248,919 A | 9/1993 | Hanna |
| 5,290,175 A | 3/1994 | Robinson |
| 5,384,428 A | 1/1995 | Luu |
| 5,406,439 A | 4/1995 | Crane et al. |
| 5,473,517 A | 12/1995 | Blackman |
| D366,339 S | 1/1996 | Waller |
| 5,481,442 A | 1/1996 | Dickie et al. |
| 5,485,356 A | 1/1996 | Nguyen |
| 5,622,424 A | 4/1997 | Brady |
| 5,670,776 A | 9/1997 | Rothbaum |
| 5,683,166 A | 11/1997 | Lutzker |
| D395,314 S | 6/1998 | Oikawa |
| D399,825 S | 10/1998 | Heung et al. |
| 5,816,682 A | 10/1998 | Marischen |
| D401,566 S | 11/1998 | Gesmondi |
| D407,072 S | 3/1999 | Gaule |
| 5,914,826 A | 6/1999 | Smallwood |
| 6,000,807 A | 12/1999 | Moreland |
| 6,010,228 A | 1/2000 | Blackman |
| 6,023,021 A | 2/2000 | Matthews et al. |
| 6,087,588 A | 7/2000 | Soules |
| 6,089,893 A | 7/2000 | Yu et al. |
| D429,829 S | 8/2000 | Doran |
| D464,865 S | 10/2002 | Luu |
| D473,528 S | 4/2003 | Wengrower |
| 6,547,411 B1 | 4/2003 | Dornbusch |
| 6,765,149 B1 | 7/2004 | Ku |
| D500,743 S | 1/2005 | Saviki, Jr. et al. |
| 6,911,601 B1 * | 6/2005 | Gilbert ............ H02G 3/14 174/66 |
| 6,974,910 B2 | 12/2005 | Rohmer |
| 7,011,422 B2 | 3/2006 | Robertson et al. |
| 7,036,948 B1 | 5/2006 | Wyatt |
| D542,627 S | 5/2007 | Rohmer et al. |
| 7,247,793 B2 | 7/2007 | Hinkson |
| 7,270,436 B2 | 9/2007 | Jasper |
| 7,318,653 B2 | 1/2008 | Chien |
| D567,633 S | 4/2008 | Anderson |
| 7,360,912 B1 | 4/2008 | Savicki, Jr. |
| D576,566 S | 9/2008 | Wu et al. |
| D577,985 S | 10/2008 | Kidman |
| 7,506,990 B2 | 3/2009 | Glazner |
| 7,547,131 B2 | 6/2009 | Faunce et al. |
| 7,576,285 B1 | 8/2009 | Saviki, Jr. |
| D606,029 S | 12/2009 | Chou |
| 7,745,750 B2 | 6/2010 | Hewson et al. |
| 7,821,160 B1 | 10/2010 | Roosli et al. |
| 7,946,871 B1 | 5/2011 | Yu et al. |
| 8,003,886 B1 | 8/2011 | Rintz |
| D650,112 S | 12/2011 | Bryant |
| 8,148,637 B2 | 4/2012 | Davidson |
| 8,304,652 B2 | 11/2012 | McBain |
| 8,393,747 B2 | 3/2013 | Kevelos et al. |
| 8,511,866 B1 | 8/2013 | Mendez |
| 8,564,279 B2 | 10/2013 | Johnson et al. |
| 8,668,347 B2 | 3/2014 | Ebeling |
| 8,697,991 B2 | 4/2014 | Davidson |
| D719,699 S | 12/2014 | Bryant |
| 9,482,426 B2 | 11/2016 | Diotte |
| 2001/0046130 A1 | 11/2001 | Cunningham et al. |
| 2003/0013503 A1 | 1/2003 | Menard et al. |
| 2003/0124022 A1 | 7/2003 | Georges et al. |
| 2004/0247300 A1 | 12/2004 | He et al. |
| 2005/0264383 A1 | 12/2005 | Zhang |
| 2006/0065510 A1 | 3/2006 | Kiko et al. |
| 2006/0072302 A1 | 4/2006 | Chien |
| 2006/0161270 A1 | 7/2006 | Luskin et al. |
| 2006/0262462 A1 | 11/2006 | Barton |
| 2008/0073117 A1 | 3/2008 | Misener |
| 2008/0266121 A1 | 10/2008 | Ellul |
| 2009/0153438 A1 | 6/2009 | Miller et al. |
| 2009/0225480 A1 | 9/2009 | Baxter |
| 2009/0284385 A1 | 11/2009 | Tang et al. |
| 2011/0056720 A1 | 3/2011 | Davidson |
| 2011/0210833 A1 | 9/2011 | McNeely et al. |
| 2012/0008307 A1 | 1/2012 | Delany |
| 2012/0156937 A1 | 6/2012 | Almouli |
| 2012/0182172 A1 | 7/2012 | Sorensen |
| 2012/0215470 A1 | 8/2012 | Maguire |
| 2012/0316808 A1 | 12/2012 | Frader-Thompson et al. |
| 2013/0063848 A1 | 3/2013 | Thorpe et al. |
| 2013/0221868 A1 | 8/2013 | Diotte |
| 2015/0371534 A1 | 12/2015 | Dimberg et al. |

FOREIGN PATENT DOCUMENTS

| | | |
|---|---|---|
| KR | 1019930025223 | 6/1995 |
| KR | 1020080047328 | 11/2009 |
| KR | 1020090098056 | 4/2010 |
| WO | 2007122141 | 11/2007 |
| WO | 2012006812 | 1/2012 |

* cited by examiner

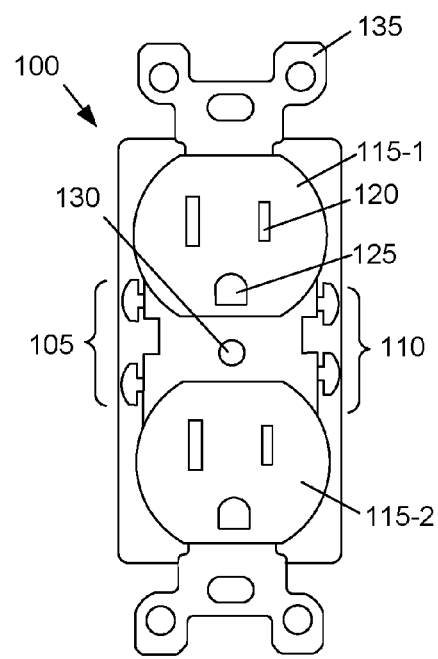
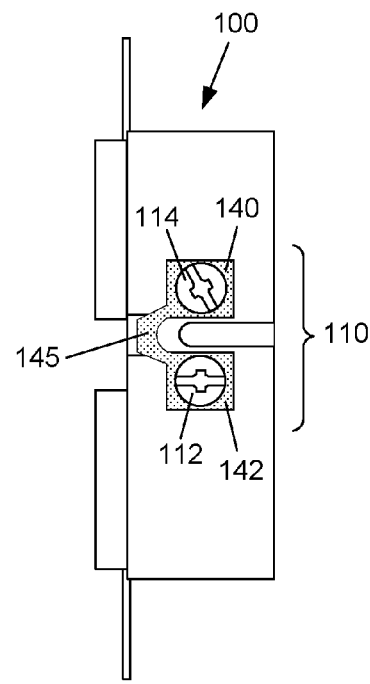
Fig. 1A            Fig. 1B
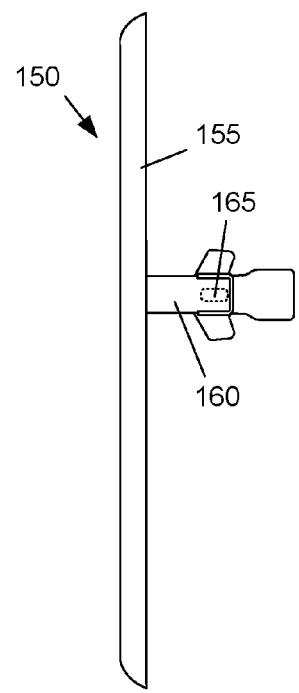
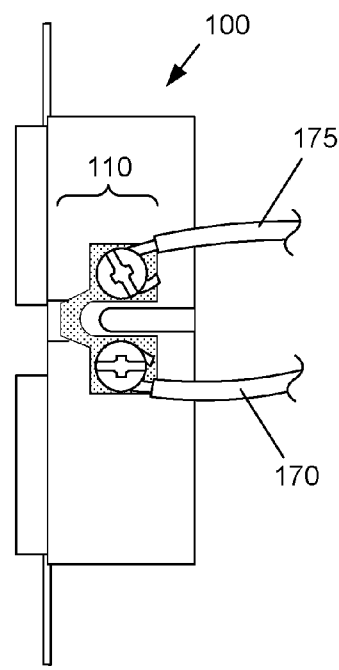
Fig. 1C

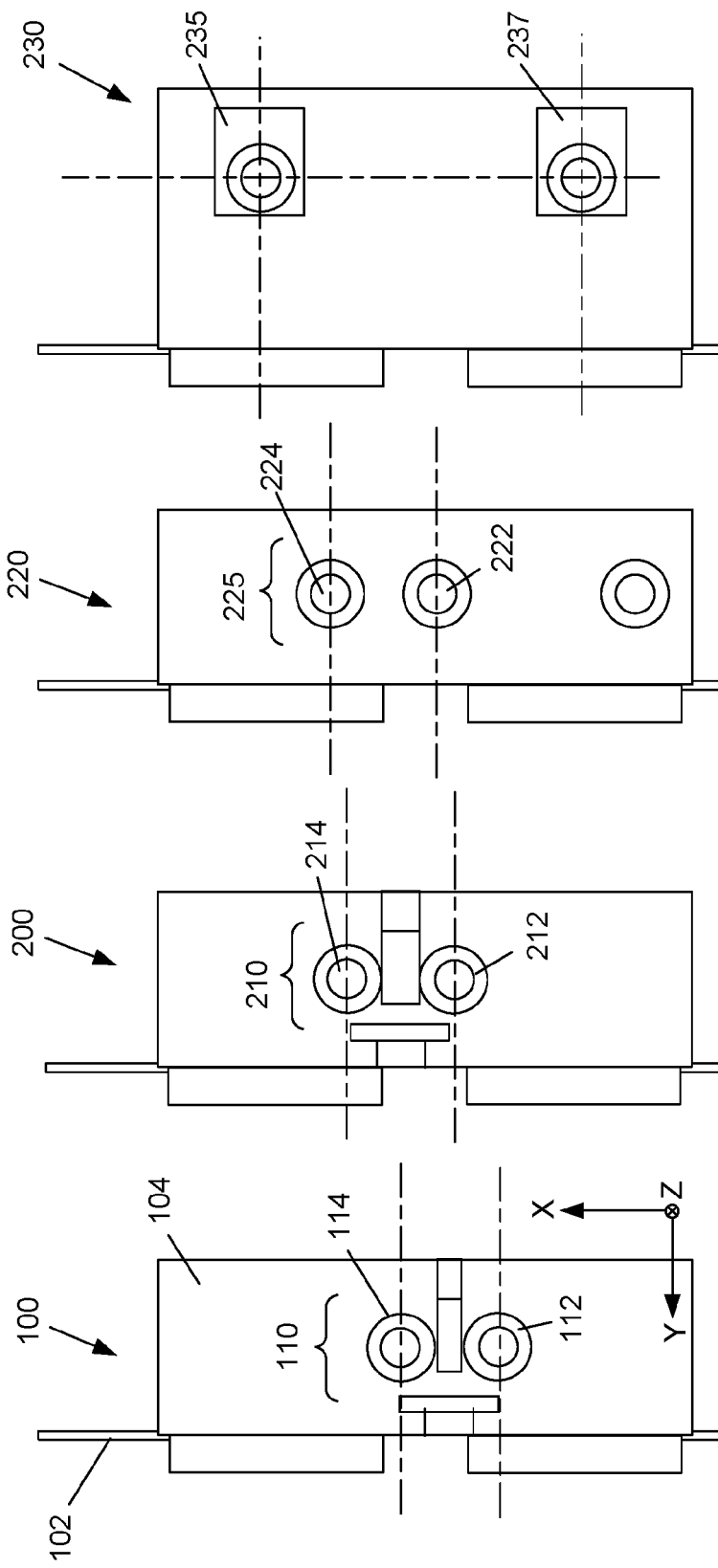

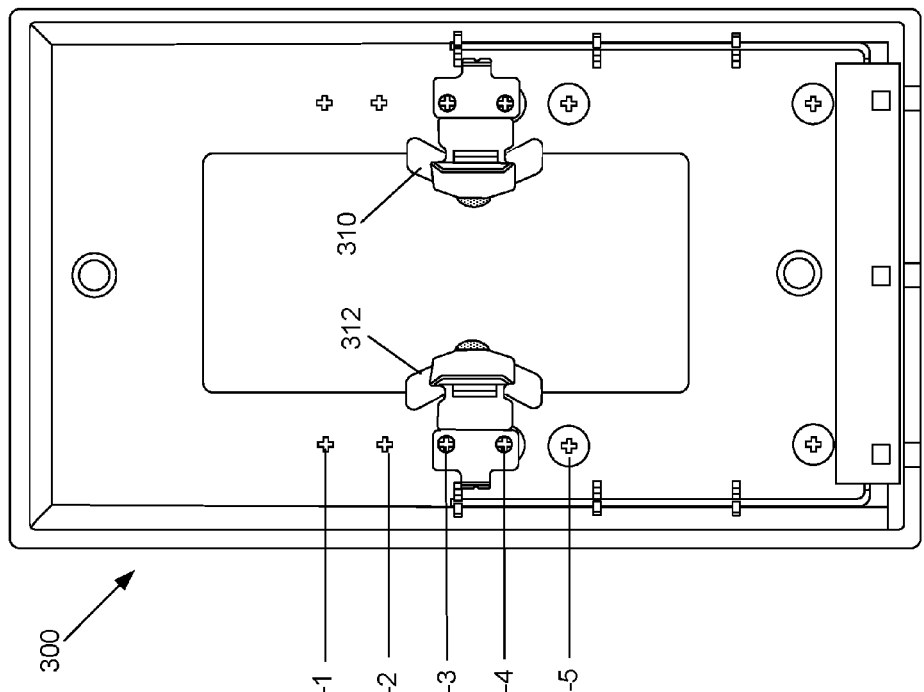
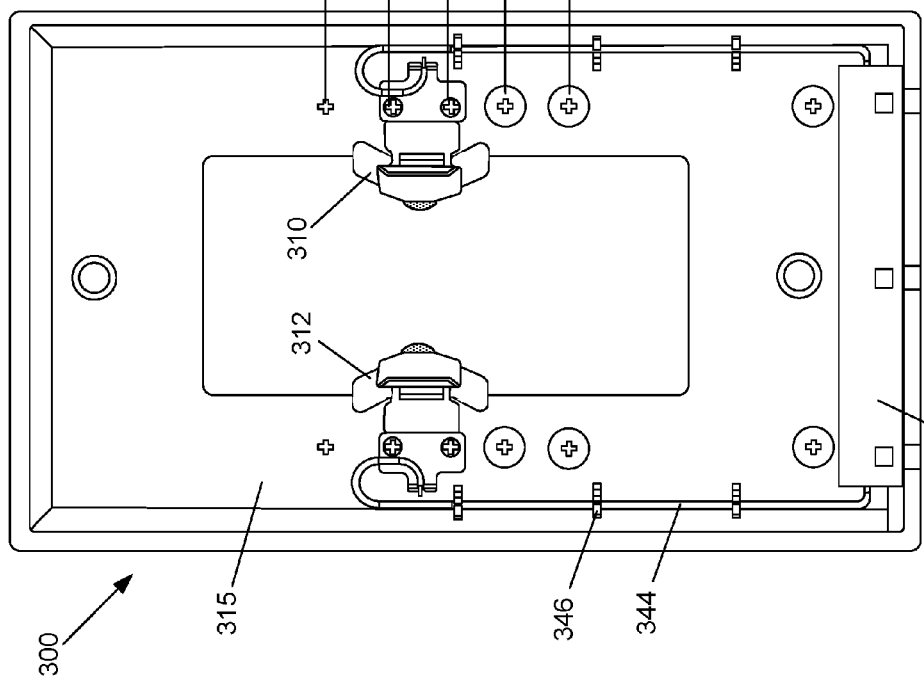

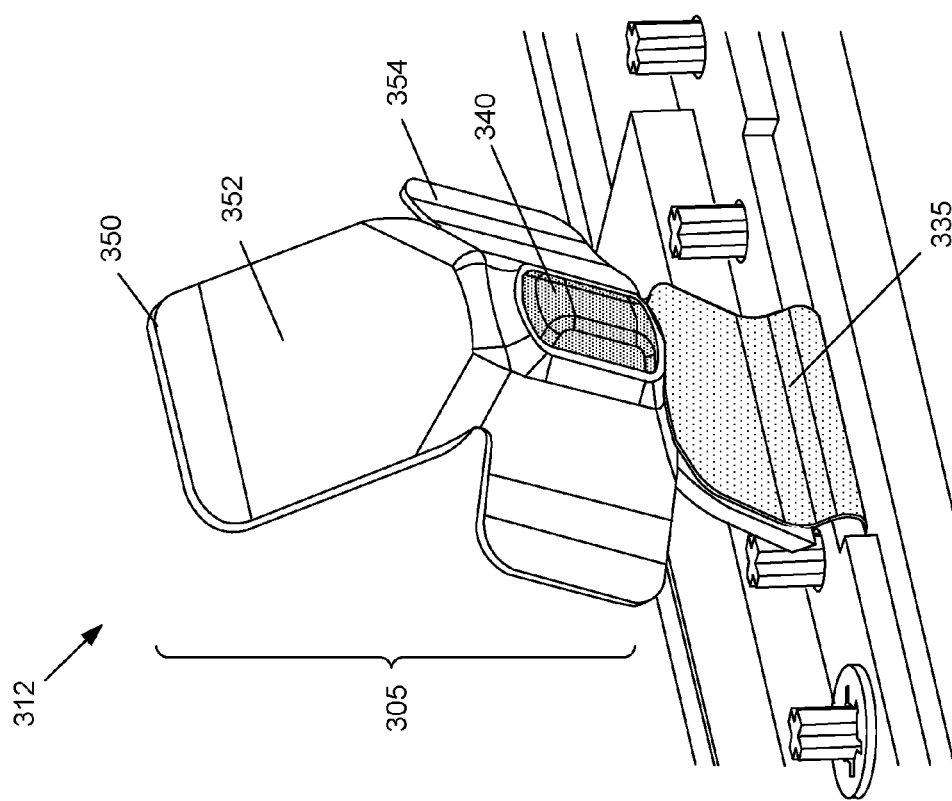

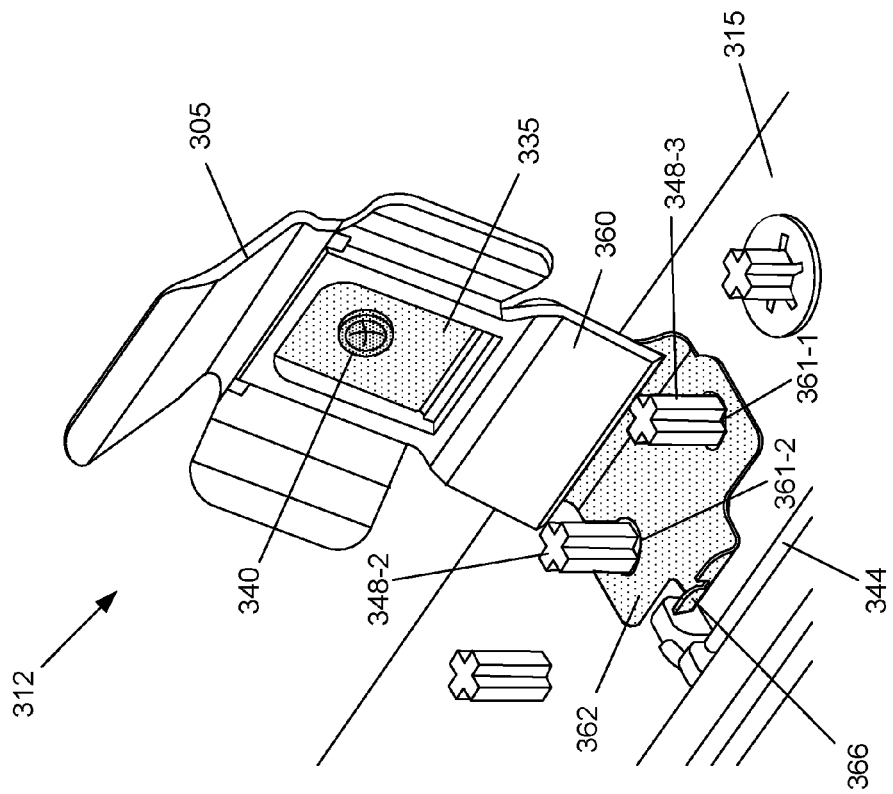
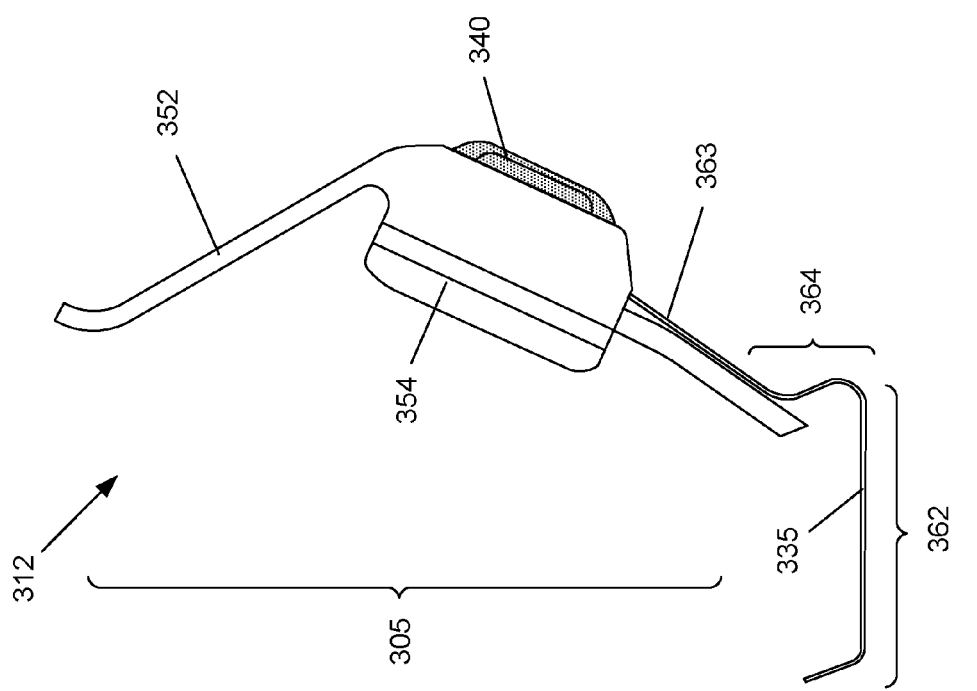
Fig. 3F
Fig. 3E

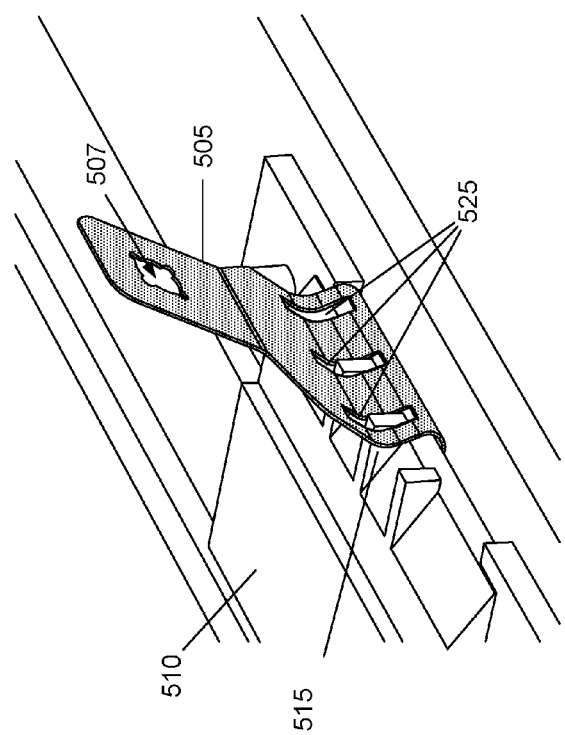
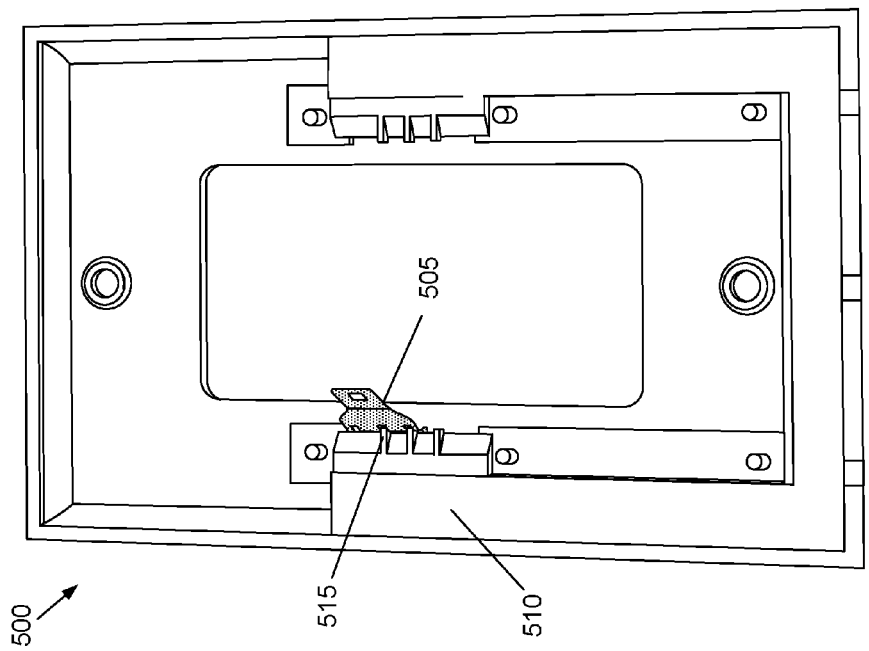
Fig. 5B
Fig. 5A

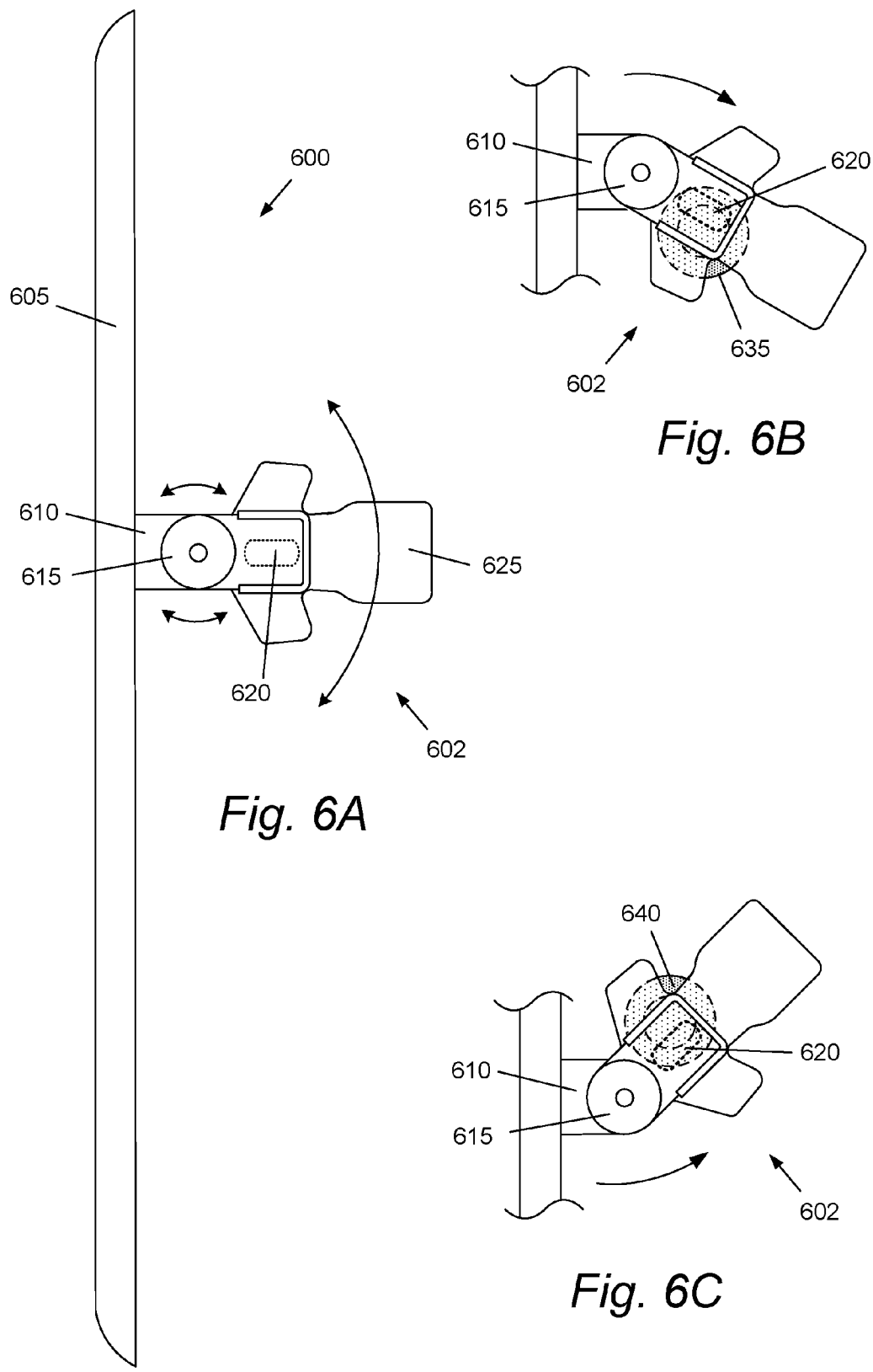

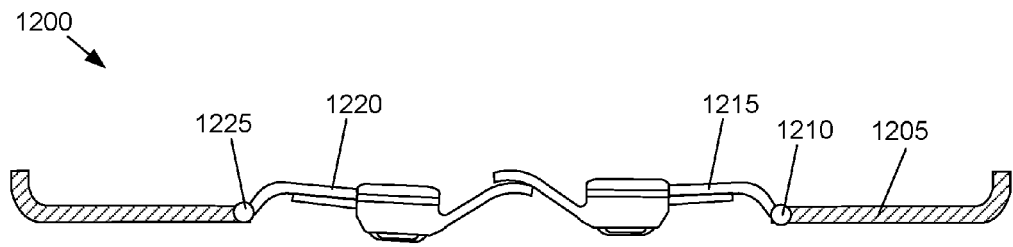
*Fig.12A*
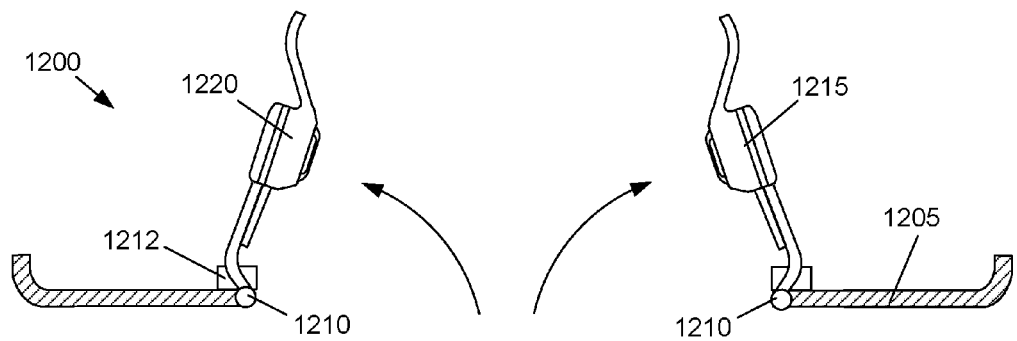
*Fig.12B*
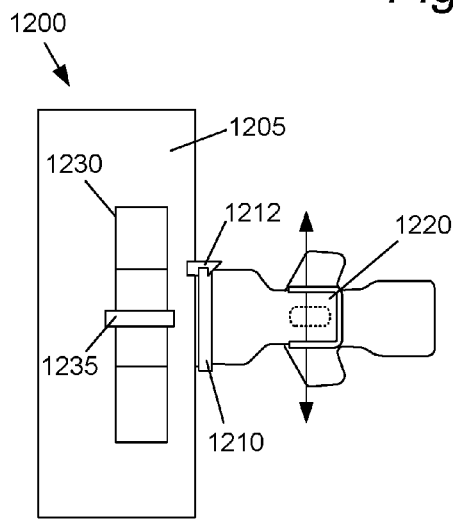 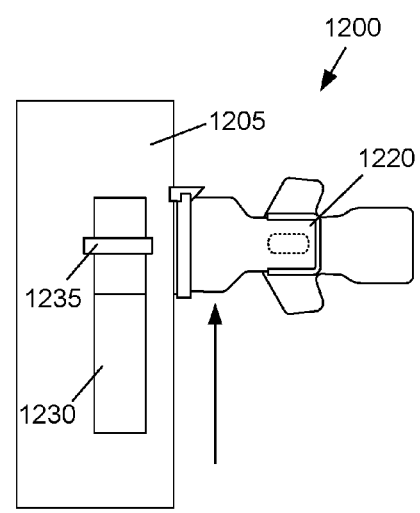
*Fig.12C*  *Fig.12D*

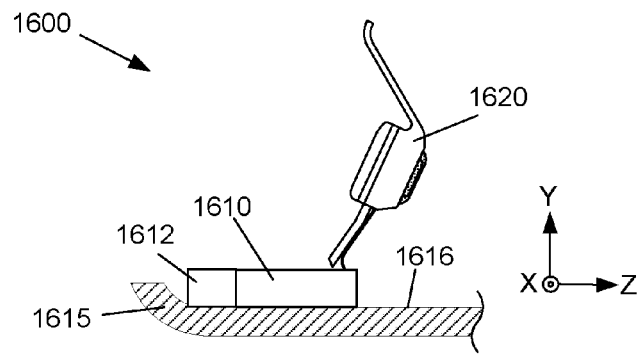
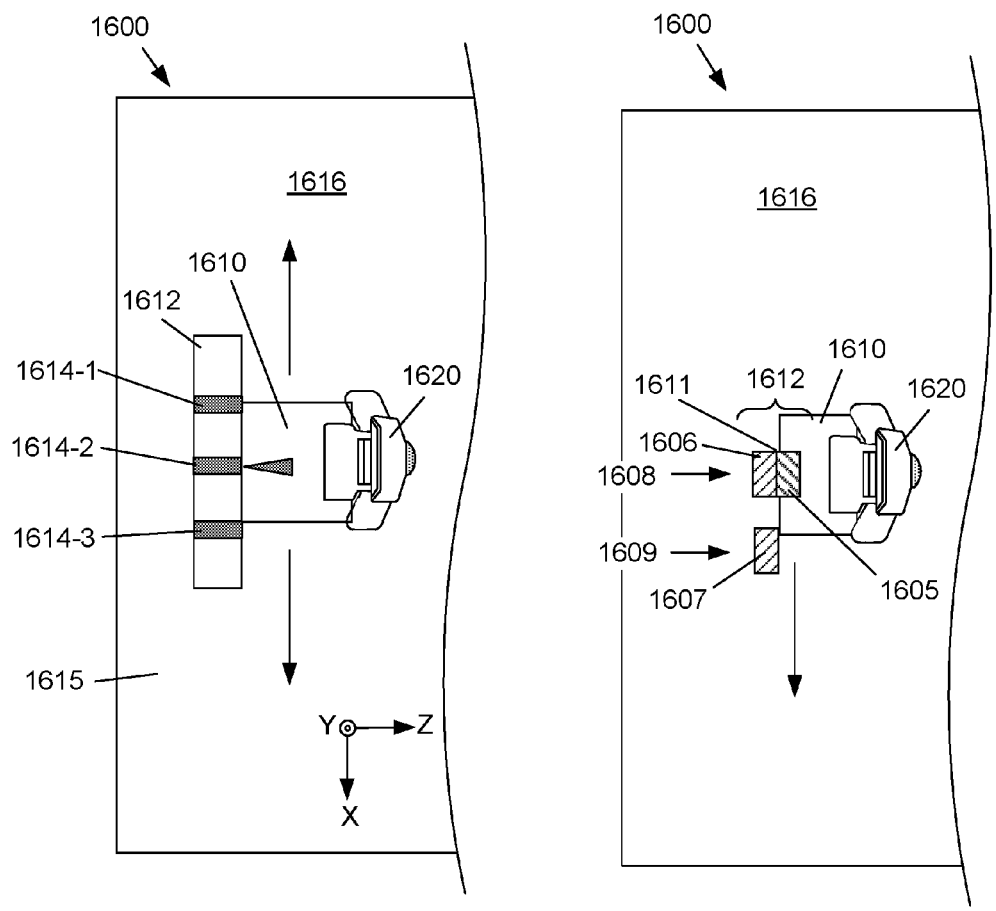
Fig.16A
Fig.16B
Fig.16C

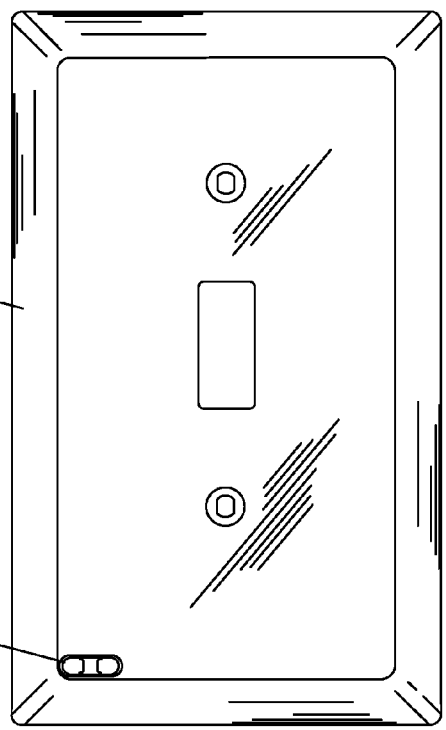
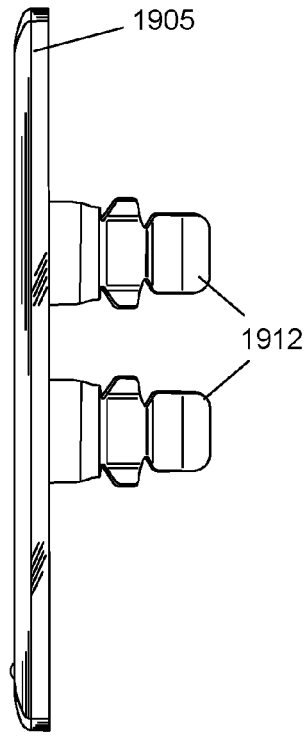
Fig. 19A    Fig. 19B
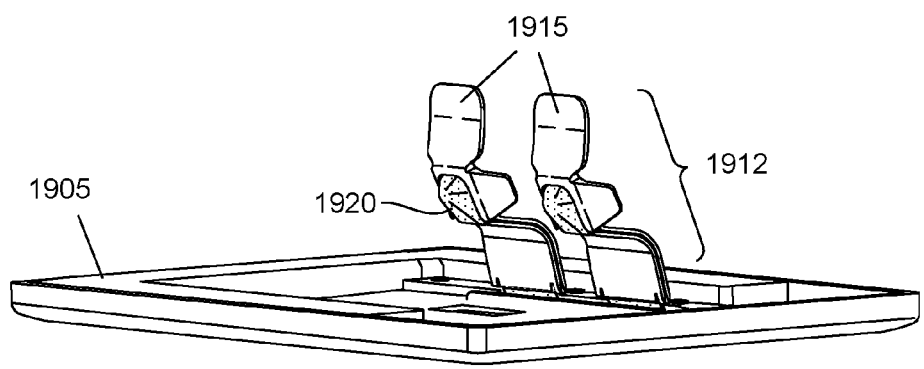
Fig. 19C

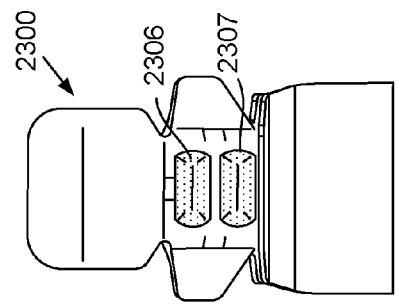
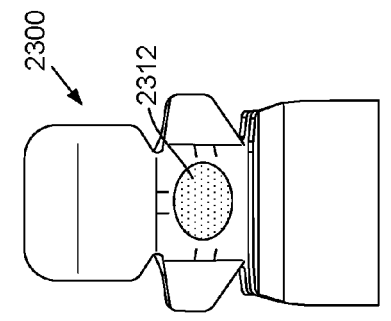
Fig. 23A
Fig. 23B
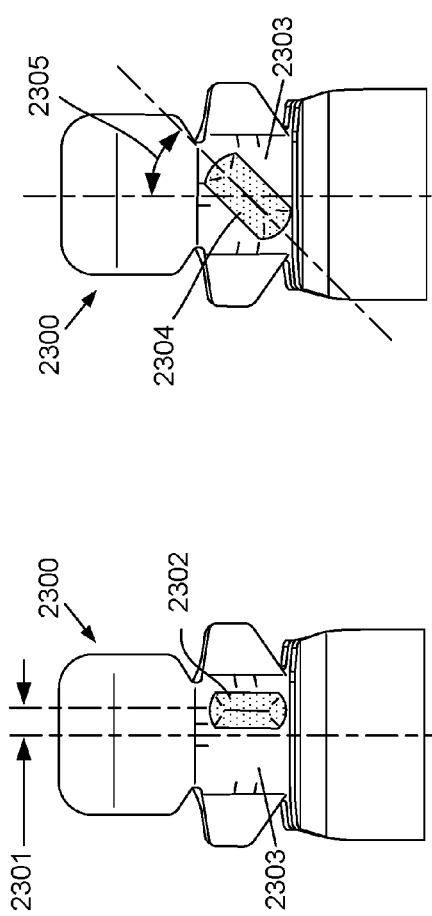
Fig. 23C
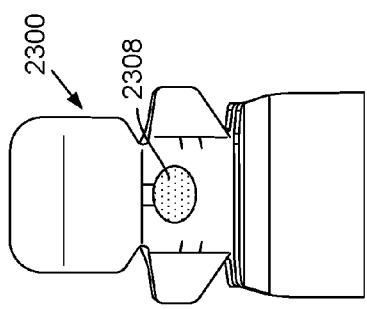
Fig. 23D
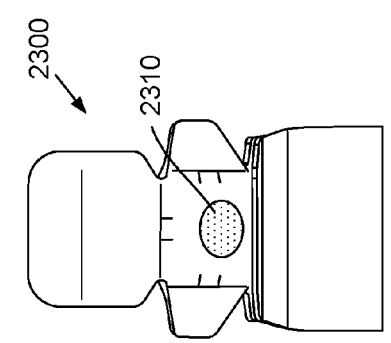
Fig. 23E
Fig. 23F

ACTIVE COVER PLATES

RELATED APPLICATIONS

The present application is a continuation-in-part, and claims the benefit under 35 U.S.C. §120, of U.S. patent application Ser. No. 14/549,143, filed Nov. 20, 2014, titled "Active Cover Plates," issued as U.S. Pat. No. 9,362,728, which is a continuation-in-part of U.S. patent application Ser. No. 14/066,621, issued as U.S. Pat. No. 9,035,180, filed Oct. 29, 2013, titled "Active Cover Plates," which is a continuation-in-part, and claims the benefit under 35 U.S.C. §120, of U.S. application Ser. No. 13/461,915, titled "Active Cover Plates", issued as U.S. Pat. No. 8,912,442, filed May 2, 2012, which claims the benefit under 35 U.S.C. §119(e) of U.S. Provisional Application No. 61/574,344, titled "Illuminated Cover Plate with Finger-like Contactors for Outlets and Light Switches", filed Aug. 1, 2011. Additionally, the present application claims priority under 35 U.S.C. §119(e) of U.S. Provisional Application No. 62/279,831, titled "Active Cover Plates", filed Jan. 18, 2016. These applications are hereby incorporated by reference in their entireties.

U.S. patent application Ser. No. 14/066,621 further claims priority to U.S. Provisional Application No. 61/720,131, filed Oct. 30, 2012, titled "Active Cover Plates"; U.S. Provisional Application 61/778,386, filed Mar. 12, 2013, titled "Modified Outlets for Use with Active Cover Plates"; and U.S. Provisional Application 61/836,972, filed Jun. 19, 2013, titled "Modified Electrical Devices", which applications are incorporated by reference in their entireties.

U.S. patent application Ser. No. 14/549,143 further claims priority under 35 U.S.C. §119(e) to U.S. Provisional Application No. 61/906,651, filed Nov. 20, 2013, titled "Powered Wall Plates with Multi-functions"; U.S. Provisional Application No. 62/027,784, filed Jul. 23, 2014, titled "Active Cover Plates"; and U.S. Provisional Application No. 62/081,539, filed Nov. 18, 2014, titled "Active Cover Plates." These applications are hereby incorporated by reference in their entireties.

BACKGROUND

Modern buildings include wiring to deliver electrical power to lights, outlets, and other devices. The connections to the electrical wiring are typically made in electrical boxes mounted in walls, ceilings, and floors. Outlets make connections to the electrical wiring using stab-in connectors or with screw terminals on the sides of the outlet body. After installation, a cover plate is placed over the outlet body to cover the opening to the box while allowing access to the outlet receptacles on the face of the outlet body. Similar connections are made when installing switches, which are also covered with a cover plate.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 1A-1C are views of an outlet and an active cover plate that fits over the outlet body, according to one example of principles described herein.

FIGS. 2A-2D are side views of different outlet bodies to illustrate the variability in the placement of screw terminals on the sides of the outlet bodies, according to one example of principles described herein.

FIGS. 3A-3G show examples of an active cover plate with spring clips having an insulated ramp portion, according to one example of principles described herein.

FIGS. 5A-5D show various structures for adjusting the vertical position of prongs on an active cover plate, according to one example of principles described herein.

FIGS. 6A-6C are diagrams of an active cover plate that includes a pivoting spring clip, according to one example of principles described herein.

FIGS. 12A-12D are diagrams of an active cover plate with hinged spring clips, according to one example of principles described herein.

FIGS. 16A-16F show various embodiments of active cover plates, spring clips and systems, according to one example of principles described herein.

FIGS. 19A-19C show various views of an active cover plate for toggle switch receptacles, according to one example of principles described herein.

FIGS. 23A-23F show various embodiments of electrical contacts on the spring clips, according to one example of principles described herein.

Throughout the drawings, identical reference numbers designate similar, but not necessarily identical, elements.

DETAILED DESCRIPTION

Figure 3A:
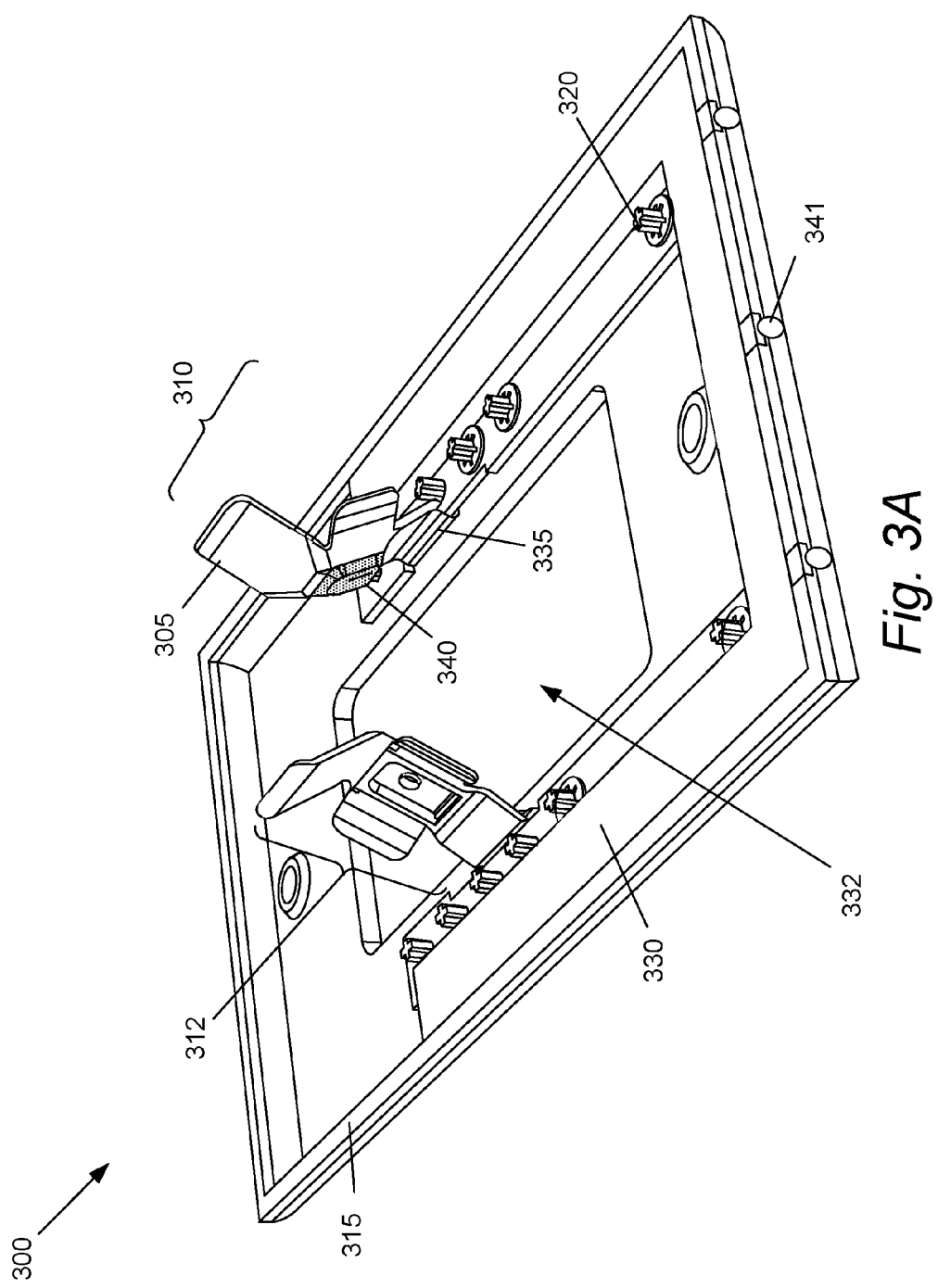

In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples.

Additionally, features shown and/or described in connection with one figure may be combined with features shown and/or described in connection with other figures. As used in the present specification and in the appended claims, the term "a number of" or similar language is meant to be understood broadly as any positive number comprising 1 to infinity; zero not being a number, but the absence of a number.

FIGS. 1A, 1B and 1C illustrate an outlet body (100) and connection of an active cover plate (150) to the outlet body. In this example, the outlet body (100) is a duplex style National Electrical Manufacturers Association (NEMA) outlet body. The outlet body (100) includes two outlet receptacles (115-1, 115-2). Each outlet receptacle (115) includes two power receptacles (120) and a ground (125).

On either side of the outlet body (100) are screw terminals (105, 110). The building wiring may be connected to the screw terminals by wrapping a stripped end of the house wiring around the screw and then tightening the screw to sandwich the wire between the bottom of the screw and a conductive plate. There may be a first screw terminal on a first side of the outlet body that is connected to a neutral building wire and a second screw terminal on the same or an opposite side of the outlet body that is connected to a hot building wire. For example, the left terminal (105) may be connected to the neutral building wire and the right terminal (110) may be connected to the hot building wire. The screw terminals make internal connections to contacts within the outlet body (100). When an electrical cord is plugged into the outlet receptacle (115-1), the blades of the electrical cord enter the slots (120, 125) in the power receptacles (115-1, 115-2) and make an electrical connection with the contacts. This allows current from the building wiring to pass through the outlet body (100) and into the cord. The outlet body (100) also includes two brackets/yokes (135) to connect it to an electrical box. A mounting aperture (130) can accept fastener to secure the cover plate in place over the outlet receptacle.

FIG. 1B shows a side view of the outlet body (100) showing the screw terminal (110). The screw terminal (110) in this example includes conductive backing plates (140, 142) and two screws (112, 114) that thread into the backing plates (140, 142). The backing plates (140, 142) are electrically and mechanically joined by a break off tab (145). The break off tab (145) can be removed to electrically isolate the first screw (112) and its backing plate (142) from the second screw (114) and its backing plate (140). This allows the individual outlet receptacles (115-1, 115-2) to be powered from different electrical wires/sources. The breakoff tabs (145) typically remain in place, but are removed when multiple higher current loads are present. This prevents one circuit from becoming overloaded. For example, in a kitchen, a microwave and a toaster (both have high current draw) may be plugged into the same outlet. Removing the break off tab (145) to create a split circuit allows the current required by the microwave to be drawn through a different circuit and circuit breaker than the toaster. This prevents overloading of an individual circuit and nuisance tripping of the breakers when both the microwave and toaster are used at the same time.

FIG. 1C shows an active cover plate (150) that is mounted over the outlet body (100). The active cover plate (150) includes a face plate (155) and two spring clips (160) extending rearward from the face plate. In this view only one spring clip is visible, the other spring clip is directly opposite (see FIG. 3A for a perspective view showing both spring clips). Each spring clip includes an electrical contact (165). When the active cover plate (150) is placed over the outlet (100), the two spring clips bring the electrical contacts (165) into contact with the screw terminals (110) on either side of the outlet body (100). The screw terminals (110) are electrified by their connection to the building wiring (170, 175). Ordinarily, the electrical contacts (165) make contact with the heads of the screws (112, 114) because the heads of the screws (112, 114) extend away from the outlet body (100) the farthest. This allows the active cover plate (150) to extract electrical power from the outlet body (100) through the spring clips (160).

Spring clips that extract electrical power from an outlet body or other receptacle body to power an active cover plate may have a number of advantages, including reliability and simplicity. However, the screw terminals may have a variety of positions on the side of the outlets. The location of the screw terminals varies according to the type of outlet body and the manufacturer. While dimensions on the face of the outlet body are generally consistent, the variance in the location of the screw terminals on the sides of the outlet body can produce a significant challenge in creating an active cover plate that fits most or all of the outlets present on the market and/or installed in buildings.

An outlet body is only one example of an electrical device that an active cover plate could interface with. Other examples include switch bodies and electrical boxes with connections for lights, fire alarms, CAT5 cable connections, phone jacks, or other installations over or in electrical boxes. In general, a body that a cover plate of any type fits over is referred to as the "receptacle body."

FIGS. 2A-2D show four different examples of outlet bodies (100, 200, 220, 230) that illustrate the differences in placement of the screw terminals on the sides of the outlet bodies. FIGS. 2A, 2B, and 2C show side views of duplex style outlet bodies (100, 200, 220). The screw terminals show a significant amount of variability between these three outlet bodies (100, 200, 220). The outlet body (100, FIG. 2A) on the left has a screw terminal (110) with two screws (112, 114). The screws (112, 114) are located slightly more than halfway down the outlet body (100). These screws (112, 114) are closer together than any of the other screws shown in FIGS. 2B, 2C, and 2D. An XYZ axis is shown on the lower right of the outlet body (100) in FIG. 2A. The screws may have varying location in any of the X, Y, and Z directions. Variations in the X direction are called vertical variations and are in the plane of the face (102) of the outlet body. Variations in the Y direction are called depth variations and are in the plane of the side (104) of the outlet body. FIGS. 2A-2D show both vertical and depth variations in the locations of the screws. Variations in the Z direction (into and out of the page and across the face of the outlet body) are called width or horizontal variations. Width variations can occur for a variety of reasons. For example, the outlet bodies may have different widths or screws may be screwed out or in on the sides of the outlet bodies. The flexibility of the spring clips can typically accommodate a significant amount of variation in width. However, variations in the horizontal and vertical directions can be challenging to accommodate.

The outlet body (200) in FIG. 2B has a screw terminal (210) that is located more than halfway up the side. The heads of the screws (212, 214) are spaced farther apart than the screw terminals in the outlet body (100) to the left. FIG. 2C shows an outlet body (220) with a screw terminal (225) that is located even higher up the side of the outlet body (220). The screws (222, 224) have the same spacing as the outlet body in FIG. 2B. FIG. 2D is a side view of a ground fault circuit interrupter (GFCI) outlet body (230). The screw terminals (235, 237) in this outlet body (230) are placed farther apart and significantly farther back from the face of the outlet. The examples shown in FIGS. 2A-2D are only examples. The screws and screw terminals can be located in a variety of positions on various receptacle bodies. For example, the screw terminals on switch bodies can be in different locations than on outlet bodies.

Thus, there can be a significant amount of variability in the location of the screw terminals in outlet bodies that are in use and/or on sale. Where the screw terminals are not symmetrical about the centerline, the screws will be at a different location with respect to the electrical box and cover plate depending on the orientation of the outlet body. For example, if the outlet body were installed right side up, the screw terminals would be at a first vertical height and if the outlet body were installed upside down the screw terminals would be at a different vertical height.

Creating an active cover plate that has the capability to reliably connect to a wide range of outlet bodies can be a significant challenge. An additional complication is that the screws in the screw terminal may be screwed out or in. This can significantly change the width that the prongs of the active cover plate have to open. As discussed above, there are at least three different types of adjustability that could be desirable in active cover plate prongs: vertical adjustability (in the X direction) to accommodate outlet bodies that are at different heights on the outlet body, depth adjustability (in the Y direction) to accommodate screw terminals that are at different depths from the face of the outlet body, and width adjustability (in the Z direction) to accommodate screw terminals that have varying widths.

FIGS. 3A-3F show one example of active cover plate (300) with spring clips (310, 312) that are adjustable vertically and in width. FIG. 3A is a rear perspective view of the active cover plate (300) for a "decora" style outlet body. The active cover plate (300) includes a face plate (315) with an aperture (332) through which the outlet receptacles in the outlet body are accessible. The active cover plate (300) also includes spring clips (310, 312) and a sandwich plate (330). The spring clips (310, 312) include a compliant conductive portion (335) with one end that is sandwiched between the face plate (315) and the sandwich plate (330). In this example, a rectangular rivet (340) and a non-conductive portion (305) are connected to an opposite terminal end of the compliant conductive portion (335). The spring clips (310, 312) and sandwich plate (330) could be fastened to the face plate (315) using a number of techniques, including heat staking, cold pressing, or using fasteners that are pressed over the posts (320). When placed over an outlet body, the rivets/electrical contacts (340) on the spring clips (310, 312) contact the electrified screw terminals on the sides of the outlet body to extract power from the building wiring/outlet body. Although this active cover plate (300) is only illustrated with two opposing spring clips (310, 312), an active cover plate may have any number of spring clips.

FIGS. 3B and 3C are rear views of the active cover plate (300) with the spring clips (310, 312) in different vertical locations. For purposes of illustration the sandwich plate (330, FIG. 3A) has been removed to show the interior components. Wires (344) connected to the spring clips (310, 312) are routed through the wire brackets (346) to a load. The load can include any electrical device that requires power. For example, the load can include an electrical device embedded within the active cover plate (300). For example, the load can include lights, motion detectors, photocells, wireless nodes, blue tooth connectors, smoke detectors, carbon monoxide detectors, cameras, heat detectors, speakers, microphones, charging circuits or any other desired electrical device. In this example, the load is a circuit board (342) that includes three light emitting diodes (LED) that shine downward and out of the face plate. LEDs can produce high intensity light with less power than conventional light sources. In particular, LEDs convert a higher percentage of input power to light and a lower percentage to heat or other waste.

The face plate (315) includes a number of molded posts (348-1, 348-2, 348-3, 348-4 and 348-5) that extend rearward. The vertical location of the spring clips (310, 312) can be adjusted by selecting which of the posts the spring clips are placed over. In the configuration shown in FIG. 3B the spring clips are mounted to the second post (348-2) and the third post (348-3). This position allows the active cover plate (300) to make secure electrical connections with an outlet body in a first configuration (for example, an outlet body that is installed right side up).

In the second configuration shown in FIG. 3C, the active cover plate (300) has both of the spring clips (310, 312) in a lower vertical position, with the spring clips (310, 312) mounted on the third post (348-3) and fourth post (348-4). This position allows the active cover plate (300) to make secure electrical connections with an outlet body in a second configuration (for example, an outlet body that is installed upside down). Alternatively, the spring clips' vertical positions could be adjusted to accommodate different designs of outlet bodies. The other posts, the first (348-1) and fifth posts (348-5) may be used to connect the sandwich plate (330, FIG. 3A) to the face plate (315) and/or for further adjustability of the spring clips.

FIGS. 3D-3G are additional views of a spring clip (312) that could be used in conjunction with the cover plate shown in FIGS. 3A and 3B. FIGS. 3D, 3E, and 3F are front perspective, side, and rear perspective views of an illustrative spring clip, respectively. FIG. 3D shows a front perspective view of a spring clip (312) that includes a conductive portion (335) and a non-conductive portion (305). The non-conductive portion (305) has a main ramp (352), side wings (354), and terminal curve (350). The non-conductive portion (305) may have a variety of purposes including preventing the conductive portion (335) from undesirably contacting wires, the electrical box, or other materials.

The non-conductive portion (305) of the spring clip (312) can be formed from a variety of insulating materials, including polymers, ceramic, composite materials, or other material. In this example, the non-conductive portion is formed from a flexible resilient polymer material such as nylon. The non-conductive portion (305) can be formed in a variety of ways, including injection molding.

In this example, the non-conductive portion (305) is attached to the terminal end of the conductive portion (335) by the rivet (340). Additionally or alternatively, a number of other techniques can be used to attach the non-conductive portion (305) to the conductive portion (335). For example, the non-conductive portion (305) may be joined to the conductive portion (335) by adhesive, heat welding, press fit, snap fit, induction welding (for specific types of materials), ultrasonic welding/staking, and other suitable techniques. These techniques can be used separately or in combination. For example, the rivet joint may be supplemented with molded features on the non-conductive portion. As discussed above, the riveted connection between the non-conductive portion and conductive portion has a number of advantages, including using the head of the rivet (340) as a contact point and the swaging of the rivet (340) into/over a hole in the conductive portion (335) to ensure that there is a reliable electrical connection between the rivet (340) and the conductive portion (335) (see e.g. FIG. 3F).

The non-conductive portion (305) can serve a variety of functions. As discussed above, the non-conductive portion (305) includes an angled end portion or a main ramp (352), a terminal curve (350) and two side wings (354) that extend to either side of the central portion of the spring clip (312). The non-conductive portion (305) serves as a guide that directs the active cover plate into accurate positioning over an outlet/switch body. Where there are opposing spring clips, the angled ramp (352) guides and centers the active cover plate (300, FIG. 3A) over the outlet/switch body. In situations where an active cover plate (300, FIG. 3A) is misaligned or has less clearance, the non-conductive portion (305) may contact the wall of an electrical box. The terminal curve (350, FIG. 3D) ensures that the spring clip (312) glides smoothly along the wall. The spring force of the conductive portion (335) and ramp geometry of the non-conductive portion (305) gently guides the active cover plate (300, FIG. 3A) into place with increasing accuracy as the active cover plate (300, FIG. 3A) is pushed closer to its final position.

The non-conductive portion (305) is contoured so that the electrical contact (the head of the rivet (340)) does not have any exposed edges that may snag on the outlet body, wires, or screws. The side wings (354) allow for the spring clip (312) to glide up and down over the screws and screw terminals. There may be vertical misalignment between the active cover plate and the receptacle body/screw terminals during the installation process. To achieve the desired alignment, and to allow the active cover plate to fit around the face of the receptacle body and to align the fastener aperture in the cover plate with the threaded hole in the outlet body, the active cover plate may be slid up and down with respect to the receptacle body. For example, a user may have engaged the active cover plate too low on the receptacle body and needs to move it up to align the cover plate with the outlet body. The side wings (354) and smooth contours of the spring clip (312) created by molding the central portion of the non-conductive portion (305) to match/mate with the surface of the installed rivet (340) allow the spring clip to glide smoothly over the screws. The side wings (354) progressively bend the spring clip (312) backwards (in the Z direction) to lift it over obstacles (such as screw heads and contours of the receptacle body).

In this example, the head of the rivet (340) is rectangular, with the major axis of the rectangular head oriented to provide contact with screw terminals/screws that have a variety of depths (distances from the front face of the outlet body). The narrow width of the rivet head reduces the likelihood of arcing if the screw terminal has been divided into two separate electrical elements by removing the breakout tab in the middle of the screw terminal. This geometry is only one example. A variety of other electrical contact geometries could be used. Additionally, the flexible conductive portion is angled inward to present the rivet head at a desired angle and to provide for a large range of motion of the spring clip outward (Z direction). This accommodates receptacle bodies of varying width and screws that are screwed outward from the screw terminals.

FIG. 3E is a side view of the spring clip (312) that shows various components of the flexible conductive portion (335). In this example, the flexible conductive portion (335) includes a base portion (362), an "S" shaped curve connected to the base portion (364), and an angled portion (363). The angled portion (363) directs the rivet (340) inward toward the outlet body. In this example, the rivet (340) is the most prominent portion of the spring clip and extends farthest inward toward the outlet/receptacle body. Both the side wings (354) and the main ramp (352) are angled away from the outlet body, with the base of the side wings and ramp joining with the center of the non-conductive portion (305) containing the rivet (340) and the ends of the side wings (354) and ramp (352) extending away from the outlet body.

The flexible conductive portion (335) may include a variety of compound curves that increase its flexibility and resilience in allowing the motion/travel of the spring clip toward and way from the outlet/switch body (width adjustment in Z direction). One example of this is the "S" shaped curve (364). The "S" shaped curve may serve several functions. The "S" shaped curve can provide increased flexibility to the spring clip by providing two separate curvatures that bend. The "S" shaped curve also allows for more bending/travel of the spring clip before the permanent deformation of the conductive portion because the bending is distributed over two locations rather than one.

FIG. 3F shows a rear perspective view of the spring clip (312). The end of the conductive portion (335) has a reduced width and interfaces with the non-conductive portion (305). The center of the conductive portion (335) with reduced width has an aperture through which the rear of the rivet (340) passes. The rear of the rivet (340) is then swaged (mushroomed) over the aperture as shown in FIG. 3F to make the connection between the flexible conductive portion (335) and the rivet. The non-conductive portion (305) is sandwiched in between the rivet (340) and the conductive portion (335). In this example, the nonconductive portion (305) also includes a skirt (360) that covers the rear of the conductive portion and prevents undesirable electrical contact and arcing. In some examples, the rearwardly facing portion of the rivet and conductive portion may also be electrically insulated.

The width of the conductive portion (particularly the S shaped portion, 364) may create a significant resistance to undesirable twisting or bending forces. This undesired motion tends to occur when the active cover plate is being moved vertically with respect to the outlet/switch body and the spring clip is moving over the screws/screw terminals. The relatively high stiffness of the spring clip in this direction prevents twisting/deformation during this operation, while the much lower stiffness of the spring clip in the perpendicular direction (motion toward and away from the screw terminals, along the Z-axis) allows for the spring clip to move smoothly over the screws/screw terminals.

FIG. 3F also shows how the spring clip (312) is secured to the face plate (315) and makes an electrical connection with the wire. The spring clip (312) includes a base portion (362) with a number of apertures (361-1, 361-2). The apertures are configured to receive various alignment and anchor features that are molded into the face plate (315). As discussed above, there may be a number of equally spaced press nut posts (348) or other type of posts in the face plate (315). In this embodiment, the apertures (361-1, 361-2) in the base portion (362) are configured to accept any two adjacent posts (348). In this example, the spring clip (312) has been placed over the second and third posts (348-2, 348-3). By selecting which posts (348) the apertures are placed over, the vertical position of the spring clip (312) can be selected during manufacturing without having to manufacture different face plates (315), spring clips (312) or sandwich plates. The connection between the wire (344) and the spring clip (312) maybe made using a wire attach feature (366) on the base portion (362) or in any other appropriate manner. The wire attach feature (366) may include a slot into which a stripped wire can be placed. The conductor can then be soldered to the wire attach feature. The wire (344) can be cut to the desired length or can be long enough to accommodate all vertical positions of the spring clips (312).

Figure 3G:
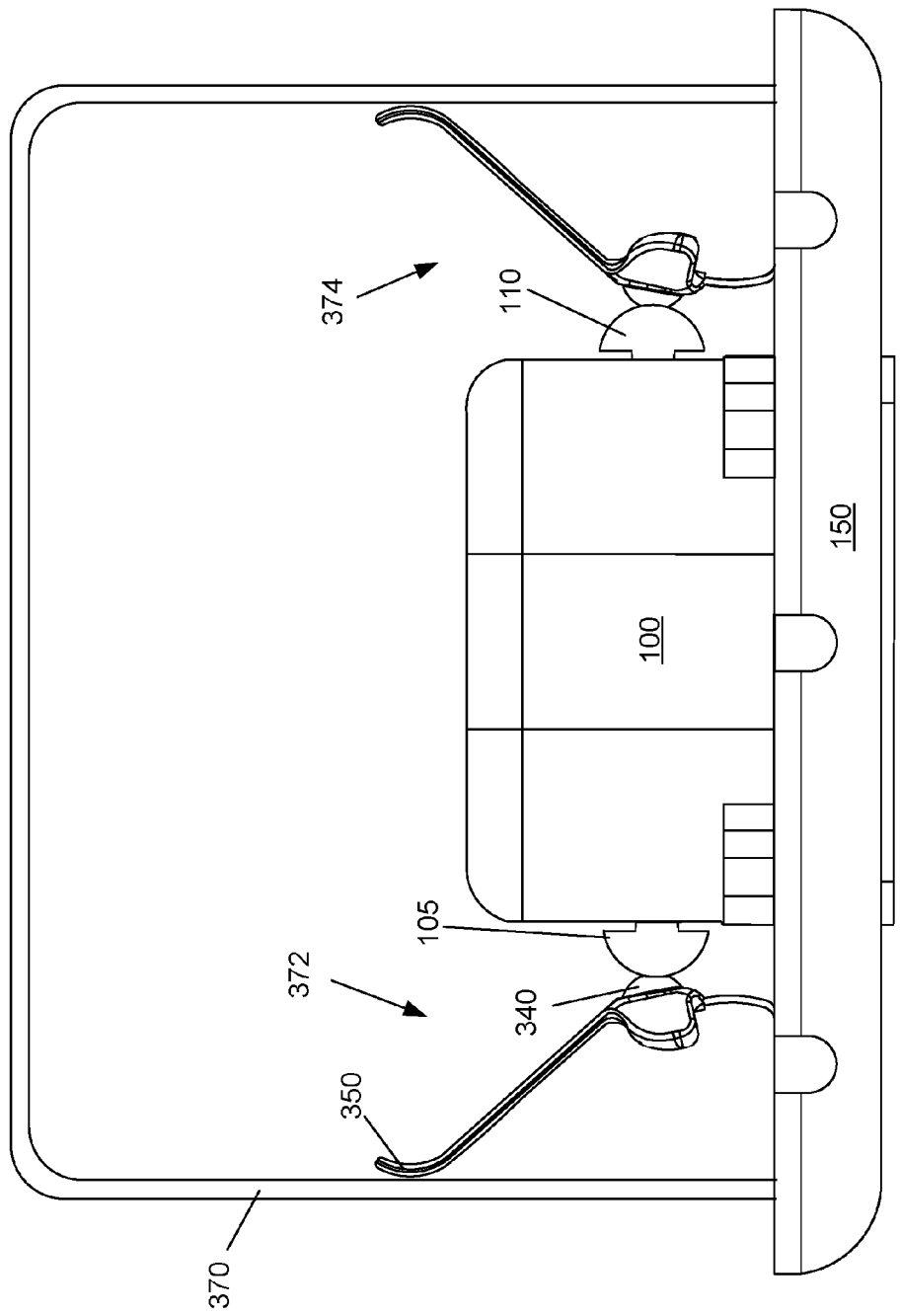

FIG. 3G is a cross sectional end view of an active cover plate (150) that is fastened over an outlet body (100) installed in an electrical box (370). A left spring clip (372) makes electrical contact with a left hot screw terminal (105) and a right spring clip (374) makes electrical contact with a right neutral screw terminal (110). In this example, the terminal curves (350) of the insulating main ramps (352, FIG. 3D) contact the inside walls of the electrical box (370). This occurs when the spring clips (372, 374) are bent outward. The terminal curves (350) allow the spring clips (372, 374) to slide along the wall and also provide additional support to the spring clips (372, 374) to prevent over bending and plastic deformation of the flexible conductive portion (335, FIG. 3D) of the spring clips. Contacting the sides of the box also provides additional force that presses the contacts into a more secure connection with the screw terminal.

The illustrations in FIG. 3A-3G show various examples of spring clips that can be adjusted during assembly of the active cover plate. This allows for multiple types of active cover plates to be constructed with common parts. The same principles could be applied to allow for adjustment of the spring clips by the end user after production. The examples and specific embodiments described herein are only illustrative and are given to illustrate principles that can be implemented in a variety of ways.

FIGS. 4A-4D show an example of an active cover plate that can be adjusted either during or after assembly of the active cover plate. In one example, the spring clips can be adjusted after the active cover plate is completely assembled. As discussed above, the screw terminals on outlet and switch bodies may be formed in a variety of locations. To accommodate the widest number of outlets or switches, the active cover plate may include multiple position spring clips. The spring clips may be moved vertically to reposition the spring clips to more effectively contact the screw terminals.

Figure 4A:
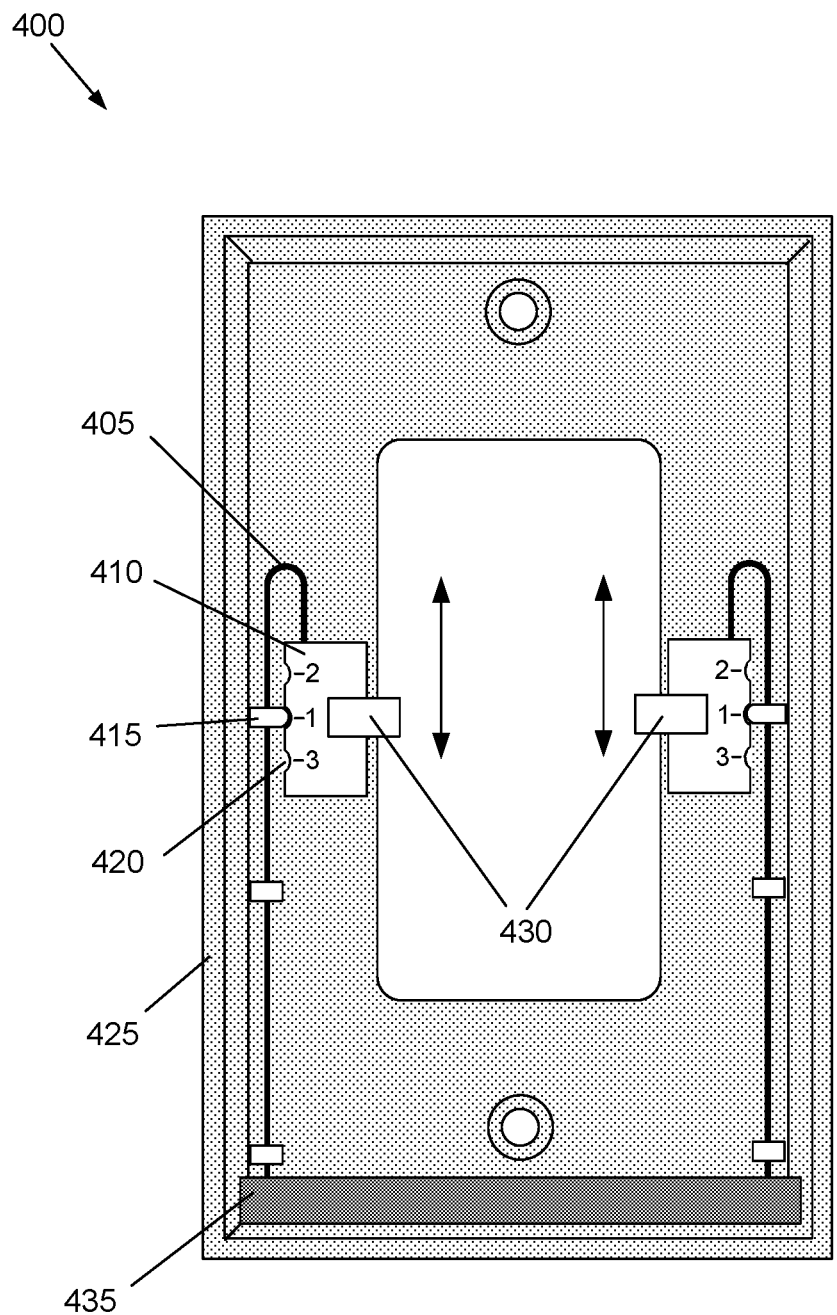
FIGS. 4A-4D are diagrams of an active cover plate with adjustable spring clips, according to one example of principles described herein.

FIG. 4A is a rear view of a universal active cover plate (400) with multiple position spring clips (430) that slide vertically or have multiple vertical positions to better connect to outlet/receptacle bodies with different orientations or different screw terminal placement. For example, outlet bodies that are installed right side up (ground prongs on the bottom) or upside down (ground prongs on the top) may have screws in different vertical positions. By allowing the multiple position spring clips (430) to be vertically adjusted with respect to the face plate (425), a single face plate design can accommodate both upside down and right side up outlet body installations as well as receptacle bodies with different screw terminal locations.

In the example shown in FIG. 4A, the multiple position spring clips (430) include a sliding base (410) with numbered notches (420) along one side. A detent (415) engages with the notches (420) to secure the sliding base in the desired position. In this example, there are three positions for the sliding base. The multiple position spring clips (430) are connected to the sliding bases (410) and move with the bases (410). The sliding base (410) may move in a track that is molded into the face plate (425) and may be held in place by a back plate or sandwich plate. The motion of the sliding base is in the plane of the face plate (425) and is illustrated by the double headed arrows. The spring clips can be individually adjusted to different locations if desired.

A flexible conductor (405) connects the multiple position spring clip (430) to the circuit board (435). The flexible conductor (405) has slack to accommodate motion of the sliding base (410). For example, the flexible conductor (405) may be stranded wire or a laminated ribbon cable.

Figure 4D:
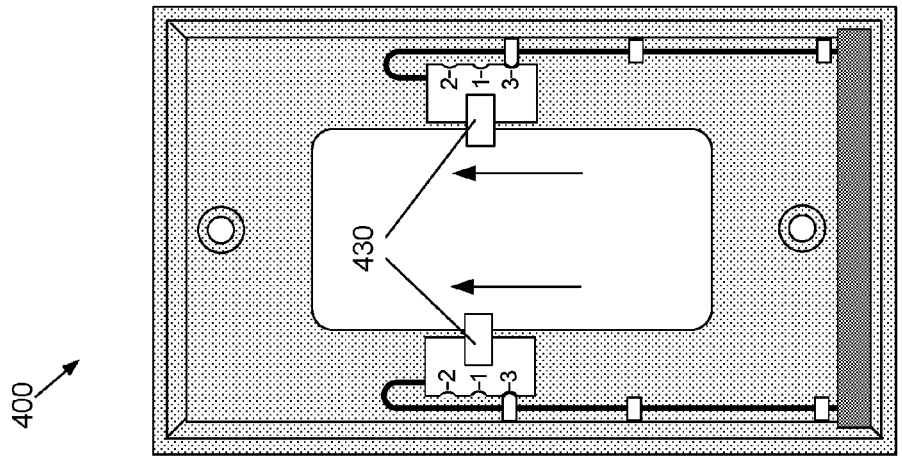
Figure 4C:
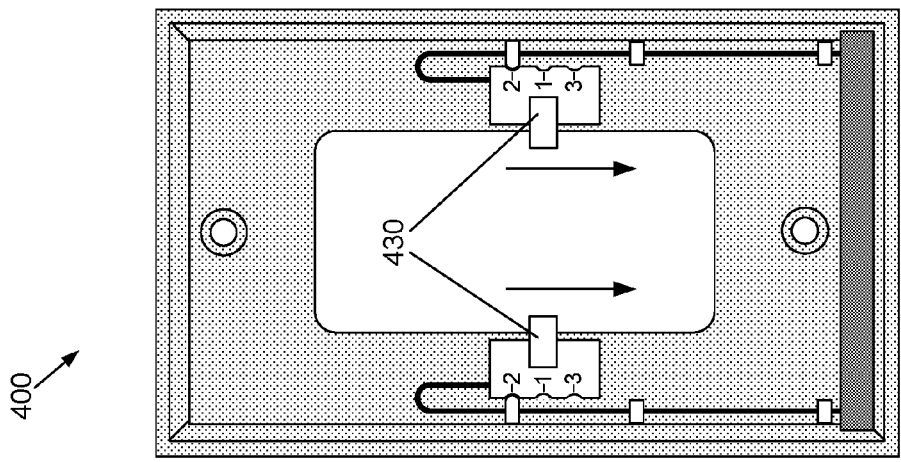
Figure 4B:
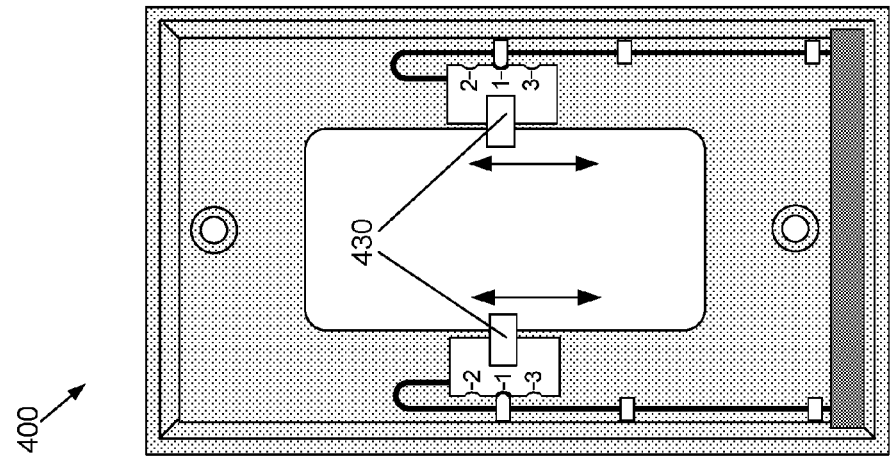

FIGS. 4B, 4C and 4D show the multiple position spring clips (430) in various positions on the face plate (400). The multiple position spring clips (430) may be moved by applying manual pressure to the sliding base (410, FIG. 4A) so that the detent (415, FIG. 4A) slides out of a first notch and into a second notch. FIG. 4B shows the multiple position spring clips (430) in a nominal position ("position 1") that allows the multiple position spring clips (430) to contact the screw terminals on the majority of outlets. From position 1, the spring clips can be adjusted either up or down as shown by the double headed arrows. FIG. 4C shows the spring clips (430) pushed down into position 2. The multiple position spring clips (430) may be moved together or separately, depending on the situation. FIG. 4D shows the spring clips (430) moved up to position 3. The combination of positions 1, 2, and 3 are designed to allow the spring clips to make electrical contact with a majority of screw terminals in a particular class of receptacle bodies. As shown below, the spring clips could also have adjustable depths to reach screw terminals that are deeper or shallower in the receptacle box.

FIGS. 5A and 5B show one example of an active cover plate (500) that includes a spring clip (505) that can be adjusted to have multiple vertical positions. In this example, the protrusions (515) on the sandwich plate (510) engage with slots (525, FIG. 5B) in the spring clip (505). In this example, the spring clip (505) is shown without the nonconductive portion and rivet. The hole (507) through the conductive portion is shown. The nonconductive portion is placed over the narrow end of the conductive portion and the rivet is placed through a hole in the nonconductive portion and through the hole (507) in the conductive portion. The rivet is then swaged in place. As discussed above, this fastens the nonconductive portion to the conductive portion and makes an electrical connection between the rivet and the conductive portion.

The engagement between the slots (525) in the spring clip (505) and the protrusions (515) on the sandwich plate (510) allow for the spring clip (505) to have multiple positions. The spring clip (505) can be moved during manufacturing of the active cover plate (500) or, in some examples, as part of the installation process. In FIGS. 5A and 5B, the spring clip has three slots and there are three protrusions on the face plate, but in general there may be any number of slots and protrusions to provide the desired amount of adjustment.

Figure 5D:
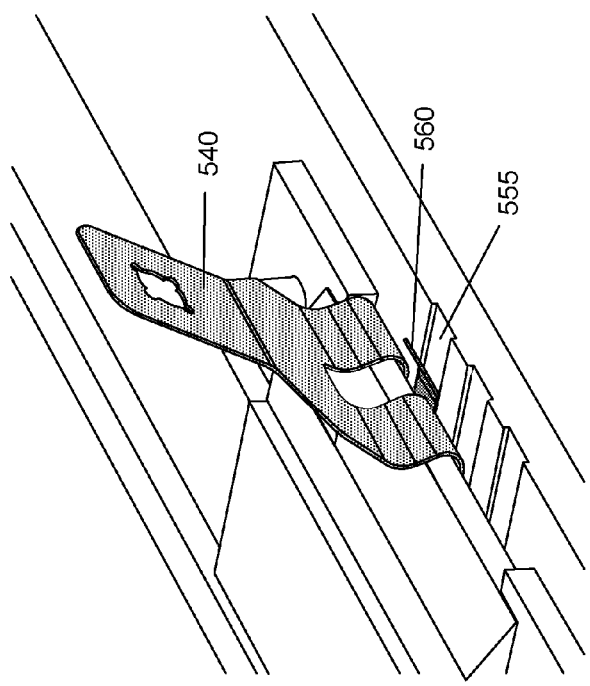
Figure 5C:
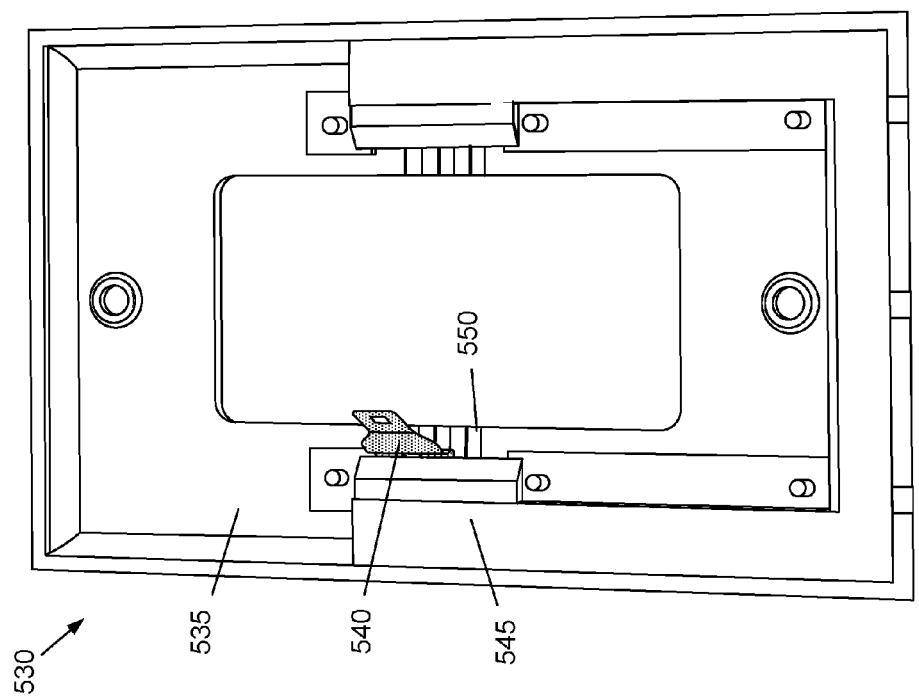

FIGS. 5C and 5D show a partially assembled active cover plate (530) that includes a spring clip (540) with a tab (560) that engages with one of three grooves (555) formed in the face plate (535). This allows the spring clip (540) to be positioned in any of three different vertical locations. The tab (560) can be lifted and the adjustable spring clip (540) can slide back and forth between the sandwich plate (545) and the face plate (535). When the desired location is reached the tab (560) can be released to engage with the desired groove (550) and secure the spring clip (540) in place. Alternatively the grooves may be placed in the sandwich plate (545). The tab (560) can be lifted using manual force. For example, the tab (560) may be lifted using by placing a finger or finger nail under the tab and lifting it, then sliding the spring clip (540) into the desired location and releasing the tab (560) into another groove. Alternatively, the tab may be curved so that it moves from groove to groove when sufficient manual pressure is applied. In this case the tab would be configured to secure the spring clip in place during normal operation and only move when sliding force of sufficient magnitude is applied.

FIGS. 6A-6C shows one example of an active cover plate (600) with a spring clip (602) that rotates to reach screw terminals in different locations. In this implementation, the spring clip (602) includes a base (610) that is connected to the face plate (605). A pivot (615) connects a head portion of the spring clip (602) to the base (610). The head portion of the spring clip (602) includes a contact (620) and a nonconductive portion (625).

The head portion of the spring clip (602), including the nonconductive portion and contact/rivet, can be rotated about the pivot (615) to reach screw terminals that are below (FIG. 6B) or above (FIG. 6C) the base (610) of the spring clip (602). FIG. 6B shows the head portion of the spring clip (602) has been rotated clockwise about the pivot (615) so that the contact (620) makes an electrical connection with an underlying screw head (635) vertically below the base (610) of the spring clip (602). FIG. 6C shows the head portion of the spring clip (602) has been rotated counter clockwise so that the contact (620) makes electrical contact with an underlying screw head (640) that is vertically above the base (610) of the spring clip (602). The pivot (615) is constructed to maintain electrical continuity between the electrical contact (620) and the base (610) during and after rotation of the head portion of the spring clip (602).

FIGS. 7A-7D show one example of an active cover plate (700) that includes a spring clip (705) that is specifically designed to be adjustable in the depth direction (horizontally, along the Y axis as show in FIG. 2A). This spring clip (705) includes two different contacts (710, 715). The outline of the contacts are shown as dashed lines because they are on the opposite side of the spring clip. A first contact (710) is closer to the base of the spring clip (705) and a second contact, or more distal contact (715) is closer to the tip of the spring clip (705). The more distal contact (715) allows the spring clip (705) to contact screw terminals that are significantly farther away from the face plate (755). For example, the more distal contact (715) may be used to contact screw terminals of a GFCI outlet body.

The spring clip (705) may be used with both contacts (710, 715) bare or may include a sliding cover (730) that can be moved along the body (720) of the spring clip (705) to selectively cover one of the contacts (710, 715). This sliding cover (730) can be used to prevent the contact (710, 715) that is not in direct contact with the screw terminal from shorting or coming into electrical contact with other elements.

Figure 7A:
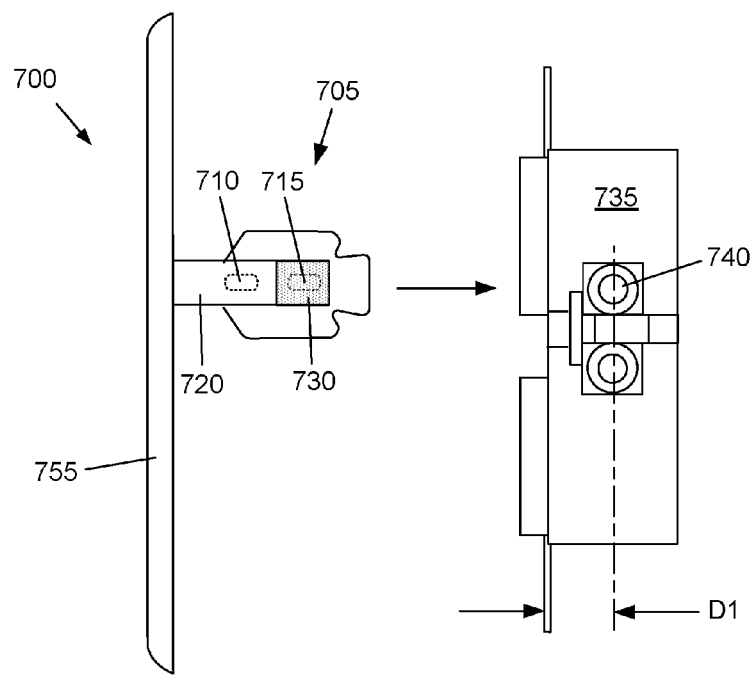
FIGS. 7A-7D are diagrams of spring clips with multiple contacts and a sliding insulator, according to one example of principles described herein.

In FIG. 7A, the active cover plate (700) is placed over a standard duplex outlet body (735) with screw terminals (740) that are only a relatively short distance D1 from the face of the outlet body (735). Thus, the sliding cover (730) is moved over the more distal contact (715) to insulate it. When placed over the standard duplex outlet (735) the contact (710) that is closer to the base contacts the screw terminal (740).

Figure 7B:
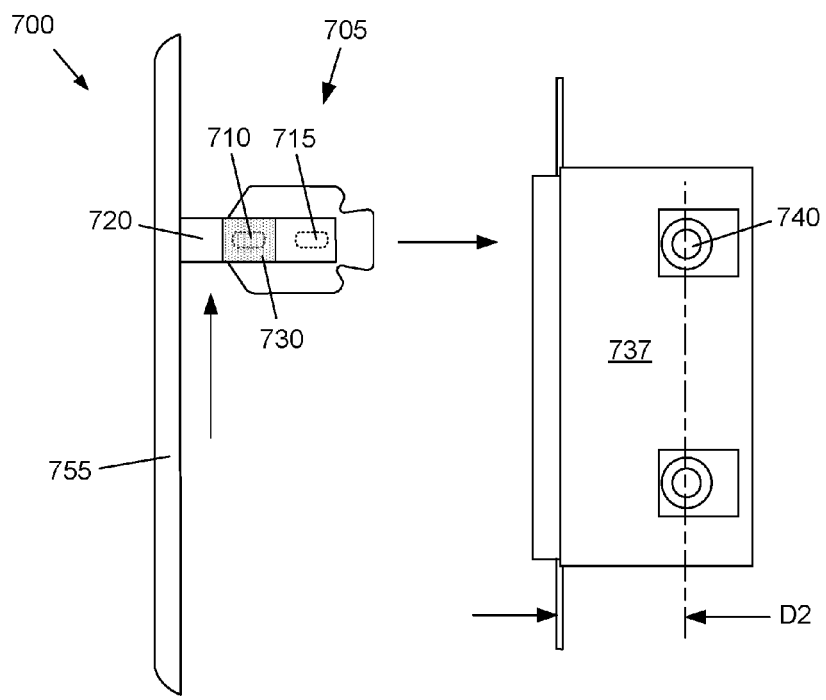

FIG. 7B shows the active cover plate (700) being placed over a GFCI outlet body (737). The screw terminals (740) on the GFCI outlet body (737) are significantly farther way from the face of the outlet body (distance D2). Additionally, the vertical location of the screw terminals (740) is not the same as the duplex outlet body (735, FIG. 7A). To make an electrical connection with the screw terminal (740), the spring clip (705) is slid vertically up the face plate (755) using any of a number of mechanisms and the sliding cover (730) is slid along the body (720) of the spring clip to cover the contact (710) closest to the face plate (755). The active cover plate (700) can then be connected over the GFCI outlet body (737) and the more distal contact (715) will contact the screw terminal (740). In some examples there may be two different terminals on the same side of a receptacle body. For example, switch bodies may have two screw terminals on the same side. In this case, the active cover plate may have two spring clips on the same side to make the desired contact with the screw terminals.

Figure 7C:
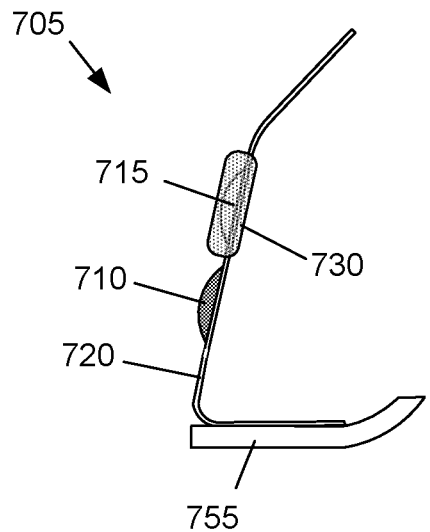
Figure 7D:
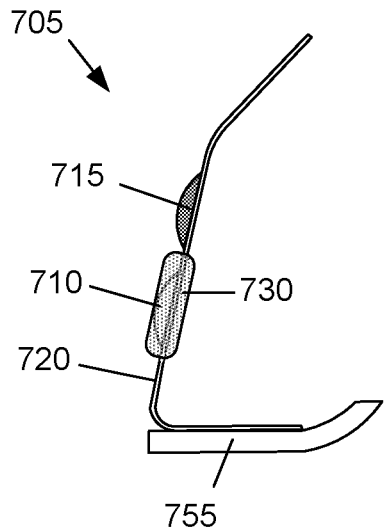

FIGS. 7C and 7D are side views of the spring clip (705) with the nonconductive portion (305, FIG. 3D) removed. As discussed above, the body (720) has several contacts (710, 715) along its length that are positioned to make contact with screw terminals on various styles of outlet/receptacle bodies. The body (720) is connected to the face plate (755). When the target screw terminal is at a relatively shallow depth, the first contact (710) near the face plate is exposed and the more distal contact (715) from the face plate (755) is covered by the sliding cover (730). This configuration is shown in FIG. 7C. The configuration shown in FIG. 7D is for making contact with screw terminals that are at a greater depth from the face of the receptacle body. The sliding cover (730) is moved over the first contact (710) near the face plate (755) and the more distal contact (715) from the face plate (755) is exposed.

Figure 8:
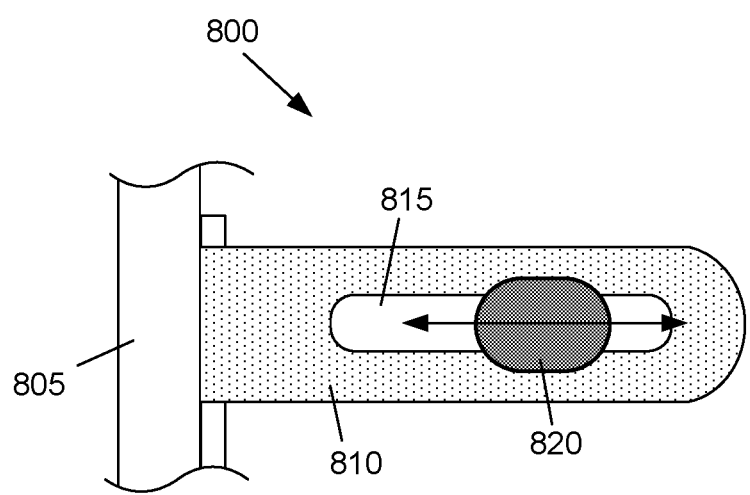
FIG. 8 is a diagram of a spring clip with a sliding contact, according to one example of principles described herein.

FIG. 8 is a diagram of an alternative implementation of a depth adjustable spring clip (800) mounted to a face plate (805). In this example, the body (810) of the spring clip (800) has a slot (815) along its length and the contact (820) slides back and forth in the slot to achieve the desired depth. The body (810) of the spring clip (800) may be conducting and the contact (820) may be electrically connected to the body (810). Additionally or alternatively, the contact (820) may have a flexible conductor connected to it that transfers power to the circuitry inside the active cover plate.

Figure 9A:
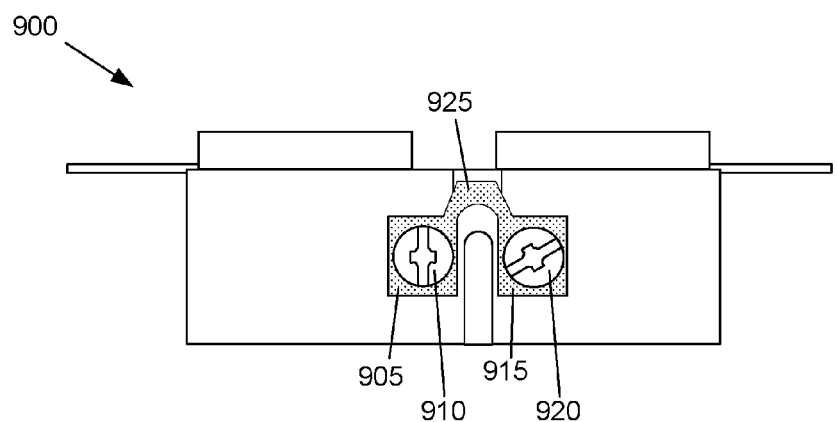
FIGS. 9A-9C describe geometries and techniques to avoid arcing between adjacent screw terminals on the side of an outlet, according to one example of principles described herein.

As discussed above with respect to FIGS. 1B and 1C, in some outlet/receptacle bodies there are terminals that have two screws/screw pads that are in relatively close proximity FIG. 9A shows this type of outlet body (900), which includes a first screw (910) and first screw pad (905) and a second screw (920) and a second screw pad (915). The first screw pad (905) and the second screw pad (915) are connected by a breakout tab (925). By removing the breakout tab (925) the terminal can be divided into two electrically separate parts.

Figure 9B:
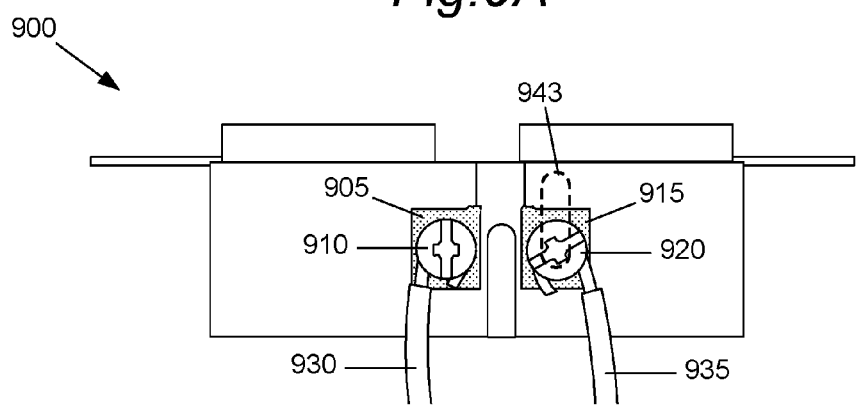

This is illustrated in FIG. 9B, where a first part includes the first screw pad and screw (905, 910) and an electrical supply wire (930) electrically connected to the screw pad/screw (905, 910). The second part includes the second screw pad and screw (915, 920) and a second electrical supply wire (935) electrically connected to the second screw pad and screw (915, 920). The first part supplies electrical power to one of the outlets and the second part separately supplies electrical power to the other outlet. This may be useful in a variety of situations. For example, one of the outlets may be connected to switch and a lamp plugged into the outlet. This allows the switch to control the lamp. However, the other outlet may be used for general purpose connections and may be on all the time. By dividing the terminal, one of the outlets may be separately controlled by the switch while the other outlet has continuous power.

However, if the contact pad on the spring clip that contacts the first and/or second parts of the screw terminal is very wide, it may cause arcing or shorting between the first part (905, 910, FIG. 9A) and second part (915, 920) of the terminals. To avoid this, the contacts may be relatively narrow. An outline (943) of a contact is superimposed on the divided terminal. Because the contact is relatively narrow, it will eliminate arcing or shorting as it moves or is placed over the divided terminal. For example, a contact with an oblong or narrow rectangle shape may be used, where the width of the contact is significantly smaller than the distance between two adjacent screws/pads. The term "significantly smaller" refers to a dimension that prevents arcing when the spring clip slides between the two adjacent screw/pads during installation or adjustment.

Figure 9C:
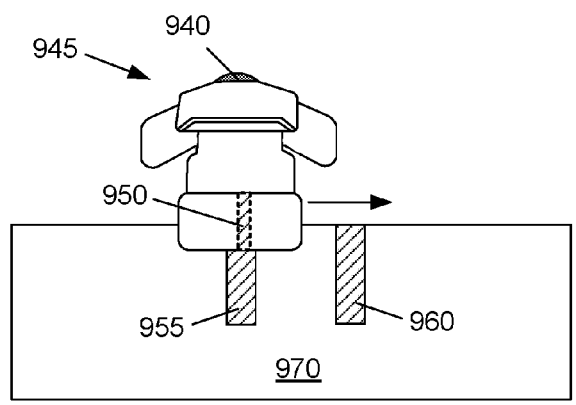

FIG. 9C shows an additional safety precaution that could be implemented in an active cover plate. In this implementation, the spring clip (945) is only electrically connected to the active cover plate (970) when it is in one of a predetermined number of locations. This is accomplished by forming pads (955, 960) or other features on the face plate or sandwich plate and forming a corresponding spring clip pad (950). This is only one example, a variety of other connection mechanisms could be used. When the spring clip pad (950) aligns with a pad or contact (955, 960) on the face plate/sandwich plate, an electrical current is delivered to the circuitry/load in the active cover plate (970). When the spring clip pad (950) is not aligned with the pads (955, 960) on the face plate/sandwich plate, there is no electrical connection to the circuitry. For example, when the spring clip is moving or positioned in the area between two separated parts of a screw terminal, there would be no connection to the circuitry but when the spring clip was in the desired location and the contact (940) makes an electrical connection with only one of the screw terminals, the pads align to make the desired electrical connection to the circuit.

Figure 10A:
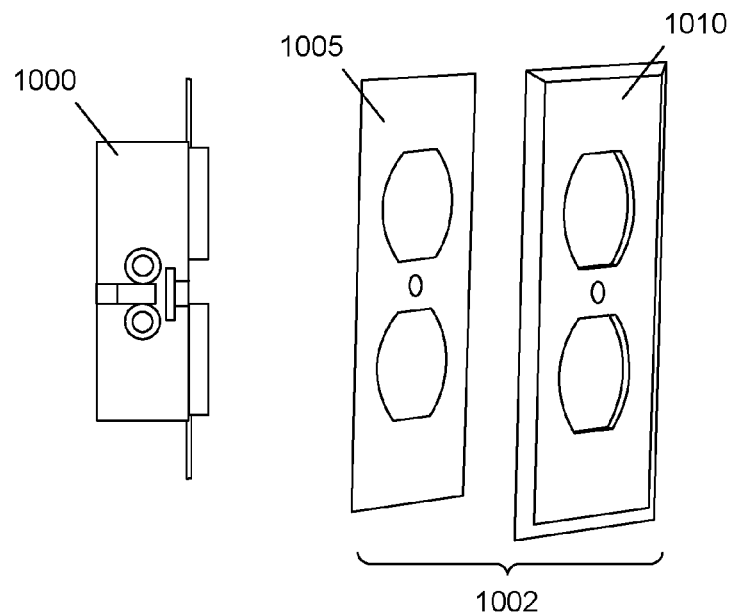
FIGS. 10A-10C are illustrative examples of intermediate devices that could form an interface between an outlet or other receptacle and an active cover plate, according to one example of principles described herein.
Figure 10B:
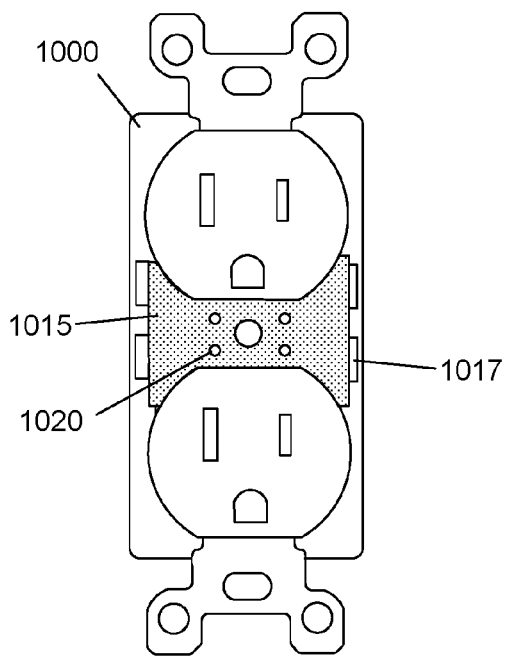
Figure 10C:
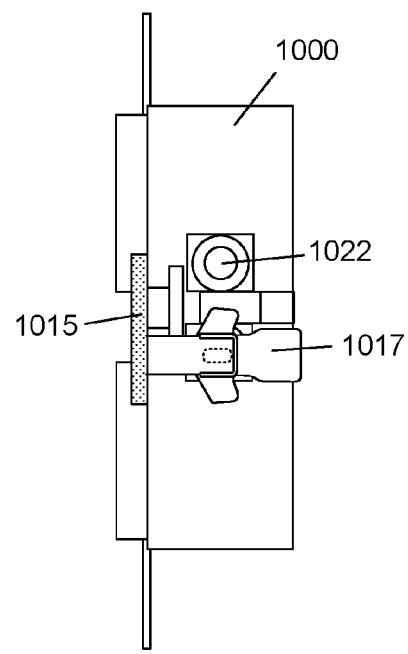

FIGS. 10A-10C show examples of active cover plates that include intermediate elements that could be interposed between the receptacle body and the face plate. The intermediate elements could be adapted to specific outlets while presenting a uniform interface to the face plates. This allows the face plates to be identical for outlet/switch bodies of the same type but with different screw terminal locations. For example, the same face plate could be used for all duplex outlet bodies, with different intermediate elements compensating for the differences in screw terminal locations.

FIG. 10A shows an outlet body (1000) and an active cover plate (1002) that includes an intermediate element (1005) and a face plate (1010) that connects over the outlet body (1000) and intermediate element (1005). The intermediate element (1005) in this example fits over the face of the outlet body (1000). The intermediate element (1005) may electrically connect to the outlet body (1000), include power conditioning circuitry, and may provide an interface to present power and/or signals to the face plate (1010).

FIGS. 10B and 10C are a front view and a side view respectively of an outlet body (1000) with an intermediate element (1015). In this example, the intermediate element (1015) includes spring clips (1017) and surface contacts (1020). As shown in FIG. 10C, the spring clips (1017) contact the screw terminals (1022) on the side of the outlet body (1000). Electrical power is then routed (and potentially conditioned into lower voltage direct current) through the intermediate element (1015) and presented to a face plate (1010, FIG. 10A) by the surface contacts (1020).

Alternatively or additionally, presentation of the power may be through another mechanical interface, such as a pin/prong interface, or through wireless power transfer, such as between coils. Other options include intermediate devices that contact the screw terminals on the receptacle body and then transfer the power to electrical pads on a different location on the sides of the outlet/switch body. In this example, an active cover plate with spring clips that would ordinarily not be able to contact the screw terminals could be used to contact the electrical pads on the exterior of the intermediate element. In general, the intermediary devices are plug and play devices that do not require removal of the outlet to install. Further, the intermediary devices are not merely a hard wired connection between an outlet and a face plate. Installation of the intermediary device is typically a tool-less operation that does not require reconfiguration of the receptacle body.

Figure 11:
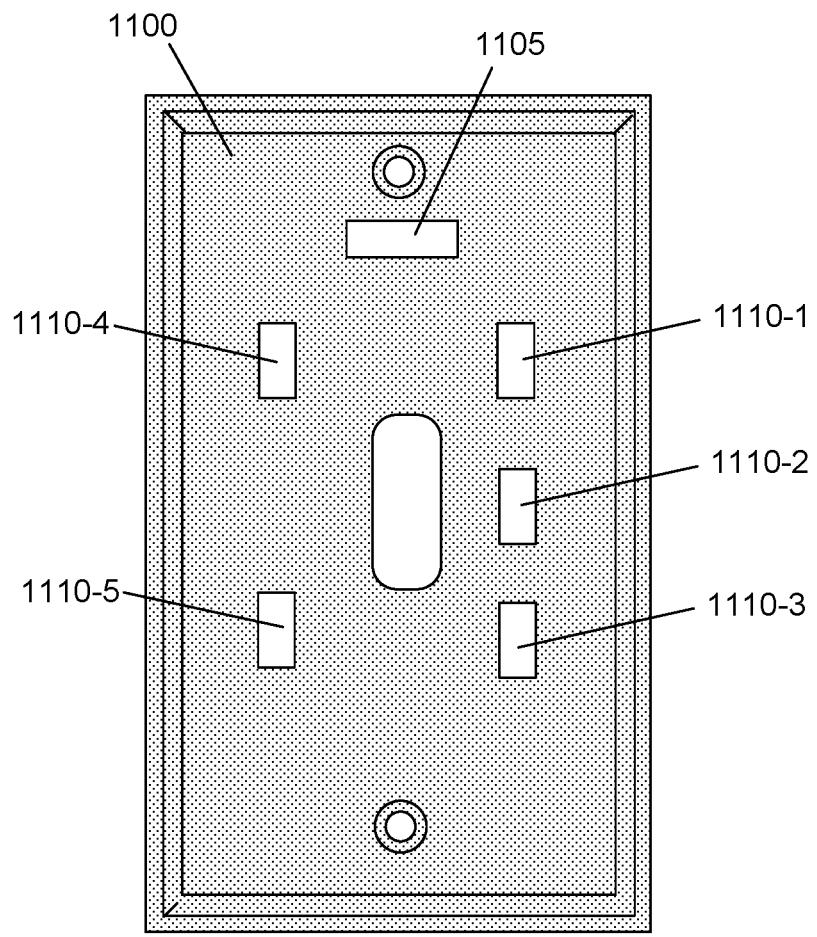
FIG. 11 is a diagram showing possible locations of multiple prongs on a cover plate, according to one example of principles described herein.

There are a variety of additional ways that active cover plates could be designed for more universal use with a range of receptacle bodies. One approach is to build multiple prongs and/or contacts onto the active cover plate and then use only the prongs that are connected to active terminals. The remaining prongs may not contact a terminal or may contact a terminal that is not electrified (i.e. a ground terminal). FIG. 11 is a diagram that shows potential locations for various prongs on an active switch cover plate (1100). In this example, there is a ground contact (1105) that may contact the chassis of the receptacle body. A number of spring clips (1110-1, 1110-2, 1110-3, 1110-4, and 1110-5) are distributed on the active switch cover plate (1100). Some of the spring clips may be active in one configuration and not in other configurations. For example, in three way and four way light switch bodies, some of the screw terminals may be active (have a voltage difference) in one configuration (i.e. when the light is ON) and other screw terminals may be active (have a voltage difference) in a different configuration (i.e. when the light is OFF). The use of multiple spring clips/contacts allows for the active cover plate to connect to a wider variety of receptacle bodies and to adapt to various operational configurations of the receptacle bodies.

FIGS. 12A-12D show various diagrams of an active cover plate (1200) that includes vertically adjustable spring clips with hinge joints. The hinge joints allow the spring clips to be packaged and shipped flat. This can provide a number of advantages including lowering the cost of shipping, decreasing the size and weight of packaging, and protecting the spring clips from damage. FIG. 12A shows a cross sectional view of an active cover plate (1200) that has two hinged spring clips (1215, 1220) that are folded down for shipping or storage. In this simplified diagram the active cover plate (1200) includes a face plate (1205) and hinges (1210, 1225). Before the active cover plate (1200) is installed, the spring clips (1215, 1220) are brought into the upright position so that they extend rearward from the face plate as shown in FIG. 12B.

In some examples the hinges are designed to be conductive throughout their range of motion. In other examples, the hinges may only be conductive in their raised position. Alternatively, the hinges may not be conductive. In this case the contact and moving part of the spring clip may be connected to circuitry in the active cover plate by a flexible wire or make an electrical contact in their upright position. In one implementation, the spring clips lock into their upright position. In this example, a latching mechanism (1212) engages with the spring clip when the spring clips are raised. The latching mechanism holds the spring clip in the upright position and prevents the hinge joint from rotating after the latch engages with the spring clip. In other implementations, the spring clips may be held in their raised position by pressure from the contact on the outlet/switch body.

FIGS. 12C and 12D show an implementation where the hinged spring clip (1220) is also vertically adjustable (its position is adjustable in the plane of the face plate) to allow the active cover plate (1200) to be used in conjunction with a wider range of outlet bodies. In this example, the spring clip (1220) includes a slider (1235) that slides in a slot (1230) in the face plate (1205). The hinge (1210) is also shown with the latching mechanism (1212). In this example, the latching mechanism (1212) includes a ramp and a slot. When the spring clip is raised, it engages with the ramp on the latching mechanism and then clicks into the slot. This secures the spring clip (1220) in the desired upright position. In FIG. 12C, the spring clip (1220) is in a central position and can be moved either up or down in the slot (1230). In FIG. 12D, the spring clip (1220) has been moved upward in the slot (1230) by manually moving the slider (1235). Although the figures above show hinges that allow the spring clips to lay flat and be raised, there are a variety of other mechanisms that could be used, including flexures, joints, or other suitable rotational mechanisms.

Figure 13:
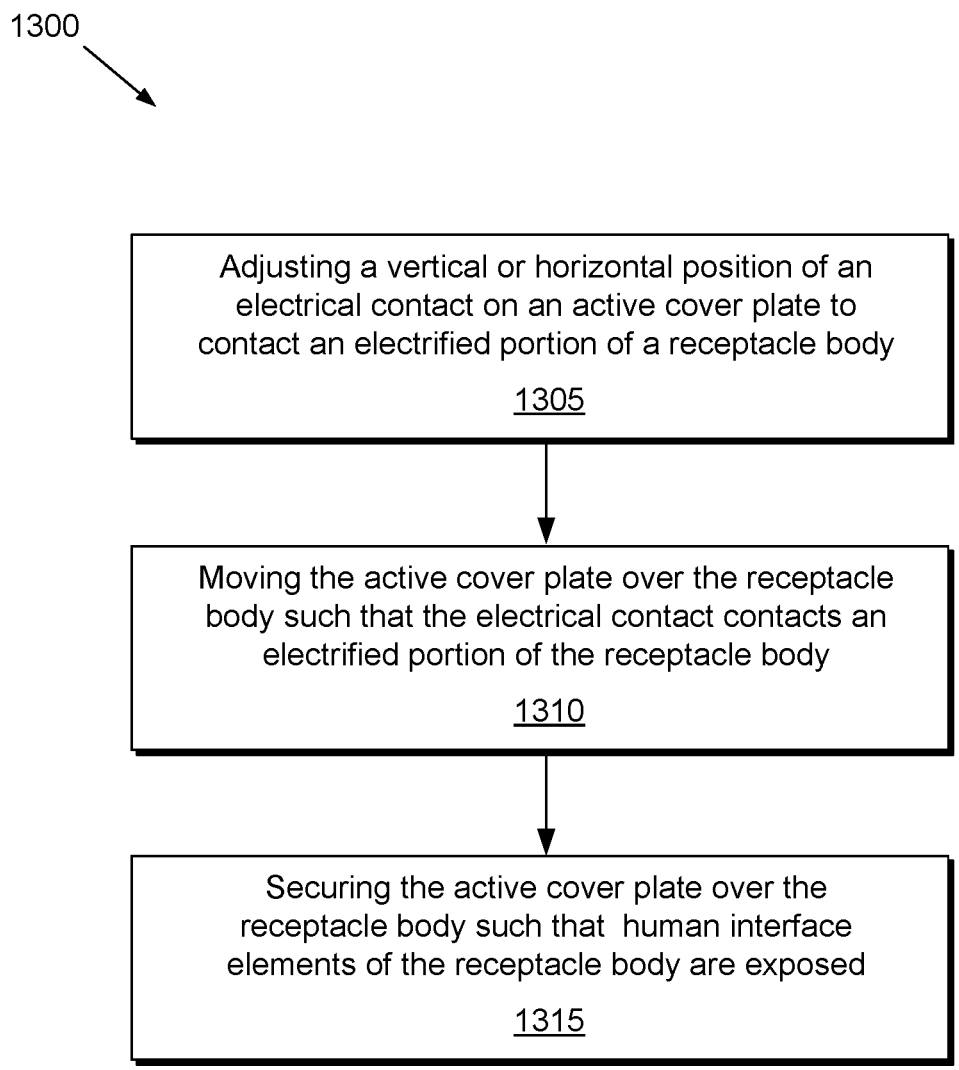
FIG. 13 is a flow chart of a method for connecting an active cover plate over a receptacle body according to one example of principles described herein.

FIG. 13 is a flowchart of an illustrative method (1300) for connecting an active cover plate over a receptacle body. The method includes adjusting a vertical or horizontal position of an electrical contact on an active cover plate to contact an electrified portion of a receptacle body (block 1305). For example, adjusting a vertical or horizontal position of the electrical contact with respect to an active cover plate may include vertically moving or sliding a spring clip supporting the electrical contact with respect to the face plate. There are several examples of this given above: selecting which posts the spring clip is placed over, moving the spring clip so that a detent engages with a selected indention, lifting a tab out of a groove and sliding the spring clip to a desired location and releasing the tab to engage with a different groove, engaging protrusions on the face plate or sandwich plate with slots in the spring clip, or other techniques. Examples of moving the electrical contact in a horizontal direction includes sliding a contact along a slot in the spring clip or covering unused contacts on the spring clip to expose only a contact that has the desired horizontal position (depth).

The active cover plate is then moved over the receptacle body such that the electrical contact contacts an electrified portion of the receptacle body (block 1310). As discussed above, the shape of the nonconductive portion of the spring clip can facilitate/guide the active cover plate over the receptacle body. The active cover plate is secured over the receptacle body such that human interface elements of the receptacle body are exposed (block 1315). For example, a screw can be inserted through a hole in the active cover plate and threaded into the receptacle body. The human interface elements include any portion of the receptacle body that humans interface with, such as switches and electrical receptacles.

Figure 14A:
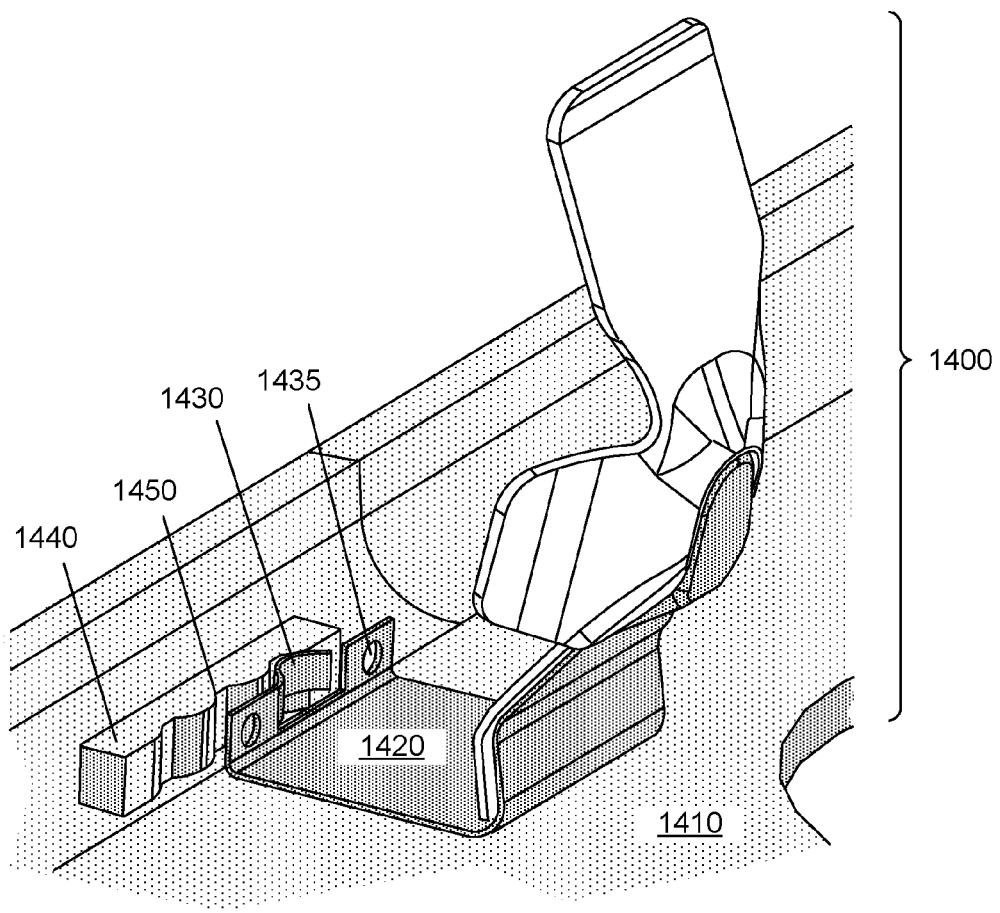
FIGS. 14A-14B show one embodiment of an adjustable spring clip, according to one example of principles described herein.

FIG. 14A is an illustrative example of an adjustable spring clip design. In this example, a spring clip 1400 can be adjusted vertically with respect to the face plate (1410) by a locking mechanism that includes a bar (1440) with multiple indentations (1450) formed into the face plate (1410). A protruding portion (1430) of the base of the spring clip (1420) is formed to engage with any one of the indentations to secure the spring clip into a particular vertical position with respect to the spring clip. To move the spring clip to a different vertical location, pressure can be applied to the spring clip that forces the protruding portion out of a first indentation and into a different indentation. The resilient spring force of the protruding portion retains the spring clip in the desired location during operation. Mounting holes (1435) or other features can be used to secure additional components, such as a sliding grip for applying pressure to force the spring clip into a new position. In this figure additional supporting components have not been shown, but are shown below in FIG. 14B.

Figure 14B:
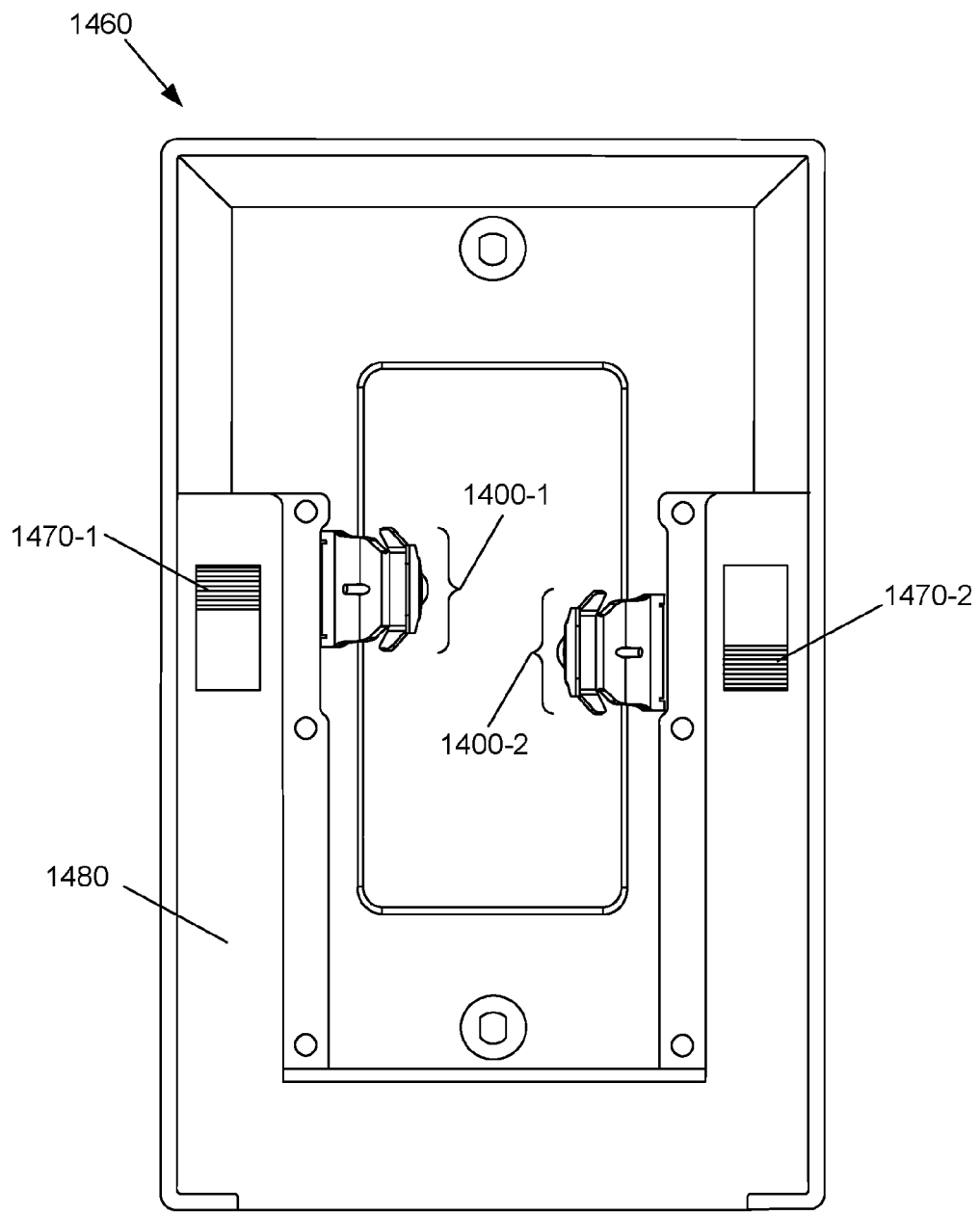

FIG. 14B shows an active cover plate (1460) that includes the spring clips (1400). In this figure, the sliding grips (1470-1, 1470-2) are attached to the spring clips (1400-1, 1400-2) and secured with a sandwich/back plate (1480). When vertical force is applied to the sliding grips the protruding portion (1430, FIG. 14A) of the base can be forced into a new indentation, thereby securing the spring clip (1400-1, 1400-2) into a new position. In FIG. 14B, the left spring clip (1400-1) is shown in an upper position and the right spring clip (1400-2) is shown in a lower position. There may be any number of positions/indentations. For example, there may be an upper position that positions the spring clip (1400-1, 1400-2) to contact a first screw head on a terminal, an intermediate position that positions the spring clip (1400-1, 1400-2) to contact a break off tab on the terminal, and a low position that allows the spring clip (1400-1, 1400-2) to contact a second screw head on the terminal. This adjustability allows the active cover plate (1460) to be used with a wide variety of outlets, including those that do not have screw terminals but have break off tabs. It also allows the active cover plate (1460) to be oriented in either a right-side up orientation or an upside down orientation with respect to the outlet, regardless of the orientation of the outlet.

Figure 15A:
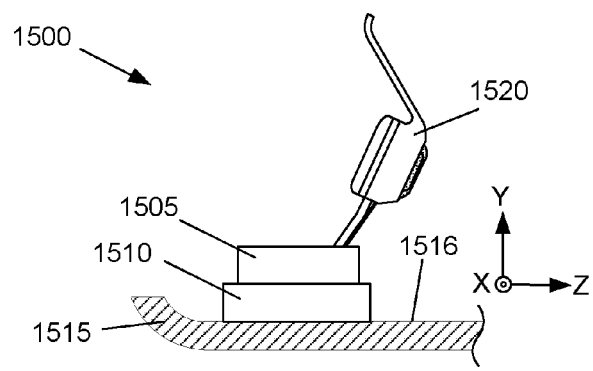
FIGS. 15A-15C show various embodiments of active cover plates, spring clips, and systems, according to one example of principles described herein.
Figure 15B:
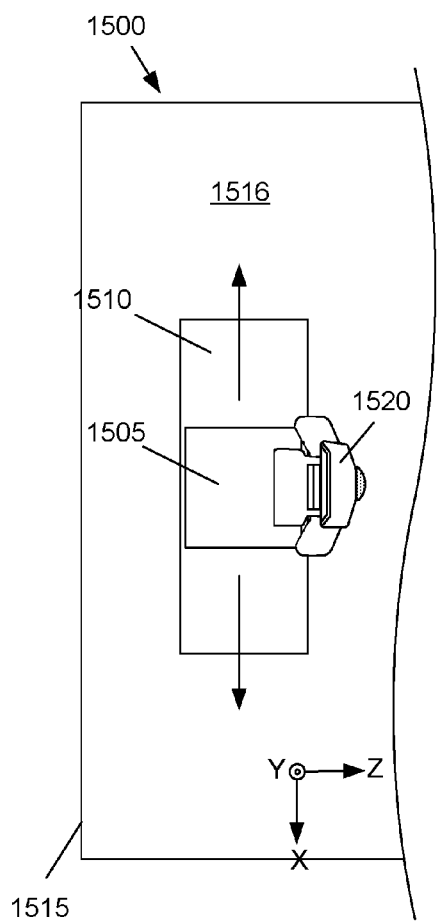
Figure 15C:
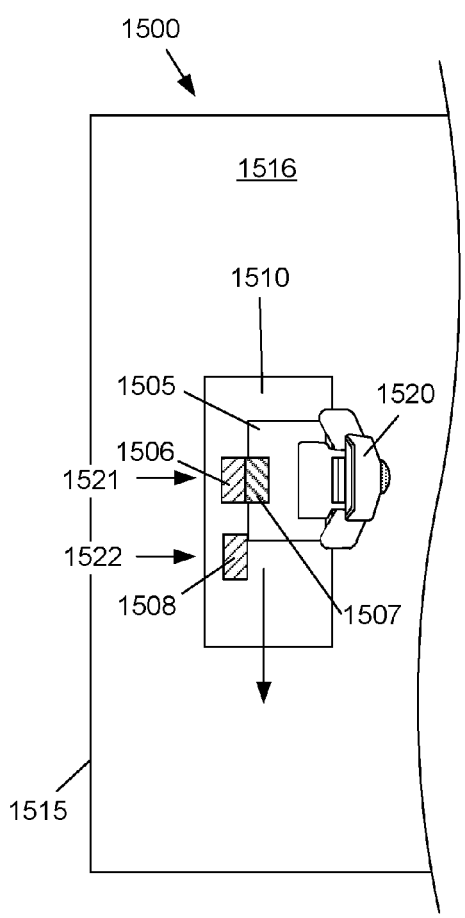

FIGS. 15A-15C show a generalized example of a cover plate (1500) that includes a face plate (1515), an engaging feature (1510) disposed on the face plate (1515) and a spring clip (1520). The engaging feature (1510) disposed on the face plate engages with the spring clip (1520) and secures the spring clip in at least two different positions with respect to the face plate (1515). As discussed above, the face plate could be any cover for an electrical box and/or electrical receptacle.

In one embodiment, the engaging feature (1510) may secure a base (1505) of the spring clip (1520) into one or more positions. In the example shown, the engaging feature (1510) secures the base (1505), and the spring clip, in two or more vertical positions (along the X axis) with respect to the face plate (1515). However, the engaging feature (1510) may also secure the base (1505) along a horizontal axis (on the Z axis).

The engaging feature (1510) may be a post or posts that engage with the base (1505), a detent (415, FIG. 4A) that engages with a notch or other indentation (420, FIG. 4A), a protrusion (515, FIG. 5A) that engages with a slot (525, FIG. 5A) in the base, slots (555, FIG. 5D) that engage with the tab (560, FIG. 5D) in the base, a contact (955, FIG. 9C) that connects to a corresponding spring clip pad (950, FIG. 9C) in the base, a slot (1230, FIG. 12C) that engages with a slider (1235, FIG. 12C), a bar (1440, FIG. 14A) that engages with a protruding portion (1430, FIG. 14A), and/or a sliding grip (1470, FIG. 14B) that engages with the base (1420, FIG. 14A). Further, any of these concepts could be combined with other concepts or have additional elements introduced to form engaging features that engage with the spring clip to secure it in position. For example, the principle of a tab (560, FIG. 5D) and slot (555, FIG. 5D) could be combined with a sliding grip (1470, FIG. 14B) to allow for easier adjustment of a prong location. Pressure on the sliding grip (1470, FIG. 14B) could cause the tab (560, FIG. 5D) to disengage from a first slot and to engage a second slot (555, FIG. 5D). The engaging feature (1510) may engage with the spring clip in any of a variety of ways. For example, the engaging feature (1510) may mate with a feature or element on the spring clip (1520). Specifically, the base (1510) of the spring clip (1520) may have a mating feature that accepts or is received by the engaging feature (1510).

In some embodiments, the engaging feature (1510, FIGS. 15A, 15B, 15C) may be disposed on a rear surface (1516) of the face plate (1515) and the two or more different positions (1506, 1508; FIG. 15C) are different locations of the spring clip (1520) on the rear surface (1516) of the face plate (1515).

For example, the face plate (1515) may include a rear surface (1516) and the engaging feature (1510) may include at least two engaging elements (1506, 1508) that secure the spring clip (1520) in at least two different fixed positions (1521, 1522) with respect to the rear surface (1516) of the face plate (1515). The two different positions (1521, 1522) may include a first position (1521) and a second position (1522) and the spring clip (1520) may be a selectively positionable spring clip positionable in the first position (1521) and the second position (1522) on the rear surface (1516) of the face plate (1515), wherein at least one of the engaging elements (1506, 1508) engages with the spring clip (1520) to secure the spring clip in the first position (1506) with respect to the rear surface (1516) of the face plate (1516) and at least one of the engaging elements (1506, 1508) engages with the spring clip to secure the spring clip in the second position (1522) on the rear face of the face plate.

The engaging elements (1506, 1508) may include posts (e.g. FIGS. 3A-3F), detents (e.g. 415, FIG. 4A), notches or other indentations (e.g. 420, FIG. 4A), protrusions (e.g. 515, FIG. 5A), slots (e.g. 525, FIG. 5A; 555, FIG. 5D), tabs (e.g. 560, FIG. 5D), pads (e.g. 955, FIG. 9C), a slot (1230, FIG. 12C) that engages with a slider (e.g. 1235, FIG. 12C), a bar (e.g. 1440, FIG. 14A) with indentions, flexible protrusions (e.g. 1430, FIG. 14A) or other elements. Further, any of these concepts could be combined with other concepts or have additional elements introduced to form engaging elements. For example, the principle of a tab (e.g. 560, FIG. 5D) and slot (e.g. 555, FIG. 5D) could be combined with a sliding grip (e.g. 1470, FIG. 14B) to allow for easier adjustment of a prong location.

In one embodiment, the engaging elements discussed above may be locking features. For example, the engaging feature may include a first locking feature (1506) and a second locking feature (1508), wherein the first locking feature (1506) mechanically engages with the spring clip (1520) and repositionably secures the spring clip in a first position (1521) with respect to the face plate (1515) and the second locking feature (1522) may mechanically engage with a feature (1507) of the spring clip (1520) to repositionably secure the spring clip in a second position (1522) with respect to the face plate (1516). The locking features may include a post or posts (FIGS. 3A-3F), a detent or detents (415, FIG. 4A) that engages with a notch or other indentation (420, FIG. 4A), a protrusion (515, FIG. 5A) that engages with a slot (525, FIG. 5A) in the base, slots (555, FIG. 5D) that engage with the tab (560, FIG. 5D) in the base, a contact (955, FIG. 9C) that connects to a corresponding spring clip pad (950, FIG. 9C), a slot (1230, FIG. 12C) that engages with a slider (1235, FIG. 12C), a bar (1440, FIG. 14A) that engages with a protruding portion (1430, FIG. 14A), and/or a sliding grip (1470, FIG. 14B) that engages with the base (1420, FIG. 14A). Further, any of these concepts could be combined with other concepts or have additional elements introduced to form locking features.

In some examples, the two or more different positions (1521, 1522) may be different vertical positions with respect to the face plate (1515). The spring clip (1520) may be shiftably adjustable along the vertical axis (X axis) with respect to the face plate and allow the electrical contact to be shiftably adjustable along the vertical axis with respect to the screw terminal. The electrical contact may also be shiftably adjustable on the spring clip in a depth axis to allow for the repositioning of the electrical contact along a depth axis with respect to the screw terminal.

FIGS. 16A-16C show one example of an active cover plate (1600) that includes a face plate (1615), spring clip (1620), and a shiftably adjustable mechanism (1612) securing the spring clip (1620) to the face plate (1615) in at least two different fixed positions (1614-1, 1614-2, 1614-3). The spring clip (1620) is movable between the at least two different fixed positions (1614-1, 1614-2, 1614-3). The face plate (1615) may be a cover that is configured to be mounted or placed over any type of electrical receptacle, including switch and light receptacles.

The specific examples of components shown in FIGS. 16A-16C do not limit the scope of the principles taught or the scope of the claims. For example, although the shiftably adjustable mechanism (1612) is shown to the left of the spring clip (1620), it may be on the right, bottom, top, angled beneath, or on top of the spring clip (1620). The embodiment of the shiftably adjustable mechanism (1612) is a generalized version that represents all the embodiments of a shiftably adjustable mechanism (1612) described herein, combinations of mechanisms described herein, and/or shiftably adjustable mechanisms that utilize the principles described herein.

Figure 16D:
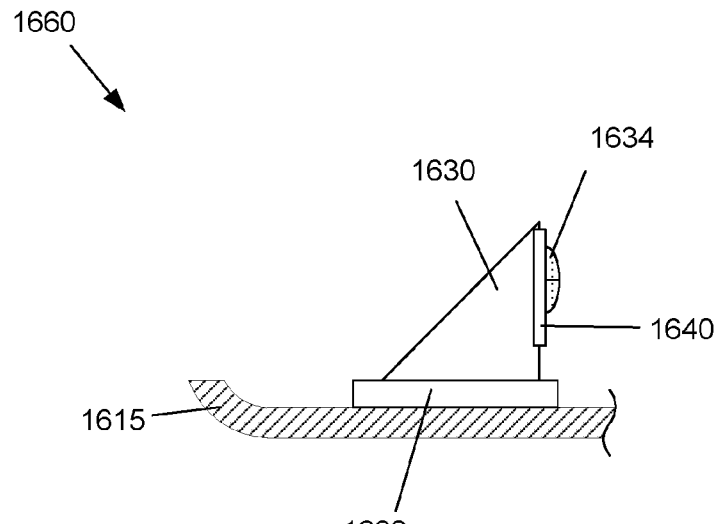

The spring clip (1620) may have a variety of configurations, including but not limited to various spring clip embodiments illustrated and described herein. As illustrated in FIGS. 16-A-16C, the spring clip (1620) may include a base (1610). Additionally or alternatively, the spring clip (1620) may have a configuration similar to the spring clip (312) illustrated in FIGS. 3A, 3D, 3E, 3F; the spring clip (350) illustrated in FIG. 3G; the partial spring clip (505) illustrated in FIGS. 5A and 5B; the partial spring clip (540) illustrated in FIGS. 5C and 5D; the spring clip embodiment (602) shown in FIGS. 6A-6C, the spring clip embodiment (705) shown in FIGS. 7A-7D; the spring clip embodiment (800) shown in FIG. 8; the spring clip embodiment (945) shown in FIG. 9C; the spring clips (1220) shown in FIGS. 12A-12D; the spring clip (1420) illustrated in FIGS. 14A-14B; the support structure (1630) and associated elements shown in FIGS. 16C-16D; the spring clips (2100) shown in FIGS. 20A-20C, 21A-21C, 22; any of the spring clips (2300) shown in FIGS. 23A-23F; the spring clips (2400) shown in FIGS. 24A-24E. In this example, the base (1610, FIG. 16A) is considered part of the spring clip. Further, the concepts described can be applied to adjust the position of a wide range of spring clips with different geometries and configurations.

The shiftably adjustable mechanism (1612) securing the spring clip (1620) to the face plate (1615) may use any or all of the principles described herein with respect to mechanisms that use stakes or posts of any kind, including posts (348-1 through 348-5) shown in FIGS. 3A-3C with mating apertures in the spring clips (e.g. 310, 312); mechanisms that use detents (see e.g. 415, FIG. 4A) that engage with notches or other indentations (see e.g. 420, FIG. 4A); and any of a wide range of protrusions that engage with slots, apertures, or other indentations, such as protrusions (515) shown in FIG. 5A, 5B that engage with a slot (525, FIG. 5A, 5B). The shiftably adjustable mechanism (1612) may further use principles described with respect to any type of tabs or other resilient flexible elements that engage with a wide range of apertures, slots or other indentations, such as the slots (555, FIG. 5D) that engage with the tab (560, FIG. 5D); a wide range of slots that engage with sliders such as the slot (1230, FIG. 12C) that engages with the slider (1235, FIG. 12C), and a wide range of other mechanisms and principles may be used such as a bar with indentations (1440, FIG. 14A) that engages with a protruding portion (1430, FIG. 14A), and/or a sliding grip (1470, FIG. 14B) that engages with the base (1420, FIG. 14A). Without limitation, elements of the shiftably adjustable mechanism may be parts of the spring clip and/or face plate.

In this example, the shiftably adjustable mechanism (1612) mechanically interacts with the base (1610, FIG. 16A) of the spring clip (1620). This interaction may take a variety of forms, including those above. Further, any of these concepts or principles could be combined with other concepts or principles and/or have additional elements introduced to form shiftably adjustable mechanisms (1612).

FIGS. 16A-16C further show that the spring clip (1620) is movable between the at least two different fixed positions (1614-1, 1614-2, 1614-3) through the application of force which disengages the shiftably adjustable mechanism (1612) to move the spring clip (1620) from a first fixed position (1614-2) and reengages the shiftably adjustable mechanism to secure the spring clip in a second fixed position (1614-1, 1614-3). In some cases the applied force may be a manual force applied by the user. However, the applied force could be applied in a variety of other ways, such as through the use of electromotive force, gears, flexures, springs, magnetic force, or any other type of force.

Examples of applied force include the force required to lift the prong (312) from the posts (348-2, 348-3) and place it on a different set of posts as shown in FIGS. 3B and 3C; the applied force applied to move the detents (see e.g. 415, FIG. 4A) from a first notch or indentation to a second notch or indentation (see e.g. 420, FIG. 4A); the applied force applied to flex the spring clip (505, FIG. 5A, 5B) downward to disengage the protrusions (515, FIG. 5A-5B) from the slots (525, FIG. 5B) and slide the spring clip (505) to a new position; the applied force needed to lift the tab (560, FIG. 5D) out of a slot (555, FIG. 5D) and slide the spring clip (540) to a new position; the applied force needed to push a slider (1235, FIG. 12C, 12D) along a slot (1230, FIG. 12C, 12D); and the applied force required to disengage a protruding portion (1430, FIG. 14A) from a first indentation in a bar (1440, FIG. 14A) and shift the protruding portion to another indentation; for example, this manual force may be applied to a sliding grip (1470, FIG. 14B) that engages with the base (1420, FIG. 14A). Further, any of these concepts or principles could be combined with other concepts or principles to provide for the application of applied force to disengage a shiftably adjustable mechanism (1612).

Examples of at least two different fixed positions include, but are not limited to, posts (348-1 to 348-5; FIGS. 3B-3C) that are received by apertures in a base of a spring clip (312; FIGS. 3B-3C); the three numbered positions on the base (410, FIG. 4A); protrusions (515) shown in FIG. 5A that engage with a slot (525, FIG. 5B) are configured to position the spring clip at several different fixed positions that are in plane with the rear surface of the face plate; similarly, the slot (555, FIG. 5D) and tab (560, FIG. 5D) fix the location of the spring clip (540, FIG. 5C, 5D) multiple locations that are all in a plane parallel to the back surface of the face plate (535, FIG. 5C); the slot (1230, FIG. 12C, 12D) that engages with the slider (1235, FIG. 12C, 12D) moves the spring clip (1220) in a plane parallel to the rear surface of the cover plate; a bar with indentations (1440, FIG. 14A) that engages with a protruding portion (1430, FIG. 14A), and/or a sliding grip (1470, FIG. 14B) that engages with the base (1420, FIG. 14A) to move the prong (1400) within a plane that parallel to the rear surface of the face plate. However, there is no restriction how, how much, or where the spring clips are adjustable. Spring clips may be adjusted in any of a number of ways to provide for contact between the electrical contact and a screw terminal on an electrical receptacle.

In some examples, the at least two different fixed positions (1614-1, 1614-2, 1614-3) may both be in a plane that is parallel to the rear surface (1616) of the plate (1600). For example, because the base (1610) rests on the rear surface (1616) of the face plate (1615), motion of the base across the rear surface (1616) is considered to be in a plane that is parallel to the rear surface. The plane that is parallel to the rear surface may be defined by motion of the spring clip along the Z axis and/or X axis (the ZX plane), notwithstanding that there may be some motion in the Y axis or minor rotations of the spring clip. FIGS. 3A-3F, 4A-4D, 5A-5D, 7A-7B, 12A-12D, and 14A-14B all illustrate examples of spring clips that have at least one adjustable degree of freedom in the ZX plane.

In the example illustrated in FIGS. 16A-16C, the spring clip may move over the rear surface (1616) of the cover plate and consequently, the at least two different fixed positions (1614-1, 1614-2, 1614-3) are in a plane parallel to the rear surface. The fixed positions illustrated in FIG. 16B are a linear array of three positions along the X axis (vertical axis), however the positions are not limited to positions in the X axis. The positions may be located in any location on the ZX plane and may include depth adjustment in the Y axis as well. Further, there may be any number of positions, including two, three, four or more.

The shiftably adjustable mechanism (1612) described above with respect to FIGS. 16A and 16B may include a first engaging element (1605) and a second engaging element (1606) as shown in FIG. 16C. In some examples, the first engaging element (1605) may be flexible such that flexure of the first engaging element disengages the first engaging element from the second engaging element (1606) to allow the spring clip (1620) to be moved from a first fixed position (1608) to a second fixed position (1609). In other configurations the second engaging element (1606) may be flexible. There may be additional engaging elements (1607) that secure the spring clip in different positions. In some examples the spring clip (1620) or spring clip base (1610) may include the first engaging element (1605) and the face plate (1616) may include the second engaging element (1606). However, because the designation of the "first" and "second" engaging elements can be arbitrary, the spring clip with its accompanying base can have one of the engaging elements and the face plate may include (or have attached to it) the other engaging element.

For example, in FIG. 3B-3F, the first engaging element includes apertures in the base (362) of the spring clip (312) and the second engaging element is any two of the posts (348-1 through 348-5). A first fixed position of the spring clip with respect to the face plate is shown in FIG. 3B with the spring clips over a first set of posts (348-2, 348-3). The second fixed position is shown in FIG. 3C with the spring clips over different posts (348-3, 348-4).

FIGS. 4A-4D show a first engaging element as a notch (420) on a sliding base (410) that engages with a second engaging element in the form of a detent (415). In this example, there are multiple engaging elements on the sliding base and only one second engaging element fixed to the face plate (425). Alternatively, there may be one first engaging element on the base and multiple fixed engaging elements on the face plate.

FIGS. 5A-5B show one example where the first engaging element is one of slots (525) on the spring clip and the second engaging element is one of the protrusions (515) in the back plate (510). In this example, there are multiple engaging elements in the spring clip and multiple engaging elements fixed with respect to the face plate. Additionally, multiple engaging elements on the spring clip engage with the multiple engaging elements that are fixed with respect to the face plate. FIGS. 5C-5D show a first engaging element (tab, 560) that engages with a second engaging element (slot, 555). There are multiple fixed engaging elements (slots 550, 555), including the second engaging element (555), in the face plate (535).

FIGS. 12A-12D show a first engaging element in the form of a slider (1235) and a second engaging element in the form of a slot (1230). In this example, the first engaging element engages with the second engaging element to secure the spring clip in multiple positions. FIGS. 14A-14B show a first engaging element (1430) that engages with a second engaging element (1450) to secure the spring clip (1400) in a first position. The spring clip can be moved by disengaging the first engaging element (1430) from the second engaging element (1450) and engaging the first engaging element with a different fixed engaging element (i.e. a different notch in the bar (1440).

Returning to FIG. 16C, the first engaging element (1605) and the second engaging element (1606) may include a mechanical interface (1611) between the first engaging element (1605) and the second engaging element (1606) to secure the spring clip (1620) in position with respect to the face plate (1616). This mechanical interface (1611) is physical contact between the first engaging element and second engaging element. The physical contact may include a normal force between/on surfaces, friction, mechanical interference, force due to flexure/spring forces, protrusions fitting into apertures, pinching contact, magnetic/electromagnetic forces, or any other type of interface or surface contact.

For example, in FIG. 3B-3F, apertures (361-1, 361-2) in the base (362) of the spring clip (312) and the posts (348-1 through 348-5) mechanically interface to fix the spring clip (312) in position. Specifically, at least a portion of the perimeter of the posts (348-2, 348-3; FIG. 3F) mechanically contact the inner diameter of the apertures (361-1, 361-2; FIG. 3F) to secure the spring clip (312, FIG. 3F) in position.

FIGS. 4A-4D show a notch (420) on a sliding base (410) that forms a mechanical interface with a detent (415). This mechanical interface may include force that based on flexure of one or more of the sliding base or detent. Alternatively, the mechanical interface may be that the detent is retained within the notch but has some mechanical play or slop such that the detent may move slightly within the notch. This slight play still constitutes a mechanical interface that secures the spring clip in a fixed position with respect to the face plate. FIGS. 5A-5B show a mechanical interface where slots (525) on the spring clip form a mechanical interface with protrusions (515). The protrusions (515) physically contact the interior surfaces of the slots (525) to secure the spring clip in place. FIGS. 5C-5D show a tab (560) that mechanically interfaces with a slot (555). The spring force of the tab forces the tab into the slot, creating friction between the downward face of the tab and the bottom of the slot. Further, mechanical contact between the sides of the tab and the sides of the slot prevent motion of the spring clip and fix it in a desired position. FIGS. 14A-14B show mechanical interfaces where the flexible protruding portion (1430) presses inward into the indentions (1450) in the bar (1440). The mechanical interface in this case includes friction contact, with normal forces at the interface resulting in friction that holds the spring clip (1420) in place. The normal force and the friction increase as pressure is applied to move the spring clip from one position to the next, until the protruding portion moves into the next indention.

The examples given above are used to illustrate the principles described and claimed herein, but do not limit the principles to the specific examples. The principles may be applied in any of a number of ways to form a shiftably adjustable mechanism that secures the spring clip to the face plate in multiple fixed positions, while providing for the spring clip to be movable between the positions.

Figure 16E:
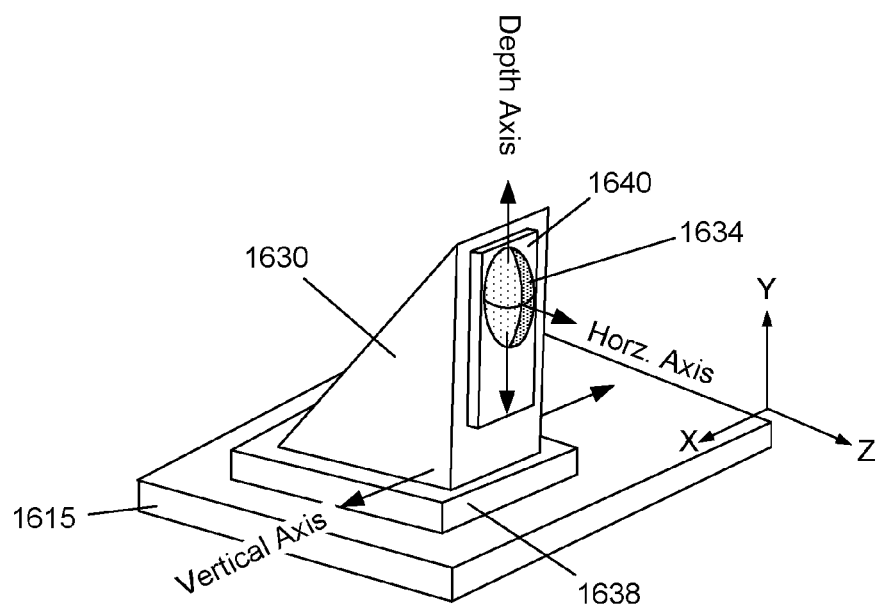

FIGS. 16D and 16E show one illustrative example of a system (1660) that includes a face plate (1615), an electrical contact (1634) and a support structure (1630) that interfaces with the face plate (1615) and supports the electrical contact (1634). The electrical contact (1634) is repositionable with respect to the face plate (1615) along two distinct axes.

FIG. 16D shows three distinct axes that are referenced to the installed position of a cover plate over the outlet (see e.g. FIGS. 7A, 7B). In the installed position, the depth axis is in the Y direction, the horizontal axis is in the Z direction, and the vertical axis is in the X direction. The depth axis refers to the depth of the electrical contact from the front of the wall or the face plate. The horizontal axis refers to the position of the electrical contact horizontally. The vertical axis refers to the position of the electrical contact along a vertical line that is parallel to the face plate and or wall surface.

The support structure (1630) may include any of a variety of elements, including flexible metal, insulation, bases, uprights, etc. For example, the support structure may include the spring clip (1620, FIG. 16A) and the base (1610, FIG. 16A). As shown in FIG. 16D, the electrical contact (1634) may be repositionable with respect to the face plate along two orthogonal axes (e.g. X and Y axes, Z and X axes, Y and Z axes, or all three axes).

The electrical contact (1634) can have any of a variety of shapes as appropriate for the application. For example, the electrical contact may have a shape similar to the electrical contact (340) shown in FIG. 3A, 3D, 3G; the electrical contacts (710, 715, 820) shown in FIG. 7C-8; the electrical contacts (2005) shown in FIGS. 20A-21C; any of the electrical contacts (2302, 2304, 2306, 2307, 2308, 2310, and 2312) in FIGS. 23A-23F; or the electrical contact (2402, FIGS. 24A-24E). These examples are illustrative embodiments and do not limit the scope of the principles described or the scope of the claims.

The support structure may interface to the face plate in any of a variety of ways, including the multiplicity of those shown and described herein. For example, the support structure may interface with the face plate using detents, protrusions, slots, friction interfaces, a variety of apertures or indentations, and/or other types of interfaces.

The support structure (1630) may interface with the face plate (1615) using any or all of the principles described herein with respect to mechanisms that use stakes or posts of any kind, including posts (348-1 through 348-5) shown in FIGS. 3A-3C with mating apertures in the spring clips (312); mechanisms that use detents (see e.g. 415, FIG. 4A) that engage with notches or other indentations (see e.g. 420, FIG. 4A); and any of a wide range of protrusions that engage with slots, apertures, or other indentations, such as protrusions (515) shown in FIG. 5A that engage with a slot (525, FIG. 5A). The support structure (1630) may interface with the face plate (1615) using principles described with respect to any type of tabs or other resilient flexible elements that engage with a wide range of apertures, slots or other indentations, such as the slots (555, FIG. 5D) that engage with the tab (560, FIG. 5D); a wide range of slots that engage with sliders such as the slot (1230, FIG. 12C) that engages with the slider (1235, FIG. 12C), and a wide range of other mechanisms and principles may be used such as a bar with indentations (1440, FIG. 14A) that engages with a protruding portion (1430, FIG. 14A), and/or a sliding grip (1470, FIG. 14B) that engages with the base (1420, FIG. 14A). Further the support structure (1630) may interface with the face plate (1615) using any combination of the principles described above or in combination with other mechanisms or interfacing elements.

The electrical contact may be repositionable with respect to the face plate in any of a variety of ways, including mechanisms that allow the support structure to be repositioned along the face plate and mechanisms and principles that allow the electrical contact to move with respect to the support structure. These mechanisms and principles may be those described herein, separately or in combination or in combination with other mechanisms or principles.

The support structure (1630) may flex to reposition the electrical contact (1634) along a first axis. For example, the support structure (1630) may include a flexible metal portion (363) that flexes along the Z axis (an axis that is perpendicular to the side of a receptacle body so that motion along the Z axis is toward and away from the screw terminals). In alternative embodiments, the flexure may include a hinge (e.g. 1210, FIG. 12B) that allows the electrode to move along one or more axes. The flexing of the support structure (1630) may also include a joint to move the electrical contact in one or more directions by rotating (see e.g. 615, FIG. 6A). This allows the electrical contact to be repositioned in the X or Y axes (or in the XY plane as shown in FIG. 16D). In other embodiments, the support structure (1630) may include flexural elements such as tabs (560, FIG. 5D) or protruding elements (1430, FIG. 14A) or other flexural elements.

In some examples, there may be a releasable locking interface (1638) between the face plate (1615) and the support structure (1630). This releasable locking interface (1638) releasably locks the support structure (1630) along a second axis with respect to the face plate (1615).

The releasable locking interface (1638) may include a variety of structures, including a post or posts (348-1 through 348-5, FIGS. 3A-3C) that engage with the base (see e.g. 362, FIG. 3F; 1505, FIG. 15A); a detent (415, FIG. 4A) that engages with a notch or other indentation (420, FIG. 4A); a protrusion (515, FIG. 5A) that engages with a slot (525, FIG. 5A); slots (555, FIG. 5D) that engage with the tab (560, FIG. 5D), a pad (955, FIG. 9C) that connects to a corresponding spring clip pad (950, FIG. 9C); a slot (1230, FIG. 12C) that engages with a slider (1235, FIG. 12C); a bar (1440, FIG. 14A) that engages with a protruding portion (1430, FIG. 14A); and/or a sliding grip (1470, FIG. 14B) that engages with the base (1420, FIG. 14A).

Further, any of these concepts could be combined with other concepts or have additional elements introduced to form an adjustable electrical contacts and/or adjustable spring clips or other support structures. For example, the principle of a tab (560, FIG. 5D) and slot (555, FIG. 5D) could be combined with a sliding grip (1470, FIG. 14B) to allow for easier adjustment of a prong location. Pressure on the sliding grip (1470, FIG. 14B) could cause the tab (560, FIG. 5D) to disengage from a first slot to a second slot (555, FIG. 5D). Thus, the releasable locking interface (1638) may take any of a variety of forms and include elements from both the support structure (1630) and the face plate (1636). In some examples, the releasable locking interface (1638) may allow for positioning of the electrical contact (1634) at two or more positions along one or more axes. In the implementation shown in FIG. 16D, the releasable locking structure (1638) provides for shiftable positioning along the X axis. In many embodiments shown above, the releasable locking interface (1638) may have a number of fixed positions in which the support structure (1630) and electrical contact (1634) may be locked in. Thus, there are a variety of mechanisms that can be used as a releasable locking interface (1638) to lock the support structure in different positions along a second axis with respect to the face plate. This second axis may be in either the vertical axis, the horizontal axis, or the depth axis. In most examples described above the second axis is along the vertical axis.

Additionally or alternatively, there may be a contact positioning mechanism (1640) that allows for the contact (1634) to be positioned as desired along a second axis, for example, along the depth axis (along the Y axis as illustrated in FIG. 16D)). This contact positioning mechanism (1640) can be an interface between the electrical contact (1634) and the support structure (1630). This contact positioning mechanism may include the sliding cover (730, FIG. 7A-7D) that exposes a desired electrical contact (e.g. 710 or 715; FIG. 7A-7D). Additionally or alternatively, the electrical contact may be large and the sliding cover (730, FIG. 7A-7D) may move to cover/insulate a portion of the contact while leaving a second portion of the contact exposed to make contact with the receptacle. In another illustrative embodiment of a contact positioning mechanism shown in FIG. 8, the body (810) may include a slot (815) and the electrical contact (820) moves within the slot (815) to achieve the desired position. In yet another example, the support structure (610, 615, 625; FIGS. 6A-6C) may include a pivot (615, FIGS. 6A-6C) that allows the electrical contact to reach screw terminals at varying depths along the Y axis by rotating the pivot and moving the contact through an arc. The greater the arc, the more displacement of the contact in the Y axis direction.

In some examples, the two distinct axes along which the electrical contact is repositionable with respect to the face plate may be substantially orthogonal. For example, in the embodiment shown in FIGS. 3B and 3C, the spring clips (310) are shown being adjusting in the vertical direction (along the vertical or X axis) by moving them over different sets of posts (348-1 through 348-5). FIG. 3G shows the spring clips (372) deflecting outward along the horizontal axis (along the Z axis). FIGS. 4A-4D, FIGS. 5A-5B, FIGS. 12A-12D, and FIGS. 14A-14B show spring clips that adjust vertically and are configured to also deflect horizontally. FIG. 6A-6C show an example of a spring clip (602) that adjusts (rotates) in the vertical/depth plane (the XY plane). Thus this spring clip (602) adjusts in the X axis and the Y axis. FIGS. 7A and 7B show a spring clip (705) that adjusts vertically along the face plate (755) and also adjusts the contact location in along the depth axis. FIGS. 7C-7D and FIG. 8 show spring clips have electrical contacts (710, 715, 820) that adjust in the depth axis and flex to position in the electrode in the horizontal axis. Substantially orthogonal axes are axes that provide for adjustment in at least two directions or in a plane. Adjustment in the substantially orthogonal axes is not necessarily always independent (as illustrated by the rotating adjustment in FIGS. 6A-6C). In some cases, the active cover plate may provide a different mechanism for adjustment in each axis.

Figure 16F:
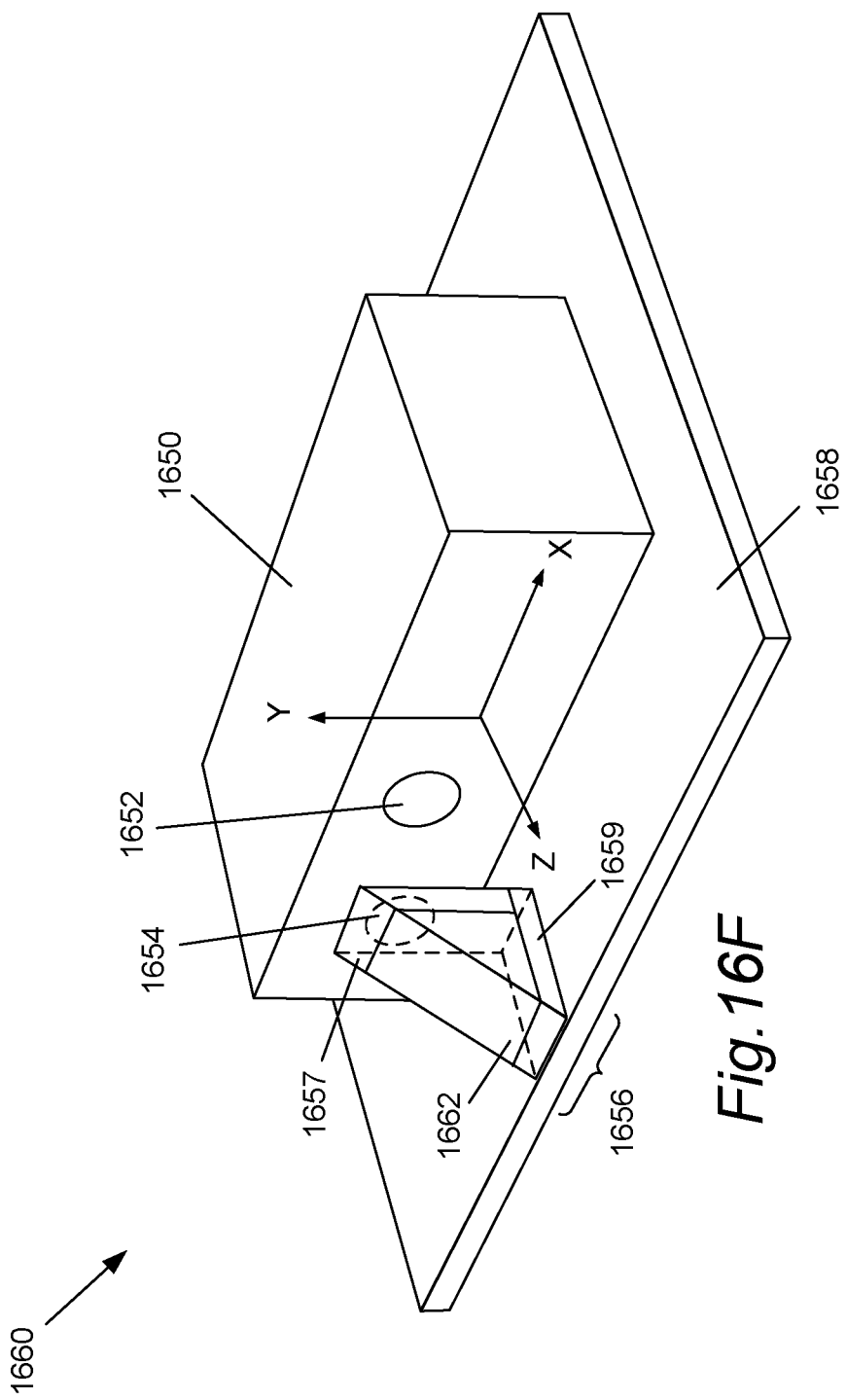

FIG. 16F is a system (1660) that includes an electrical receptacle (1650) with a screw terminal (1652). A face plate (1658) is fastened over the electrical receptacle (1650). A spring clip (1656) includes a support structure (1662) and a shiftably adjustable electrical contact (1654) supported by the support structure (1662). The shiftably adjustable electrical contact (1656) is repositionable with respect to the screw terminal (1652) in at least one of a vertical axis (X axis) and a depth axis (Y axis) to bring the shiftably adjustable electrical contact (1654) into electrical connection with the screw terminal (1652).

The support structure (1662) may be shiftably adjustable along the vertical axis (X axis) with respect to a face plate (1658), thereby repositioning the shiftably adjustable electrical contact (1654) along the vertical axis (X axis) with respect to the screw terminal (1652). The shiftably adjustable electrical contact (1654) may be adjustably positionable on the support structure (1654) in the depth axis (Y axis), thereby repositioning the shiftably adjustable electrical contact (1654) along the depth axis with respect to the screw terminal (1652).

There are a variety of other configurations and elements that could be used. For example, a support structure (1662) may support an electrical contact and allow the position of the electrical contact to be adjusted with respect to the face plate. As described above, there may be one, two, three or more support structures that each support one or more electrodes and allow the position of the electrodes to be adjusted. For example, the support structure may move relative to the face plate in an X and/or Y direction. The support structure may move continuously in the X and/or Y direction or may have discrete positions along the path of motion. The support structure may engage or lock in the discrete positions to secure the position of the electrical contact with respect to the face plate. The support structure may provide for the position of the electrical contact to move in a Y direction. Again, the electrical contact may be adjusted continuously or discretely in the Y direction. The support structure may also allow for the electrical contact to move in the Z direction. For example, the support structure may flex to allow the electrical contact to move in the Z direction.

The support structure (1662) may include a number of elements including an upright supporting element that rises in the Y direction from the face plate. The upright supporting element may have any of a number of configurations, including those shown in the spring clips of FIGS. 3A, 3D, 3E, 3F; the spring clip (350) illustrated in FIG. 3G; the partial spring clip (505) illustrated in FIGS. 5A and 5B; the partial spring clip (540) illustrated in FIGS. 5C and 5D; the spring clip embodiment (602) shown in FIGS. 6A-6C, the spring clip embodiment (705) shown in FIGS. 7A-7D; the spring clip embodiment (800) shown in FIG. 8; the spring clip embodiment (945) shown in FIG. 9C; the spring clips (1220) shown in FIGS. 12A-12D; the spring clip (1420) illustrated in FIGS. 14A-14B; the support structure (1630) and associated elements shown in FIGS. 16D-16E; the spring clips (2100) shown in FIGS. 20A-20C, 21A-21C, 22; any of the spring clips (2300) shown in FIGS. 23A-23F; the spring clips (2400) shown in FIGS. 24A-24E. Further, the concepts described can be applied to adjust the position of a wide range of spring clips with different geometries and configurations.

The support structure (1662) may include a base (1659) extending in the Z direction that is parallel to the surface of the face plate. In general, the base may mechanically connect with the face plate to adjustably secure the support structure to the face plate. The base may mechanically and adjustably connect to the face plate in a variety of ways, including post and hole connections, tab and slot connections, indentation and detent connections, protrusion and slot connections, slide connections, joint connections, clamp connections, articulated connections, latching connections, or other connections. The base may include each of these connection types, individually, in combination, or in combination with connection types.

An upright supporting element (1657) of the support structure (1662) mechanically connects to electrical contact (1654). The upright supporting element may provide for adjustment of the electrical contact in the Y direction. In some examples, the upright supporting element may be flexible and resilient to provide for flexural deflection in the Z direction. Additionally or alternatively, entire support structure may move in the Z direction with respect to the face plate.

Thus, in one embodiment, an active cover plate comprises a face plate, an electrical contact, a support structure mechanically and adjustably connected to the face plate and supports an electrical contact in an adjustable position with respect to the face plate. The support structure may further include a base, wherein the base mechanically and adjustably connects to the face plate. The support structure may further include an upright supporting element, wherein the upright supporting element mechanically connects to the electrical contact.

Figures 17A, 17B, 17C, 17D:
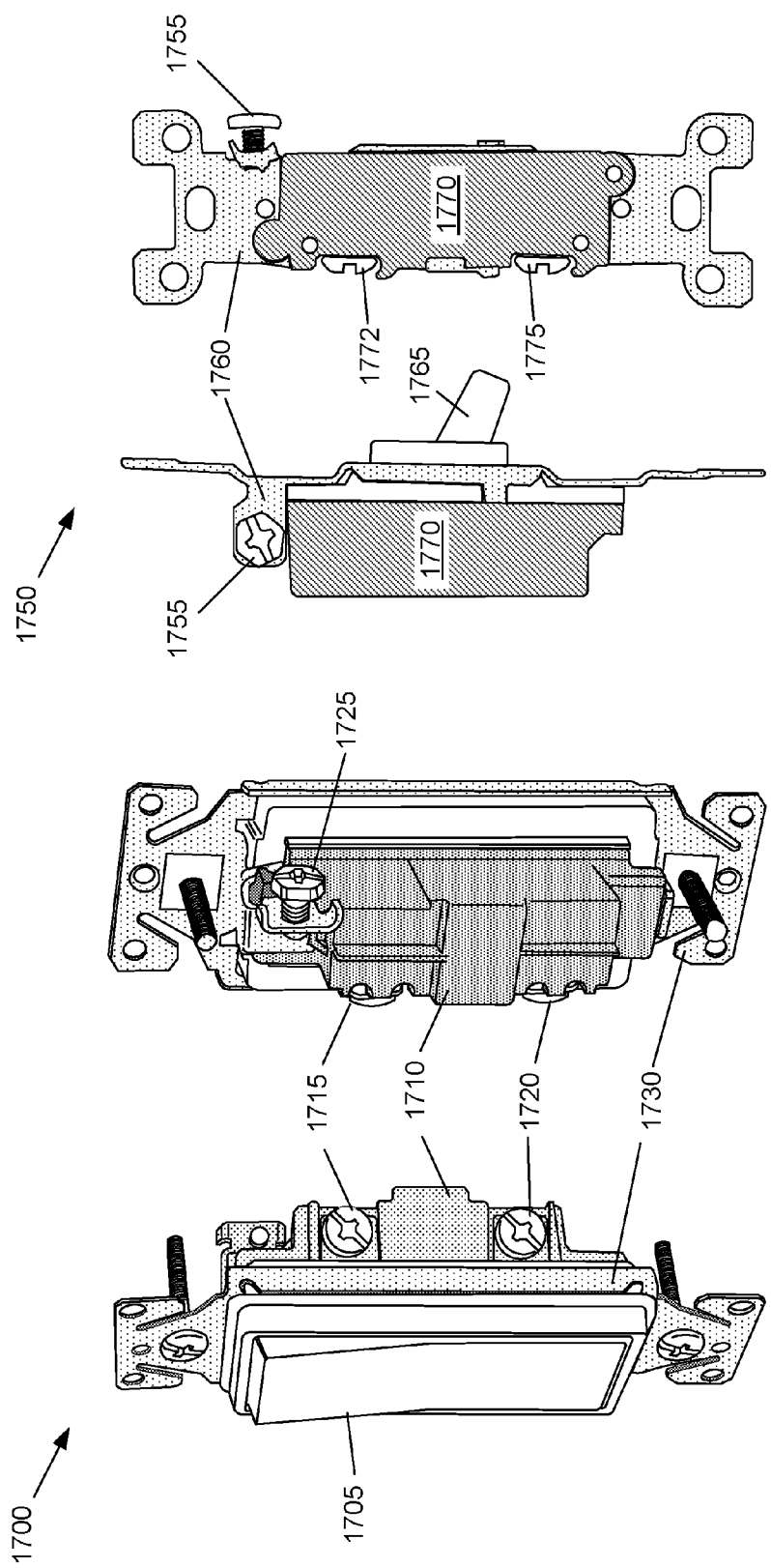
FIGS. 17A-17D show various views of switch receptacles, according to one example of principles described herein.

FIGS. 17A-17D show various views of illustrative switch receptacles. FIGS. 17A and 17B show a front perspective view and a rear perspective view of a décor style rocker switch receptacle (1700) that includes a rocker (1705), a metal bracket (1730) that surrounds the rocker, and body portion (1710). Two screw terminals (1715, 1720) are located on the side of the body portion (1710). Additionally, a ground screw terminal (1725) is connected to the metal bracket (1730). The household wiring is connected to the switch receptacle (1730) using the screw terminals (1715, 1720). For example, the hot and traveler wires can be connected to the side screw terminals (1715, 1720). The ground wire is electrically connected to the ground screw terminal (1725) which is part of the metal bracket (1730). Thus, the metal bracket (1730) may be electrically grounded while the screw terminals (1715, 1730) may be connected to a line voltage. The metal bracket (1730) also includes upper and lower yokes that provide support for screws to fasten the switch receptacle to a receptacle box. In this example, as with many common rocker switch receptacles, the metal bracket (1730) entirely surrounds the switch body, including a portion along the side of the switch body below the screw terminals (1715, 1720).

FIGS. 17C and 17D show a side and rear view of a toggle switch receptacle (1750) that includes a toggle (1765), a body portion (1770) with two side screw terminals (1772, 1775), a metal bracket (1760) and a ground screw terminal (1755). Of note, the metal bracket (1760) is electrically grounded when the ground screw terminal (1755) is connected to a ground wire of the household wiring. The metal bracket (1760) extends around the switch body (1770), and includes grounded metal portions that are located directly below the screw terminals (1772, 1775) and in between the toggle (1765) and the screw terminals (1772, 1775).

Figure 18C:
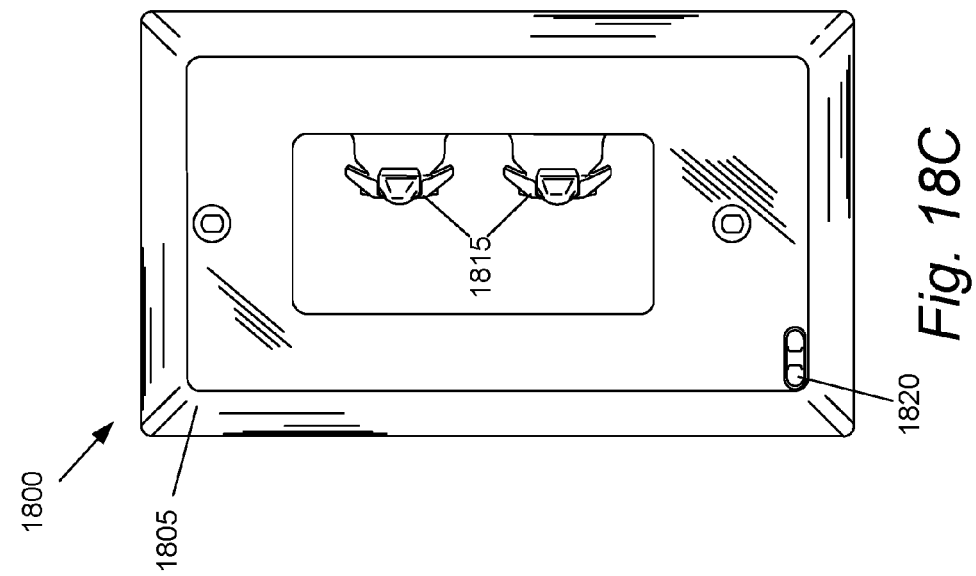
FIGS. 18A-18C show various views of an active cover plate for rocker switch receptacles, according to one example of principles described herein.
Figure 18B:
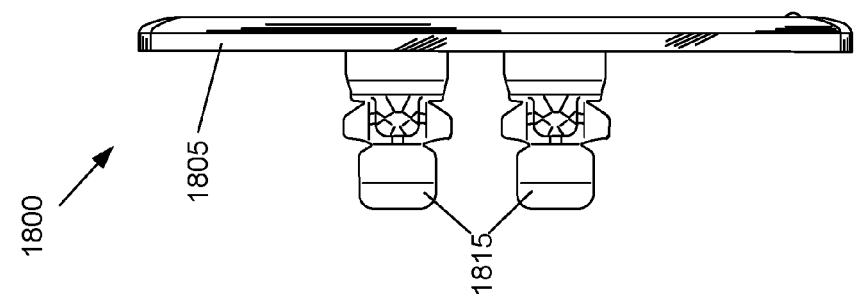
Figure 18A:
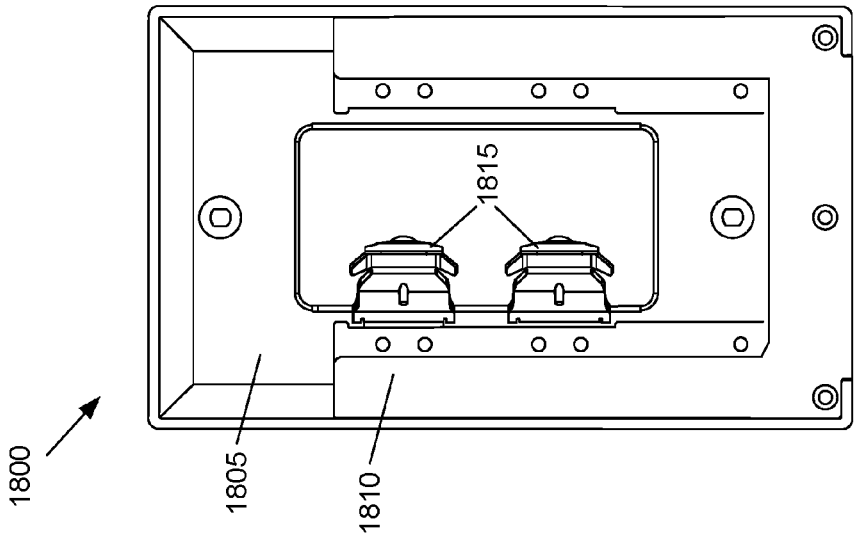

FIGS. 18A-18C show various views of an active cover plate (1800) for décor/rocker switch receptacles (e.g. 1700, FIGS. 17A, 17B). FIG. 18A is a rear view showing the face plate (1805) with spring clips (1815) extending rearward from the face plate (1805). A back plate (1810) covers the bases of the spring clips (1815), wiring, and internal circuitry.

FIG. 18B shows a side view of the active cover plate (1800) and shows the spring clips (1815) extending rearward from the face plate (1805). FIG. 18C is a front plan view of the active cover plate (1800) showing the face plate (1805) with the spring clips (1815) visible through the central aperture. In this example, the active cover plate (1800) is a guidelight that includes light emitting diodes along the bottom edge. A switch/light sensor (1820) is also shown in the lower left corner of the active cover plate. The switch allows the intensity of the light emitting diodes to be adjusted and the light sensor beneath the switch senses ambient light to control when the light emitting diodes or other illumination elements turn on and off.

FIGS. 19A-19C show various views of an active cover plate (1900) for toggle switch receptacles (e.g. 1750, FIGS. 17C, 17D). FIG. 19A is a front view showing the face plate (1905) and a switch/light sensor (1910) shown on the front of the face plate. FIG. 19B shows a side view showing the spring clips (1912) extending rearward from the face plate (1905). FIG. 19C is a perspective view of the active cover plate showing the face plate (1905) with the spring clips (1915). The spring clips in this example include two parts, a conductive portion (1920) and an insulating portion (1915). The conductive portion (1920) forms a base, a flexible/resilient body of the spring clip, and the electrical contact. The insulating portion (1915) that include wings/ramps to assist in guiding the spring clips over the screw terminals and insulating shields to prevent undesirable electrical contact with the metal conductor (1920) by conductors in the surrounding area.

Figure 20A:
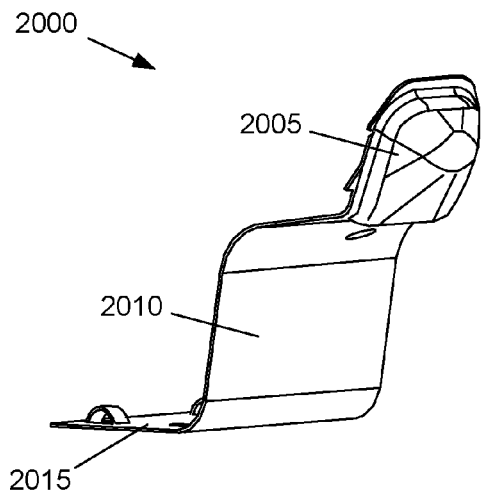
FIGS. 20A-20C show various views of a conductive metal spring for use in active cover plates for switch receptacles, according to one example of principles described herein.
Figure 20B:
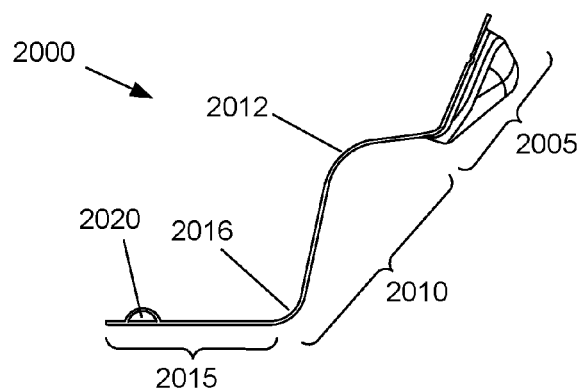
Figure 20C:
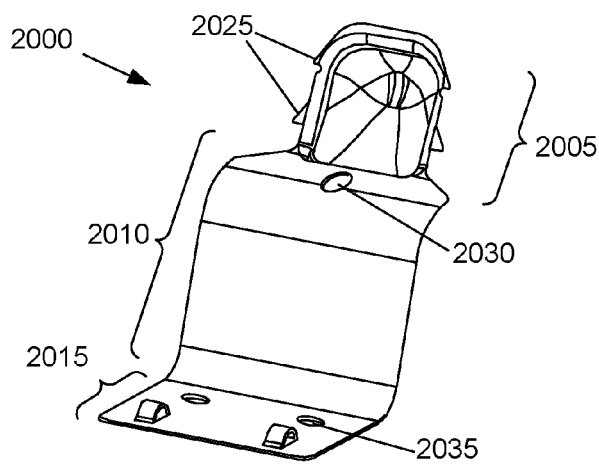

FIGS. 20A-20C show various views of a conductive portion (2000) of a spring clip that may be used in active cover plates for switch receptacles. The geometry shown is only illustrative. A wide range of alternative geometries may be used. The purpose of the conductive portion (2000) is to make electrical contact with a side screw terminal of a switch or outlet receptacle. As discussed above, the conductive portion (2000) can be formed from a single piece of metal sheet such as being stamped out of a copper alloy in a relatively soft state and then hardened to a springy resilient state.

FIG. 20A shows a front perspective view of the conductive portion (2000). In this example, the conductive portion includes a contact (2005) designed to make contact with a side screw terminal, a base (2015), and a curved flexure (2010) connecting the contact (2005) to the base (2015).

FIG. 20B shows a side view of the conductive portion (2000), with the contact (2005), curved flexure (2010), and base (2015). The curved flexure (2010) includes an elbow curve (2012) and a base curve (2016). The combination of these two curves (2012, 2016) allows the conductive portion (2000) to fit around shoulders of switches or outlet receptacles. The base (2015) in this example shows a wire securing feature (2020), however, the wire securing feature may take many forms or may not be present at all.

FIG. 20C shows a rear perspective view of the conductive portion (2000). This view shows barbed securing features (2025) along the sides of the contact (2005). The contact (2005) in this example, is stamped out of the same piece of metal and is concave on the back side of the conductive portion (2000) and convex on the front side (the side facing the screw terminal). The barbed features (2025) are designed to secure an insulating portion over the conductive portion. The curved flexure (2010) also may include features to retain the insulating portion. In this example, there is a hole (2030) through the curved flexure (2010) that allows a front portion and a rear portion of the insulating element to be connected together (see FIGS. 21A-C and FIG. 22).

The base (2015) may include wire securing features as discussed above and positioning features (2035) that assist in securing the base to the face plate. In some examples, the positioning features (2035) may include apertures configured to accept posts extending from the face plate.

Figure 21A:
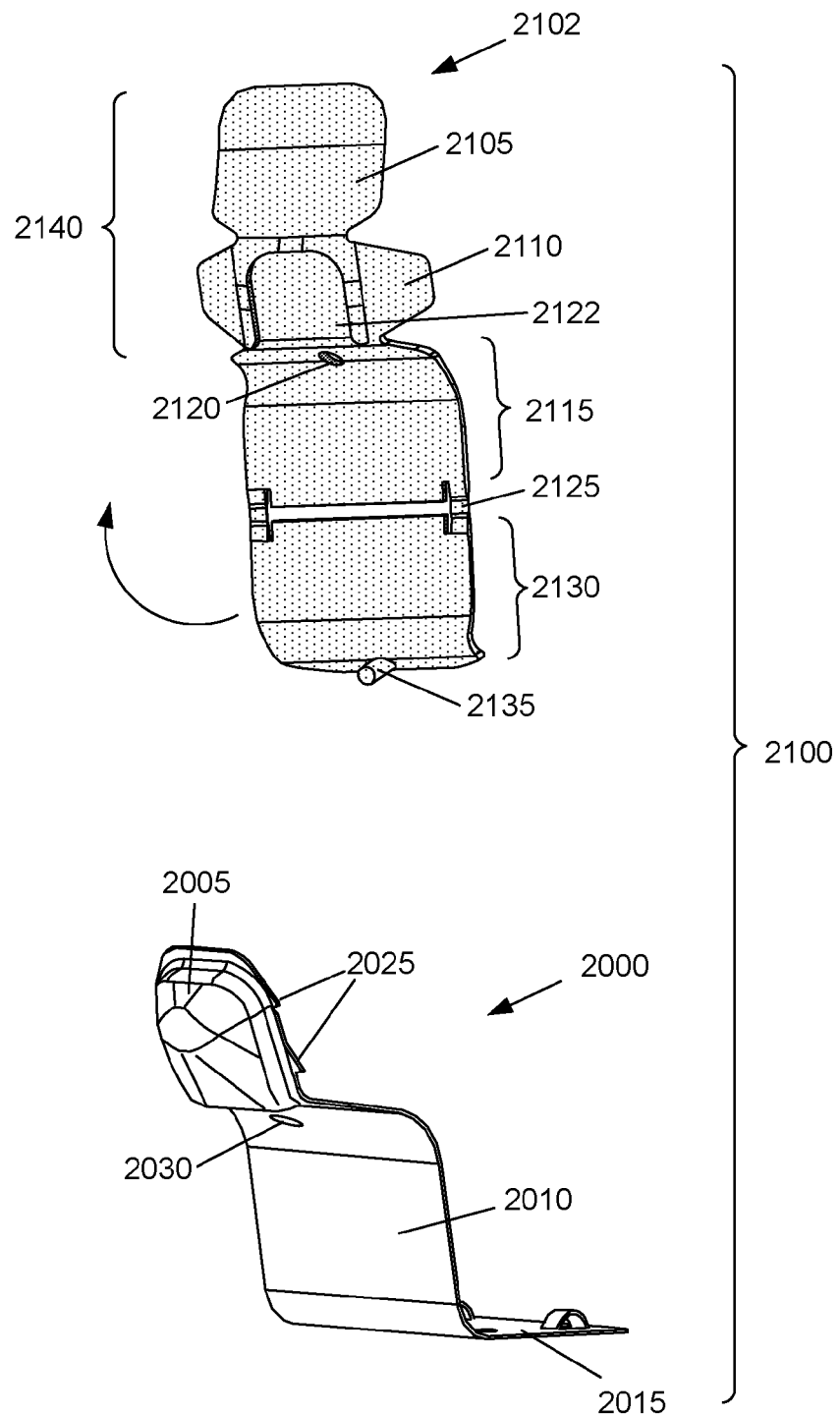
FIGS. 21A-21C show various views of a spring clips for use in active cover plates for switch receptacles, according to one example of principles described herein.
Figure 21B:
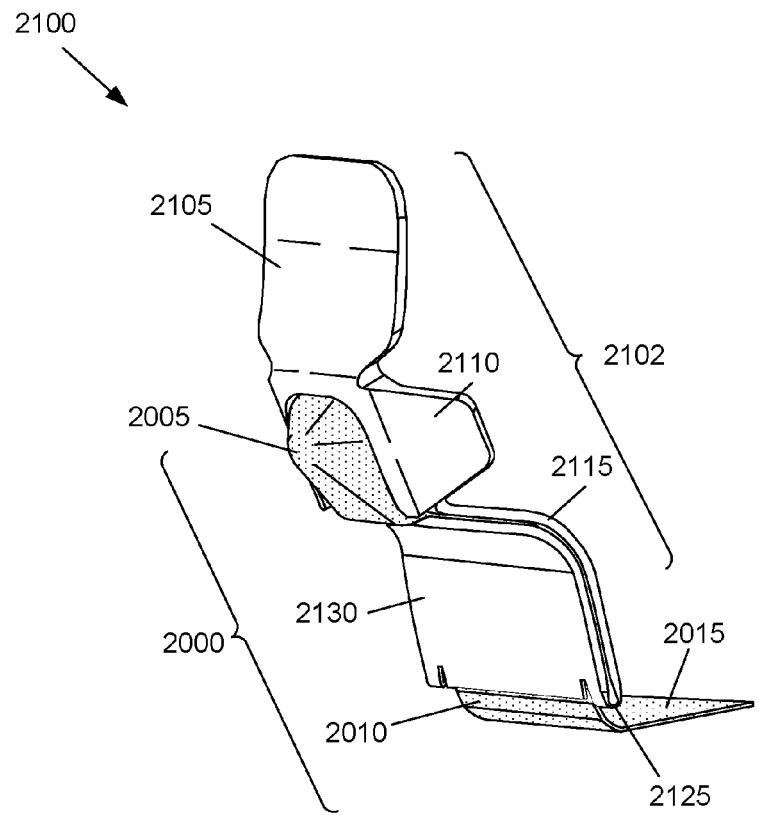
Figure 21C:
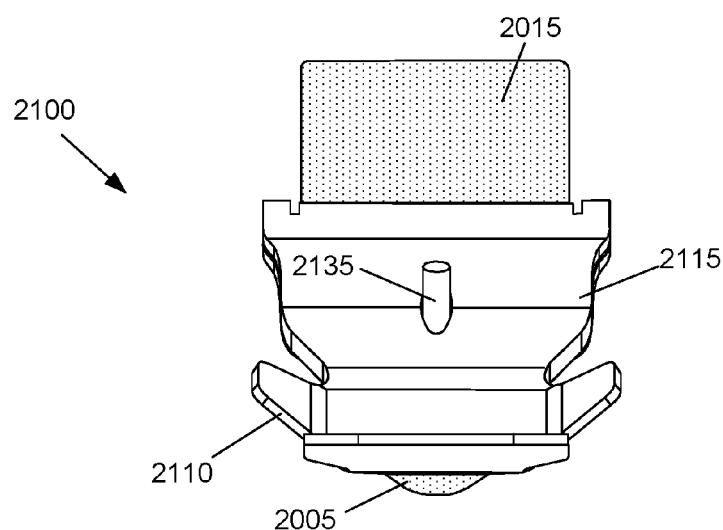

FIGS. 21A-21C show various views of spring clips (2100) for use in active cover plates for switch receptacles. FIG. 21A is an exploded assembly view of one example of a spring clip. As discussed above, the spring clips (2100) may include an insulating portion or hood (2102). The hood (2102) in this example is formed from a single piece of electrical insulating material and includes an upper portion (2140), a rear insulating portion (2115), and a front insulating portion (2130). The upper portion (2140) includes a main ramp (2105), and two side ramps (2110). It also includes a cavity (2122) to receive the contact (2005).

The rear insulating portion (2115) is directly connected to the upper portion (2140). The rear insulating portion (2115) is connected to the front insulating portion (2130) by a flexible portion (2125). For example, the flexible portion (2130) may be a joint or a living hinge. The rear insulating portion (2115) includes an aperture (2120) that is configured to receive a post (2135) on the front insulating portion (2130).

The front insulating portion (2130) is rotated about the hinge and upward toward the rear insulating portion (2115) as shown by the curved arrow. The contact (2005) is inserted into the space between the rear insulating portion (2115) and the front insulating portion (2130). The cavity (2122) in the upper portion (2140) of the hood slips over the contact (2005) and the barbs (2025) engage with the sides of the cavity (2122) to secure the hood (2102) onto the conductive element (2000). The rotation of the front insulating portion (2130) then continues until the post (2135) fits through the aperture (2030) in the curved flexure (2010) and through the aperture (2120) in the rear insulating portion (2115). The post (2135) is then secured in place. For example, the post (2135) may be pressed so that it expands to fill the apertures (2030, 2120) and secures the front insulating portion (2130) to the rear insulating portion (2115). The post (2135) also helps to secure the hood to the flexible element (1800).

FIGS. 21B and 21C are views of the assembled spring clip (2100). FIG. 21B shows a front perspective view of the spring clip (2100). In this view, the hood (2102) is installed over the conductive portion (2000), so that the ramps (2105, 2110) can guide the contact (2005) into place over the screw terminal. The front insulating portion (2130) covers the front of the conductive portion (2000) and the rear insulating portion (2115) covers the rear of the conductive portion (2000).

FIG. 21C shows a top view of the spring clip (2100), showing the post (2135) extending through the apertures and out of the rear insulating portion (2115). The post (2135) can then be secured in place by any of a number of techniques, including swaging, compressing, adhesive, or any other suitable technique. Once it is secured in place, the front insulating portion (2130) and the rear insulating portion (2115) sandwich the flexible conductive portion (2010) between them. The position of the post (2135) is selected so that a significant amount of the flexibility of the flexible conductive portion (2010) is maintained despite being sandwiched between the front and rear insulating portions. This allows the spring clip (2100) to bend to accommodate various sizes and configurations of receptacles.

Figure 22:
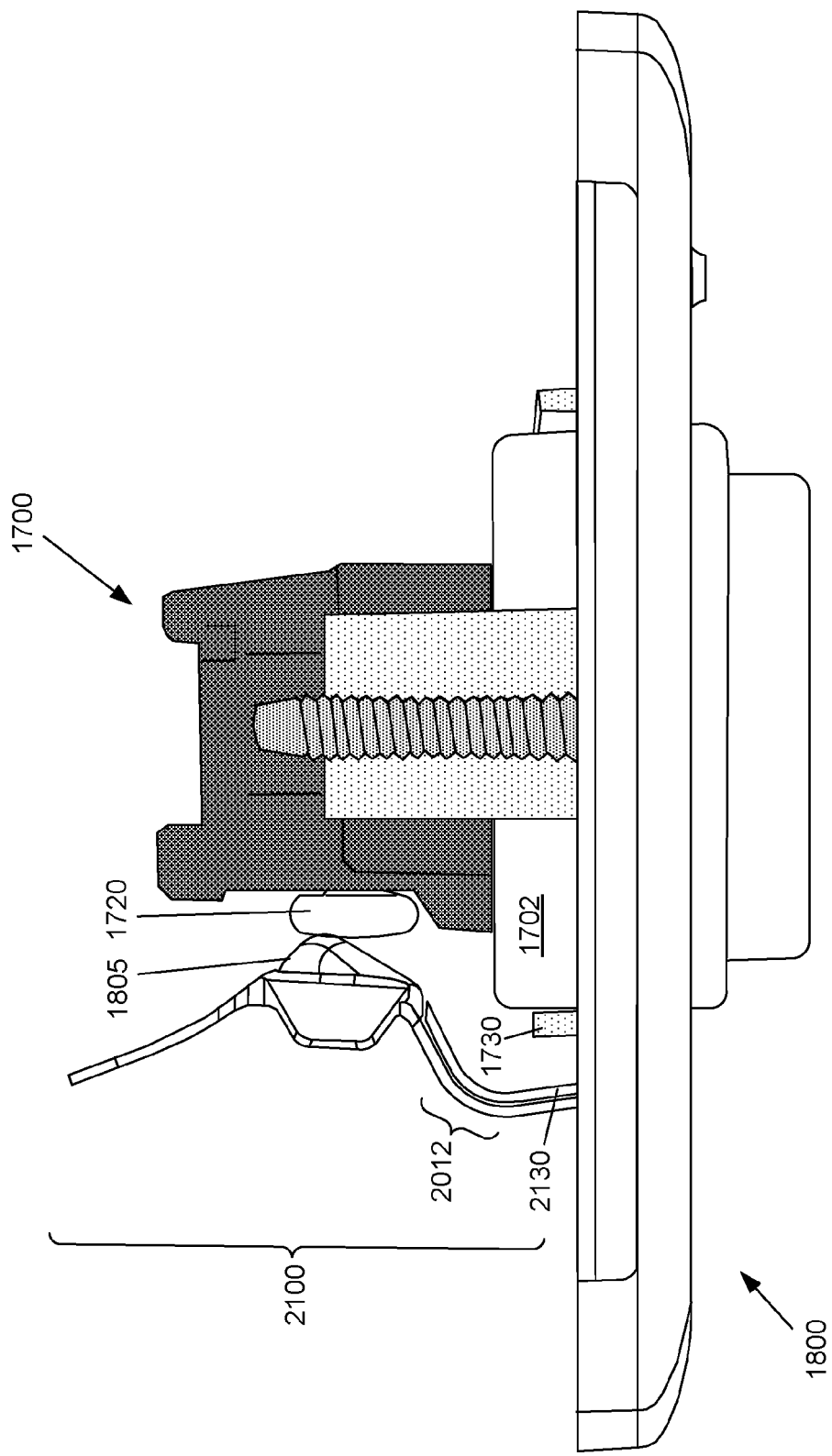
FIG. 22 shows a bottom view of a rocker switch receptacle with an active cover plate placed over the receptacle, according to one example of principles described herein.

FIG. 22 is a bottom view showing a spring clip (2100) on an active cover plate (1800) making electrical contact with a screw terminal (1720) on a rocker switch receptacle (1800). As shown in the figure, the spring clip (2100) is bent slightly rearward. The elbow (2012) allows the spring clip (2100) to fit around the shoulder (1720) of the rocker switch receptacle and the front insulation (2130) prevents the flexible conductive element (2000) from shorting with the grounded metal bracket (1730).

FIGS. 23A-23F show various examples of electrical contact configurations for spring clips (2300). For example, a contact (2302) may have an offset (2301) with respect to the face (2303) of the spring clip (2300) as shown in FIG. 23A. The contact (2304) may also be rotated by an angle (2305) with respect to the face (2303) of the spring clip as shown in FIG. 23B. There may be multiple electrical contacts (2306, 2307) on the spring clip (2300) as shown in FIG. 23C. FIGS. 23D, 23E, and 23F show illustrative examples of electrical contacts (2308, 2310, 2312) that vary in size and location on the spring clip (2300). In general, the electrical contact may be centered, off centered, symmetric in one or more axes, asymmetric in one or more axes, and/or have a regular or irregular shape. The shape and position of the electrical contact can be tailored to specific applications. For example, a specific shape may be used to avoid an obstacle or make contact with a specific portion of an electrified screw terminal that is present in one or more installation situations.

Figure 24A:
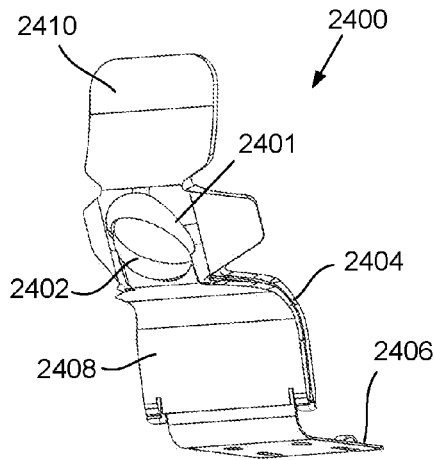
FIGS. 24A-24E show one embodiment of a spring clip with an asymmetric electrical contact, according to one example of principles described herein.

FIGS. 24A-24E show various views of one illustrative spring clip (2400) with an asymmetric electrical contact (2402). In this specific example, the electrical contact (2402) is not symmetric about an X-axis or Y-axis on the face of the electrical contact, but has symmetry with respect to a coordinate system rotated at some angle with respect to the first coordinate system. FIG. 24A shows a front perspective view of the spring clip (2400) showing an electrical contact (2402) that has an ellipsoid shape rotated at an angle with respect to the face (2401) of the spring clip. In this example, the ellipsoid is a section of a tri-axial ellipsoid with the shortest semi-principal axis perpendicular to the face of the spring clip. As discussed above with respect to FIGS. 21A, 21B, and 21C, the spring clip also includes a hood (2410) which includes a rear insulating portion (2404), and a front insulating portion (2408). Also shown is flexible conductive material (2406). The electrical contact (2402) may be formed from the sheet of material or may be formed separately or from a different material.

Figure 24B:
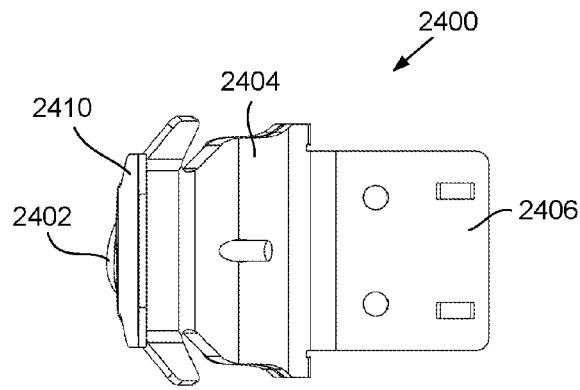
Figure 24C:
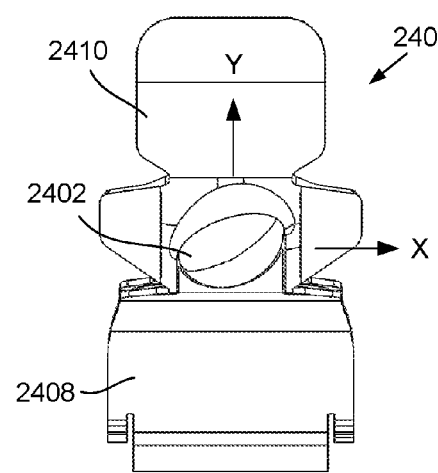
Figure 24D:
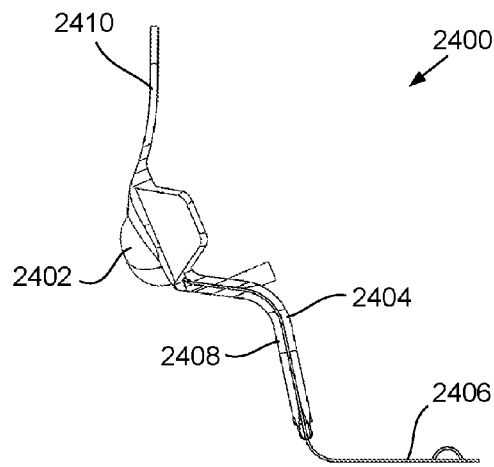
Figure 24E:
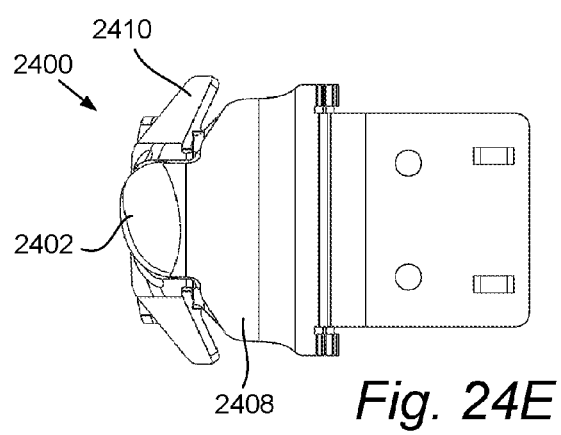

FIG. 24B is a top view of the spring clip (2400) showing a base formed from the flexible conductive material (2406) with holes for alignment posts. Also shown is the post (2403) that connects the front insulation (2404) to the back insulation (2404). FIG. 24C shows a frontal view of the spring clip (2400). The hood (2410) covers portions of the flexible conductor around the electrical contact (2402) and makes a smooth transition between the surface of the electrical contact and the surface of the hood. This smooth profile prevents the spring clip (2400) from catching on surfaces of receptacles or screw terminals. FIG. 24D is a side view of the spring clip (2400), showing the flexible conductive material (2406) sandwiched between front insulation (2408) and rear insulation (2404) of the hood (2410). FIG. 24E is a bottom view of the spring clip (2400) showing the electrical contact (2402) protruding from the face of the spring clip and surrounded by the hood (2410). The front of the spring clip is covered by the front insulation (2408).

As discussed above, there may be a variety of considerations that influence the size, location, and orientation of the electrical contact. The principle purpose of the electrical contact is to make an electrical connection with a screw terminal without undesirable contact with other materials. The size/orientation of the contact may be configured to contact screw terminals or screw heads that have different locations, avoid shorting with other components, allow for easy installation, or other considerations.

The preceding description has been presented only to illustrate and describe examples of the principles described herein. This description is not intended to be exhaustive or to limit these principles to any precise form disclosed. Many modifications and variations are possible in light of the above teaching.

What is claimed is:

1. A cover plate assembly for an electrical receptacle comprising:
   a face plate comprising a rear surface;
   an engaging feature disposed on the rear surface of the face plate; and
   a spring clip, wherein the engaging feature disposed on the rear surface of the face plate engages with the spring clip and secures the spring clip in at least two different positions with respect to the face plate, wherein:
   the engaging feature comprises at least two engaging elements attached in fixed positions with respect to the rear surface of the face plate;
   the at least two different positions comprise a first position and a second position; and
   the spring clip comprises a selectively positionable spring clip positionable in the first position and the second position on the rear surface of the face plate, wherein at least one of the engaging elements engages with the spring clip to secure the spring clip in the first position with respect to the rear surface of the face plate and at least one of the engaging elements engages with the spring clip to secure the spring clip in the second position on the rear face of the face plate.

2. The cover plate assembly of claim 1, wherein the spring clip comprises a base and wherein the engaging feature engages with the base to secure the spring clip in the at least two different vertical positions with respect to the face plate.

3. The cover plate assembly of claim 1, wherein the at least two different positions are different locations of the spring clip on the rear surface of the face plate.

4. The cover plate assembly of claim 1, wherein the at least two engaging elements comprise a first locking feature and a second locking feature, wherein the first locking feature mechanically engages with the spring clip and repositionably secures the spring clip in a first position with respect to the face plate and the second locking feature mechanically engages with the spring clip to repositionably secure the spring clip in a second position with respect to the face plate.

5. The cover plate assembly claim 1, wherein the at least two different positions comprise at least two different vertical positions with respect to the face plate.

6. The cover plate assembly of claim 1, wherein the spring clip comprises an electrical contact repositionable with respect to the face plate along two distinct axes.

7. The cover plate assembly of claim 6, wherein the spring clip flexes to reposition the electrical contact along a first axis.

8. The cover plate assembly of claim 7, wherein the engaging feature comprises a releasable locking interface between the face plate and the spring clip, wherein the first releasable locking interface releasably locks the spring clip in different positions along a second axis with respect to the face plate.

9. The cover plate assembly of claim 6, wherein the spring clip comprises a contact positioning mechanism to releasably lock the electrical contact in different positions along a second axis with respect to spring clip.

10. The cover plate assembly of claim 6, wherein the two distinct axes are substantially orthogonal.

11. The cover plate assembly of claim 1, wherein the engaging feature comprises a shiftably adjustable mechanism securing the spring clip to the face plate in at least two different fixed positions, wherein the spring clip is movable between the at least two different fixed positions.

12. The cover plate assembly of claim 11, wherein the spring clip is movable between the at least two different fixed positions through application of force which disengages the shiftably adjustable mechanism to move the spring clip from a first fixed position and reengages the shiftably adjustable mechanism to secure the spring clip in a second fixed position.

13. The cover plate assembly of claim 11, wherein the at least two different fixed positions are both in a plane parallel to a rear surface of the face plate.

14. The cover plate assembly of claim 11, wherein the shiftably adjustable mechanism comprises a first engaging element and a second engaging element.

15. The cover plate assembly of claim 14, wherein the first engaging element is flexible such that flexure of the first engaging element disengages the first engaging element from the second engaging element to allow the spring clip to be moved from a first fixed position to a second fixed position.

16. The cover plate assembly of claim 14, wherein the shiftably adjustable mechanism further comprises a mechanical interface between the first engaging element and the second engaging element that secure the spring clip position with respect to the face plate.

17. The cover plate assembly of claim 14, wherein the spring clip comprises the first engaging element and the face plate comprises the second engaging element.

* * * * *